(12) United States Patent
Antoniou et al.

(10) Patent No.: US 10,673,617 B1
(45) Date of Patent: Jun. 2, 2020

(54) METHODS, SYSTEM AND POINT-TO-POINT ENCRYPTION DEVICE MICROCHIP FOR AES-SEA 512-BIT KEY USING IDENTITY ACCESS MANAGEMENT UTILIZING BLOCKCHAIN ECOSYSTEM TO IMPROVE CYBERSECURITY

(71) Applicants: George Antoniou, Sunny Isles Beach, FL (US); Oresteban Carabeo, Miramar, FL (US); Roberto Hernandez Espinosa, Pembroke Pines, FL (US)

(72) Inventors: George Antoniou, Sunny Isles Beach, FL (US); Oresteban Carabeo, Miramar, FL (US); Roberto Hernandez Espinosa, Pembroke Pines, FL (US)

( * ) Notice: Subject to any disclaimer, the term of this patent is extended or adjusted under 35 U.S.C. 154(b) by 0 days.

(21) Appl. No.: 16/391,446

(22) Filed: Apr. 23, 2019

Related U.S. Application Data

(60) Provisional application No. 62/661,694, filed on Apr. 24, 2018.

(51) Int. Cl.
| | |
|---|---|
| *H04L 9/06* | (2006.01) |
| *H04L 9/08* | (2006.01) |
| *H04L 9/32* | (2006.01) |
| *G06F 13/42* | (2006.01) |

(52) U.S. Cl.
CPC ........ *H04L 9/0631* (2013.01); *G06F 13/4221* (2013.01); *G06F 13/4282* (2013.01);
(Continued)

(58) Field of Classification Search
CPC ... H04L 9/0631; H04L 9/3221; H04L 9/0637; H04L 9/0825; H04L 2209/38;
(Continued)

(56) References Cited

U.S. PATENT DOCUMENTS

| | | | | |
|---|---|---|---|---|
| 5,140,634 | A * | 8/1992 | Guillou | G06Q 20/341 |
| | | | | 235/382 |
| 2011/0138192 | A1* | 6/2011 | Kocher | G06F 21/575 |
| | | | | 713/189 |

(Continued)

*Primary Examiner* — Khoi V Le

(57) ABSTRACT

A combined system and not a system separately having a complex system hardware architecture and software with levels of complexity of P2PE, IAM, and BCE. A microcontroller (MC) 64-bit using MC (A) and MC (B) embedded into a device using point-to-point encryption (P2PE) to communicate with the novel IAM blockchain software and a central server database to track all registered and non-registered IoT devices in the BCE. The present invention includes a MC 64-bit method of MC (A) and MC (B) having an advanced encryption standards (AES) strong encryption algorithm (SEA) of 512-bit key utilizing the blockchain ecosystem (BCE), IoT identity to validate transactions between the authentication, and identity of the IoT devices. The MC 64-bit of MC (A) and MC (B) employs a novel AES-SEA 512-bit key to generate a real-time randomly validation symmetrical key encryption in rounds of 10 bits, sending data into the central server and the IAM blockchain software to authenticate each device, track IoT devices, MC entries, and validations. Once the encryption AES-SEA 256-bit key is generated in the MC (A) and the encryption AES-SEA 256-bit key is generated in MC (B), the communication between the MC (A) and MC (B) will generate the AES-SEA 512-bit key with 10 bits; the pseudo-random number process is modified using a time based to be programmed with a timer which has an input of the clock frequency. The MC 64-bit of MC (A) and MC (B) is programmed in a master mode and slave mode; therein providing a novel system of circuit hardware using an AES-SEA 512-bit key and AES 2048 algorithm key to generate PKI certifications for validation, authentication, and authorization through the BCE.

18 Claims, 42 Drawing Sheets

(52) U.S. Cl.
CPC .......... *H04L 9/0637* (2013.01); *H04L 9/0825* (2013.01); *H04L 9/3221* (2013.01); *G06F 2213/0024* (2013.01); *G06F 2213/0042* (2013.01); *H04L 2209/38* (2013.01)

(58) Field of Classification Search
CPC ............. G06F 13/4282; G06F 13/4221; G06F 2213/0042; G06F 2213/0024
See application file for complete search history.

(56) References Cited

U.S. PATENT DOCUMENTS

| | | | |
|---|---|---|---|
| 2013/0346639 A1* | 12/2013 | Stroud | G06F 13/4004 710/14 |
| 2014/0201815 A1* | 7/2014 | Van Nieuwenhuyze | G06F 21/6209 726/4 |
| 2014/0286491 A1* | 9/2014 | Atherton | G06K 7/10267 380/270 |
| 2015/0288687 A1* | 10/2015 | Heshmati | H04L 63/0861 726/7 |
| 2016/0092387 A1* | 3/2016 | Balasubramanian | G06F 13/4068 710/110 |
| 2016/0203343 A1* | 7/2016 | Soffer | G06F 13/102 726/34 |
| 2016/0364347 A1* | 12/2016 | Yeung | G06F 13/1673 |
| 2017/0251025 A1* | 8/2017 | Varley | H04L 9/088 |
| 2018/0268386 A1* | 9/2018 | Wack | G06Q 20/102 |

\* cited by examiner

Proofs and Secret Data

STEP 2:

STEP 3:

| IoT | MAC Address | Serial Number | Firmware | Fingerprint Identity IOS | Model |
|---|---|---|---|---|---|
| 1 | 70:BD:04:39:D6:4E | C39AQDS1GRX1 | 2.02.51 | 12.1.4 (16D57) | MQ912LL/A |
| | | | | | |
| | | | | | |
| | | | | | |
| | | | | | |
| | | | | | |
| | | | | | |
| | | | | | |

STEP 4: ─104

Central Server Database

| First Name | Last Name | IoT | MAC Address | Serial Number | Firmware | Fingerprint Identity IOS | Model | Verification | P2PE | Encryption Key | PKI Certificate | Hash | Timestamp | Date |
|---|---|---|---|---|---|---|---|---|---|---|---|---|---|---|
| Joe | Smith | 1 | 70:BD:04:39:D6:4E | C39AQDS1GRX1 | 2.02.51 | 12.1.4 (16D57) | MQ912LL/A | Confirm | Y | AES-SEA 512-bit | Valid | 861844 d670... | 13:04:15 | 2/18/19 |
|  |  |  |  |  |  |  |  |  |  |  |  |  |  |  |
|  |  |  |  |  |  |  |  |  |  |  |  |  |  |  |
|  |  |  |  |  |  |  |  |  |  |  |  |  |  |  |

STEP 5: ─396

Web Browser  ← → C  🔒 HTTPS://DISPLAY.IAMBLOCKCHAIN.COM    Login Joe Smith

| Transaction Hash: |
|---|
| 861844d6704e8573fec34d967e20bcfef3d424cf48be04e6dc08f2bd58c72974337101 5ead891ec3cf1c9d34b49264b51075 1b1ff9e537937bc46b5d6ff4ecc8 |
| Verification: Confirm |
| IoT: 1 |
| MAC Address: 70:BD: 04:39: D6:4E |
| Serial Number: C39AQDS1GRX1 |
| Firmware: 2.02.51 |
| Fingerprint Identity IOS: 12.1.4 (16D57) |
| Model: MQ912LL/A |
| P2PE: Yes |
| Encryption Key: AES-SEA 512-bit |
| PKI Certificate: Valid |
| Timestamp: 13:04:15 |
| Date: 2/18/19 |
| Transaction Details |

FIG. 41

METHODS, SYSTEM AND POINT-TO-POINT ENCRYPTION DEVICE MICROCHIP FOR AES-SEA 512-BIT KEY USING IDENTITY ACCESS MANAGEMENT UTILIZING BLOCKCHAIN ECOSYSTEM TO IMPROVE CYBERSECURITY

CROSS-REFERENCE TO RELATED APPLICATION

This application claims the benefit under 35 USC § 119(e) of the United States provisional patent application Ser. No. 62/661,694 filed Apr. 24, 2018, and the same is incorporated herewith in its entirely.

FIELD OF THE INVENTION

The present invention relates to identity access management (IAM) and central server (CS) software combining point-to-point encryption (P2PE) algorithm generally, and more specifically the invention relates to blockchain ecosystem (BCE), P2PE, IAM, and the central server. Still more specific, the invention relates to a microcontroller (MC) 64-bit comprising with MC (A) and MC (B) embedded into a device to provide an advanced encryption standard (AES) strong encryption algorithm (SEA) of 512-bit key utilizing AES 2048 key to produce a real-time randomly validation symmetrical key utilizing pseudorandom numbers for secure Internet of Things (IoT) device identification, authentication, authorization, communication, and P2PE.

BACKGROUND OF THE INVENTION

The IoT has extended the internet connectivity to reach not just computers and humans, but most of our environment things by having the potential to connect billions of objects simultaneously. The IoT improves information sharing needs that result in improving lives, but the IoT benefits are unlimited, there are many challenges facing adopting the IoT in the real world due to its centralized server/client model. For instance, scalability and security issues that arise due to the excessive numbers of IoT objects in the network; the server/client model requires all devices to be connected and authenticated through the server creating a single point of failure. Therefore, moving the IoT system into the decentralized path may be the right decision because IoT empowers any "Thing" to connect and communicate. Thereby, converting the physical world into a vast information system where several technologies, such as Cloud Computing, Machine Learning to Data Analysis, and Information Modeling, are quickly becoming an integral part of IoT fabric. One of the prevalent decentralization systems is blockchain because it is a powerful technology that decentralizes computation and management processes by solving various IoT issues in security.

Existing IoT systems are built on a centralized server/client model, which involves all devices to be connected and authenticated through the server. A blockchain is a distributed database of records, such as distributed ledger which contains all transactions that have been executed and shared among participating parties in the network. But, a deficiency of fundamental security measures makes IoT vulnerable to privacy and security threats with its "security by design," blockchain can help in addressing major security requirements in IoT (Atlam et al., 2018).

Each transaction is stored in the distributed ledger and must be verified by the consent of most participants in the network where all transactions that have ever made are contained in the Blockchain. The decentralization model of the blockchain will have the capability to handle processing of billions of transactions between IoT devices, which will significantly reduce the costs associated with installing and maintaining large centralized data centers and will distribute computation and storage needs across the billions of devices that form IoT networks. In addition, working with the blockchain technology will eliminate the single point of failure associated with the centralized IoT architecture. Furthermore, integrating blockchain with IoT will allow the peer-to-peer messaging, file distribution and autonomous coordination between IoT devices with no need for the centralized server-client model.

Mostly, in centralized IoT architecture, the IoT is the connection and communication of different devices over the Internet. These devices are composed of networking nodes whether serves or computer which are connected to share their data. All devices are provided with sensors, which collect data that can be transmitted, stored, analyzed, and presented in a useful way.

The current IoT architecture is built as a centralized model which is known as a server/client model. In this model, all devices cannot talk to each other but talk to a centralized gateway instead. The centralized model has used to connect a wide range of computing devices for many years and will continue to support small-scale IoT networks, however, it will not be capable of providing the needs to extend the IoT system in the future. In addition, the centralized model is vulnerable to data manipulation. Collecting real-time data does not ensure that the information is put to good and appropriate use.

A decentralized approach for the IoT would solve many of these issues. One of the popular decentralization techniques is blockchain. blockchain technology provides an efficient way of recording transactions or any digital interaction in a way that makes it secure, transparent, highly resistant to outages, auditable.

A blockchain consists of two main elements transactions and blocks. Transactions are the actions generated by the participants in the system. Blocks record the transactions and make sure they are in the correct sequence and have not been tampered with. The blockchain has many features that make it very attractive for the IoT to solve many of its issues.

Blockchain characteristics include immutability: Building immutable ledgers is one of the key values of the blockchain. All centralized databases can be corrupted and commonly requires trust in a third party to keep information integrity. Once you have agreed on a transaction and recorded it, it can never be changed.

Decentralization: The lack of centralized control ensures scalability and robustness by using resources of all participating nodes and eliminating many-to-one traffic flows, which in turn decreases latency and solve the problem of single point of failure that exists in the centralized model. Anonymity: The anonymity provides an efficient way of hiding the identity of users and keeps their identities private. Better Security: blockchain provides better security because there is no single point of failure to shut down the entire network.

Increased Capacity: One of the significant things about blockchain technology is that it can increase the capacity of an entire network. Having thousands of computers working together as a whole can have greater power than a few centralized servers.

The blockchain is generally a database that stores all the transactions in blocks. When a new transaction is created, the sender broadcasts it to the Peer-to-Peer communication channel to all other nodes in the network. The transaction is still new and not verified. When the nodes receive the transaction, they validate it and keep it in their ledger.

When a new block is created, it is time-stamped and propagated to all network nodes. Every node receives the block, validates it, validates the transactions, and adds the block to his ledger. When most nodes accepted the block, it becomes authorized and non-reversible part of the blockchain. In addition to transactions, every block stores some metadata and the hash value of the previous block. So, every block has a pointer to its parent block. That is how the blocks are linked, creating a chain of blocks called blockchain. The distributed ledger is available for everyone in the network to check the blocks and the transactions within. However, the users stay anonymous, they only identified by their public key as an address.

Moreover, the transactions are encrypted. Invalid transactions are rejected and are not included in the blocks. Malicious attempt to make a change in the transactions will require repeated calculation of the proof of work for the attached block and all the blocks afterward. These calculations are infeasible unless most of the nodes in the network are malicious.

blockchain with an IoT is an interesting developing system that provides unlimited benefits, but there are many challenges with the current centralized IoT architecture such that all devices are identified, authenticated and connected through the centralized servers. This model was used to connect a wide range of computing devices for many years and will continue to support small-scale IoT networks, however, it will not be capable of providing the needs to extend the IoT system in the future.

The IoT has unlimited benefits and adopting a decentralized approach for the IoT would solve many issues especially security. Adopting a standardized peer-to-peer communication model to process the hundreds of billions of transactions between devices will significantly reduce the costs associated with installing and maintaining large centralized data centers and will distribute computation and storage needs across the billions of devices that form IoT networks. This will prevent failure in any single node in a network from bringing the entire network to a halting collapse.

However, establishing peer-to-peer communications will present its own set of challenges especially security. IoT security is much more than just about protecting sensitive data. Therefore, the blockchain solutions will have to maintain privacy and security in IoT networks and use validation and consent of participants for transactions to prevent spoofing and theft. In addition, blockchain technology is considered the key solutions to solve privacy and reliability issues in the IoT. It can be used in tracking billions of connected devices, enabling the processing of transactions and coordination between devices; this allows for significant savings for IoT industry manufacturers.

Moreover, this decentralized approach would eliminate single points of failure, creating a more resilient system for devices to run on. The cryptographic algorithms used by blockchains would make consumer data more private. In an IoT network, the blockchain can keep an immutable record of the history of smart devices. This feature enables the autonomous functioning of smart devices without the need for centralized authority.

The blockchain may treat message exchanges between devices similar to financial transactions in a bitcoin network. To enable message exchanges, devices will leverage smart contracts which then model the agreement between the two parties. One of the most exciting capabilities of the blockchain is the ability to maintain a duly decentralized, trusted ledger of all transactions occurring in a network. This capability is essential to enable the many compliances and regulatory requirements of industrial IoT applications without the need to rely on a centralized model.

There are many benefits of adopting blockchain with IoT. These benefits can be summarized as follows:

Publicity: All participants can see all the transactions and all blocks as each participant has its own ledger. The content of the transaction is protected by the participant's private key, so even all participants can see them, they are protected. The IoT is a dynamic system in which all connected devices can share information together and at the same time protecting users' privacy. Decentralization: Most participants must verify the transactions in order to approve it and add it to the distributed ledger. There is no single authority that can approve the transactions or set specific rules to have transactions accepted. Therefore, there is a massive amount of trust included since most of the participants in the network must reach an agreement to validate transactions. Therefore, the blockchain will provide a secure platform for IoT devices. In addition, eliminating centralized traffic flows and a single point of failure of the current centralized IoT architecture. Resiliency: Each node has its own copy of the ledger that contains all transactions that have ever made in the network. So, the blockchain is better able to withstand attack. Even if one node was compromised, the blockchain would be maintained by every other node. Having a copy of the data at each node in the IoT will improve information sharing needs. However, it introduces new processing and storage issues. Security: blockchain can provide a secure network over untrusted parties which is needed in IoT with numerous and heterogeneous devices. In other words, all IoT network nodes must be malicious to perform an attack. Speed: a blockchain transaction is distributed across the network in minutes and will be processed at any time throughout the day. Cost saving: Existing IoT solutions are expensive because of the high infrastructure and maintenance cost associated with centralized architecture, large server farms, and networking equipment. The total amount of communications that will have to be handled when there are tens of billions of IoT devices will increase those costs substantially. Immutability: Having an immutable ledger is one of the main advantages of blockchain technology. Any changes in the distributed ledger must be verified by most of the network nodes. Therefore, the transactions cannot be altered or deleted easily. Having an immutable ledger for IoT data will increase security and privacy which are the major challenges in this technology and all new technologies. Anonymity: To process the transaction, both buyer and seller use anonymous and unique address numbers which keep their identity private. This feature has been criticized as it increases the use of cryptocurrencies in the illegal online market. However, it could be an advantage if used for other purposes, for example, electoral voting systems.

There is no doubt that integrating blockchain would have many advantages. However, blockchain technology is not a perfect model which has its own flaws and challenges. These challenges can be summarized as follow:

Scalability: Scalability issues in the blockchain might lead to centralization, which is casting a shadow over the future of the cryptocurrency. The blockchain scales poorly as the number of nodes in the network increases. This issue is serious as IoT networks are expected to contain many nodes. Processing Power and Time: The processing power and time needed to achieve encryption for all the objects included in a blockchain system. IoT systems have different types of devices which have very different computing capabilities, and not all of them will be able to run the same encryption algorithms at the required speed. Storage: One of the main benefits of blockchain is that it eliminates the need for a central server to store transactions and device IDs, but the ledger must be stored on the nodes themselves. The distributed ledger will increase in size as time passes and with an increasing number of nodes in the network. As said earlier, IoT devices have low computational resources and very low storage capacity. Lack of skills: blockchain technology is still new. Therefore, a few people have large knowledge and skills about the blockchain, especially in banking. In other applications, there is a widespread lack of understanding of how the blockchain works. The IoT devices exist everywhere, so adopting the blockchain with IoT will be very difficult without public awareness about the Blockchain. Legal and Compliance: The blockchain is a new technology that will have the ability to connect different people from different countries without having any legal or compliance code to follow, which is a serious issue for both manufacturers and service providers. This challenge will be the major barrier to adopting blockchain in many businesses and applications.

Naming and Discovery: The blockchain technology has not been designed for the IoT, meaning that nodes were not meant to find each other in the network. An example is the Bitcoin application in which the IP addresses of some "senders" are embedded within the Bitcoin client and used by nodes to build the network topology. This approach will not work for the IoT as IoT devices will keep moving all the time which will change the topology continuously.

Smart contracts are scripts stored on the blockchain. They are so powerful because of their flexibility. They can encrypt and store data securely, restrict access to data to only the desired parties and then be programmed to utilize the data within a self-executing logical workflow of operations between parties. Smart contracts translate business process into the computational process, greatly improving operational efficiency. Using smart contracts within the IoT systems will provide an efficient way to improve security and Integrity of IoT data.

Regulatory Laws are the procedures created by authorities and local administrative agencies to define legal ways of working with a product or technology within a certain country or region. As said earlier, the blockchain is a new technology which has not any legal or compliance code to follow.

Integrating blockchain with IoT can improve security as it uses use consent of most participants to validate transactions to prevent spoofing and theft. However, IoT devices have low computational resources and storage space that cannot be able to process cryptographic algorithms.

Today, IoT accounts for 5 billion connected devices, and this number will continue to grow and reach 29 billion by 2022 (Panarello et al., 2018). Every device produces and exchanges data on the Internet. In an IoT network, each node is a possible point of failure that can be exploited to launch cyber-attacks such as Distributed Denial-of-Service (DDoS). A system of nodes with several infected devices, acting simultaneously, can collapse quickly. Another concern regards its centralized configuration (typically IoT environment leverages on a central cloud service provider).

Such a central point of failure is a vulnerability, which must be addressed. Another constant and probably one of the most critical threat is data confidentiality and authentication. In the absence of data security, IoT data can be exploited and inappropriately used.

Another challenge for IoT is data integrity. One of the significant applications of IoT is in decision support systems. The data aggregated from the fleet of sensors can be utilized in making timely decisions. Thus, it is essential to protect the system from injection attacks, which try to inject false measures and therefore, affect decision-making. Availability is critical for automated systems like vehicular networks, manufacturing industries, and smart grids which are processing real-time information. Sensor downtime can result in losses varying from monetary to life-threatening situations.

The primary goal of the blockchain is to free people from any form of trust we are now forced to give to intermediaries who regulate and manage a large part of citizens' life. The blockchain is a technology that initially was used to promote commercial transactions (trades) through a new currency that is independent of banks and States, called Bitcoin. This currency is digital, and it is used as a means of exchange accepted by the users involved in a transaction. The strength of this currency or more specifically cryptocurrency is that there is no need for a public authority.

To achieve such a goal, several technologies, and security and cryptographic functions have been exploited. The synergy among these all technologies constitutes the blockchain. People often confuse BC with Bitcoin, but Bitcoin indicates a cryptocurrency that leverages the BC technology to be able to freely and globally circulate without the supervision of a central guarantor (the banks). In other words, Bitcoin is only a financial use case that makes use of this powerful technology.

The blockchain is merely a distributed database system based on consensus rules that allow the transfer of value between entities. There are many distributed systems based on consensus algorithms, but the blockchain is the only one that simultaneously enjoys the following three properties (i) trustless: There is no need to own a certified digital identity.

The involved entities do not know each other, but they can anyhow exchange data without having to know their respective identities, (ii) permissionless: Nobody decides who can or cannot operate on the blockchain network. There are neither permissions nor controllers and (iii) censorship resistant: BC being a network without controllers, where entities trust only the quality of the cryptographic algorithms that govern the operation, anyone can transact on the Blockchain. A transaction, once sent and accepted, cannot be stopped or censored.

Blockchain can be categorized into two types based on its functioning: permissionless and permissioned. A permissioned blockchain limits the actors who can participate in the consensus of the system state. In a permissioned Blockchain, only a limited selection of users has the rights to validate the transactions. It may also restrict access to approved actors who can create smart contracts. On the other hand, permissionless blockchain allows anyone to join the network, participate in the process of block verification to reach a consensus and create smart contracts.

Structure

Blockchain technology is based on four central concepts: (i) a peer-to-peer network: this solution removes the central TTP implying all nodes within the network have the same privileges. In this network, nodes can interact with each other utilizing a pair of private/public keys. The private key is used to sign transactions, and the public key is used as an address to be reachable on the network. (ii) open and distributed ledger: Let's imagine a ledger as an accounting book collecting all the transactions of the network in chronological order.

This data structure is not a centralized entity, but each node has got its own copy of it. The ledger is open and public to everyone. Everyone on the network can see where the asset is and how much asset each one has in his/her account as well. Moreover, each node in the network can decide whether a transaction is valid or not valid. (iii) ledger copies synchronization: In this kind of scenario, where nodes have their own copy of the same ledger, a way to synchronize ledgers across nodes is needed.

To accomplish such a goal, three main steps are required (a) to publicly broadcast the new transactions to the network, (b) to validate the new transactions, and (c) to add the validated transactions to the ledgers. (iv) mining: In a distributed system, there are network delays and not all the nodes receive the transactions (block of transactions, to be precise) at the same time.

In our opinion, blockchain represents the missing piece of a puzzle to solve privacy and reliability flaws in IoT. The intrinsic decentralized, autonomous, and trustless features of the BC make it suitable to be applied in several different scenarios such as "Smart Home," "Smart Industries," "Smart Grid," and "Smart City" as well (Panarello et al., 2018). For example, the blockchain could keep an immutable history of smart devices. Moreover, it may enable an autonomous functioning of intelligent devices, removing the presence of centralized authority or human control using smart contracts.

A data manipulation approach utilizes the blockchain as a secure repository exploiting its features like an immutable public ledger and ability to create a digital trail for verification. A device manipulation approach, on the other hand, utilizes blockchain not just as a secure book of records, but utilizes smart contracts to create autonomous systems capable of making decisions based on business logic. Smart contracts also eliminate the need for a trusted third-party as the rules are executed automatically based on present conditions and rules are publicly available thereby promoting transparency.

When we talk about blockchain, we immediately think about Bitcoin. For this reason, we use Bitcoin as a reference example. The problems that Bitcoin suffers from could be the same for the other blockchain-based system. The first question is: what will happen if the number of nodes taking part in the BC network decrease? If no clients join the network, the Bitcoin network perishes, as the Bitcoin network is alive only if there are nodes online. Therefore, elimination of the Bitcoin network is possible in the case of a global blackout of the Internet. Thus, it may be inferred that it is a very improbable outcome that the Bitcoin network fails because, firstly, the Bitcoin as a cryptocurrency is having tremendous global success, thus people have no reason whatsoever to abandon the network, quite the opposite, given the incentives, and, secondly, a global and permanent Internet blackout, or even an extensive enough partition, has next to zero probability of becoming reality.

However, the number of nodes in the Bitcoin network is decreasing, and the reason is located within technical aspects. The first one is the size of the blockchain. This size is increasing day by day. Today, the whole blockchain weighs around 120 GB, and this makes hard to be a full node of the chain for users having a general-purpose personal computer; the Bitcoin block size is 1 MB (for security reasons), and thus, it can contain around 1700 transactions (Panarello et al., 2018).

Healthcare situations require proof in the areas of patient's healthcare coverage, name, medical history, and prescription. Each question could be answered without the verifier (hospital receptionist, doctor or pharmacist) knowing anything except that the statement you told them was true. This is the power of zero-knowledge proofs.

In 1985, three researchers—Shafi (MIT), Micali (MIT) and Rackoff (University of Toronto)—drafted a paper titled "The Knowledge Complexity of Interactive Proof-Systems" (Nichol, 2016a). Their research introduced first a theorem-proving procedure; a new efficient method of communicating a proof and attempt to convince a verifier of the truth. The idea behind zero-knowledge is that the verifier does not learn anything except that a statement is true.

Zero-Knowledge Proofs

The principles of zero-knowledge proofs have three important properties, such as completeness, soundness and zero-knowledge. Completeness is the verifier which always accepts the proof if the fact is true and both parties follow the protocol; the soundness is the verifier that always rejects the proof if the fact is false, as long as the verifier follows the protocol. The zero-knowledge is the verifier that learns nothing else about the fact being proved from the prover that couldn't be learned without the prover, regardless of following the protocol. The verifier cannot even prove the fact to anyone later.

By leveraging blockchain technologies and smart contracts, we can ensure both parties follow the protocol. Let's apply zero-knowledge proofs to healthcare. As you recall the initial question presented by Shafi, Micali and Rackoff (collectively referred to as SMR) were, "How much knowledge should be communicated for proving a theorem T?" We can restate this question to be patient-centric and healthcare-specific:

1. How much information does a hospital receptionist require on a patient to check the patient into the facility (hospital, provider or other)?

2. What are the minimum pieces of information required to share with a hospital receptionist to demonstrate a patient's proof of valid health insurance?

3. Is it possible to share no personal patient information (think the name, DOB, driver's license), and still have a pharmacist confirm you're able to pick up the prescription with the assurance you're the correct patient?

An interactive and zero-knowledge proof is a protocol between two parties in which one party, called the prover, tries to prove a fact to the other party, called the verifier. This concept is used for identification and authentication. Let's look at our three questions again, now considering the role of the verifier and prover.

1. How much information does a hospital (verifier) receptionist require on a patient (prover) to check the patient into the facility hospital, provider, or other?

2. What are the minimum pieces of information required to share with a hospital receptionist (verifier) to demonstrate a patient's (prover) proof of valid health insurance?

3. Is it possible to share no personal patient information (think the name, DOB, driver's license), and still have a pharmacist (verifier) confirm you're able to pick up the prescription with the assurance you're the correct patient (prover)?

Most zero-knowledge proofs are based on a conversation between the prover and the verifier. This conversation occurs in a series of simulations or interactions, and they progress typically over iterations:
1. Commitment message from the prover.
2. Challenge from the verifier.
3. Response to the challenge from the prover.

Often this protocol repeats for several rounds. Then the verifier eventually decides whether to accept or reject the proof, based on the prover's responses in all the rounds.

The proof can also be performed efficiently by a simulator that has no idea of what the proof is. A patient with an Android phone or an iPhone could use a decentralized application (DApp) to validate patient information during a healthcare event. DApps are the simplest form of a smart contract. This is an agreement involving digital assets between two parties that get automatically redistributed based on the contracted formula. In our case, this contract could release information to the verifier based on our zero-knowledge proof smart contract. At the end of the transaction, the verifier would agree that the statement was true—for example, the patient does have medical coverage required for the visit—but without conveying any information apart from the fact that the statement is indeed true. Proving that one has a knowledge of certain information is trivial if one can directly reveal that information. Knowledge without knowledge—that's the next generation of patient interactions.

Zero-knowledge proofs: a protocol between two parties in which one party, called the prover, tries to prove an absolute fact to the other party, called the verifier. This concept is used for identification and authentication.

State-channels: like a lightning network payment channel, the state or condition is updated between participants but is not published on the blockchain.

Ring signatures or confidential signatures: a crypto method to preserve the privacy of the attributes of a person relying on a smart contract.

Value of Blockchains

The sparkle of state channels goes back to the days of wireless communication. Recently, state channels on Bitcoin were pure payment channels, for two parties to send fee-less micropayments. However, lately, they have been used to rethink interactions on the blockchain, and more specifically off the blockchain. Why keep information (meaning their hashes) off the blockchain? Two primary reasons: cost and speed. In general, states are simply interactions between two parties that can apply to any smart contract. State channels update business processes or transactions states. There often is confusion between state and status; I'll attempt to clarify these terms. While they are similar terms, they are distinctly different and are not interchangeable. The state is a condition, e.g. no implicit ordering or position about one another. Status is a rank, e.g. within a process list.

Nichol (2016b) states that the state channels are comprised of three basic properties:
1. Locking: the on-chain transaction is locked with a smart contract and participants must agree to smart contract terms using one of the various authentication methods.
2. Interacting off-chain: transactions off-chain are linear just like on the chain. The latest interaction overlays previous transactions. However, only the last state or activity makes its way to the Blockchain.
3. Publishing: once the operation is complete, the state channel closes and unlocks the smart contract using the most recent update as the primary transaction (this becomes important if internet connection is lost; at least one node must be online with the latest transaction copy). This process works well with micropayments and can apply to healthcare transactions.

Healthcare's need for state channels, such as blockchain technologies can solve one of the biggest challenges in healthcare: trust. Have you been to the doctor recently? Did you know if the doctor was looking at your most recent medical information or an old copy? Did you bother to ask, or verify he or she was making medical decisions based on the best information—information you validated as the most accurate and up to date? This is where blockchain technologies come up. They're not going to solve problems related to poor data quality or clumsy data entry, but blockchain technologies, when applied to healthcare, can give us back the trust we have lost in the system of care. As health events are written to the blockchain, and the volume of events increases, scalability becomes a challenge. The lightning network inspired much of the discussion of state channels forming off-chain networks: a network of channels. For our purposes, the exact implementation is less important.

The principle presented in a paper titled "The BitCoin Lightning Network: Scalable Off-Chain Instant Payments" achieves Bitcoin scalability using an extensive network of micropayment channels. "If we presume a large network of channels on the Bitcoin blockchain, and all Bitcoin users are participating on this graph by having at least one channel open on the Bitcoin blockchain, it is possible to create a near-infinite amount of transactions inside this network" (Nichol, 2016b).

What if we apply this to a healthcare ecosystem, a network of payers and providers working in collaboration for patients. The healthcare ecosystem becomes a global network that could support near-infinite health events. Picture that for a minute: A global network for healthcare impacting virtually every life in the world. Every life. Now we narrow focus into practical solutions for state channels whether leveraging state channels, sidechains or the like. Let's ideate on two potential applications for healthcare.
1. Post-EHR data validation updates: many providers are frustrated with the frequent significant software updates required for secure and functional electronic health records (EHR) technology. How is the state of the medical data verified post-upgrade? It's not. State channels offer a method to ensure cryptographic proof of data while not bogging down the blockchain.
2. Patient admittance and discharge: many patients spend their entire episode of care at a single facility. Not over their lifetime, but per health event. Then why would we update the blockchain at every activity performed for that patient, during their stay? We could use a state channel to capture that episode of care, opening the smart contract on admission, update the state (and health events) within the state channel, off the Blockchain. Once the patient is discharged, the state channel closes and the smart contract publishes what the patient has conditionally authorized to hit the blockchain (the hash of the collective health events). This process avoids the scalability problem and ensures iterations of the states are not posted in excess to the blockchain.

Verification is about validating the information that one entity (user, company, etc.) makes, which is then agreed upon by the other party that the information pertains to. For example, employee-employer verification relies on whether the employer agrees that an employee is working or has worked for him.

We are seeing a lot of ICOs putting false information on their websites, and since the blockchain space is all about promoting trust and transparency, it seems to our damning that ICOs, particularly, could get away with fake information. Our idea is that making advisory verification a standard process for ICOs to do, would be the first step in trusting the information that we read online. Blockchain, of all industries, should not have to deal with problems of verification and trust—after all, blockchain is made to ensure trust.

One of the ways ICOs try to benefit from fake information is by writing names of people that they claim to be advisors for their company when they are not. They believe that their brand value will go up, from being associated with big-name advisors—and many get away with it because there's no way to check! When a potential investor checks an ICO's website, there is no way for him/her to check whether the claimed information is true or not.

This causes many problems for individuals who are legitimate advisors for other companies—the most important of them being that their name is joined with the fake ICO who claims they are associated with them. If the ICO tanks, or is uncovered to be a fraud, the advisor's name suffers. Along with that, the companies who take advisory from them also suffer—from being associated. Clearly, this is not leading to an ideal situation.

Blockchain-based solutions essentially act as a facilitator between the two parties who are making or verifying a claim. This role of an enabler is played both by the blockchain DApp that lets ICOs list their advisors and showcase them and also by the smart contracts through which we decide the format and the architecture of the solutions, while still keeping the end users in charge of the process. The same technology or framework can then be used to perform all sorts of professional verifications.

Here's how a verification system architecture can be built: User comes in and registers their company on the DApp. The registration of the company requires the user's (personal) ETH address that is used to identify him as the owner of the company. An ETH address is generated for the company that the user downloads as a keystore file (encrypted with a password). The company owner adds advisors—their name and their email address are needed. The owner also pays a fee for the verification. The company owner then interacts with the blockchain to put his advisory claims up on the Blockchain. He has two options: Sign the message that claims his advisors. The DApp writes the transaction to the blockchain and the company owner signs and writes to the Blockchain. The advisor gets an email about an advisory request. He comes to the DApp and either log in or signs up. Once he accepts the advisory, he also has an option to either sign the transaction or sign and write the transaction to the Blockchain. One the transaction is confirmed, anyone can see it as confirmed on the company profile page.

The obvious advantage here is that now, using the Blockchain, one can easily identify a verified advisor. This provides investors with the peace of mind that the ICO they are investing in has legitimate advisors and is not lying. In the world of fake ICOs and frauds, this is invaluable.

How can the end user be able to do this easily? Not all company representatives want to learn the technicalities of the blockchain in order to use the system—particularly individuals from a non-tech background. The solution to this would be to enable the user to sign a message on their ETH address and let the DApp write the transaction on the Blockchain. This way, it becomes easy for the end user to access and utilize technology like the blockchain to their benefit. This is another reason why it's important for a DApp to play agent between the users.

Smart Contracts

What follows from the above is that we have a 'stateless contract' that by itself does not hold any information and only plays the role of a facilitator of transactions (Shankar, 2018). The contract only writes the information to the blockchain and helps define the format of the string that resides in the transaction.

The advantages of having a stateless contract are the speed at which the transaction can be done, plus that the contracts don't increase in size of the data they store and so can perform reliably over time.

What happens when the relationship changes? Editing information in this given paradigm is trivial. All that must be done, is to have a new transaction with the updated details. Since the last block is held to be true, the editing of information is simple. An advisory post can be deleted, for example, by just setting a flag that marks that the previous transaction is invalidated.

The only missing piece and one aspect of the solution mentioned above that is out of the scope of the blockchain ecosystem is that the Blockchain, by itself, does not have any identity management system. This means that while a message can be checked that it was signed by the address that it is claimed to be, we cannot check whether that address is tied to the identity that is claimed to be. This can be done outside the blockchain and that is what companies like Spring Role also do.

There is no doubt that a verification system is required in today's online world. With the volume of information on the Internet increasing exponentially, the amount of fake information is also increasing, and it is becoming increasingly difficult to discern the real from the fake.

The blockchain has a very high potential to disrupt this, and completely turn this problem on its head. At the same time, just the blockchain isn't enough—there need to be efficient and effective platforms, i.e. DApps that play as middlemen to bring this technology to the masses.

The term smart contract dates to 1994, defined by Nick Szabo as a computerized transaction protocol that executes the terms of a contract. The general objectives of smart contract design are to satisfy common contractual conditions (such as payment terms, liens, confidentiality, and even enforcement), minimize exceptions both malicious and accidental, and minimize the need for trusted intermediaries.

Smart contracts extend and leverage blockchain technology. A smart contract is a collection of code and data (sometimes referred to as functions and state) that is deployed using cryptographically signed transactions on the blockchain network (e.g., Ethereum's smart contracts, Hyperledger Fabric's chain-code). The smart contract is executed by nodes within the blockchain network; all nodes that execute the smart contract must derive the same results from the execution, and the results of execution are recorded on the Blockchain.

Blockchain network users can create transactions which send data to public functions offered by a smart contract. The smart contract executes the appropriate method with the user provided data to perform a service. The code, being on the Blockchain, is also tampered evident and tamper resistant and therefore can be used (among other purposes) as a trusted third party. A smart contract can perform calculations, store information, expose properties to reflect a publicly exposed state and, if appropriate, automatically send funds to other accounts. It does not necessarily even have to perform a financial function. For example, the authors of this document have created an Ethereum smart contract that publicly generates trustworthy random numbers. It is important to note that not every blockchain can run smart contracts.

The smart contract code can represent a multi-party transaction, typically in the context of a business process. In a multi-party scenario, the benefit is that this can provide attestable data and transparency that can foster trust, provide insight that can enable better business decisions, reduce costs from reconciliation that exists in traditional business to business applications, and reduce the time to complete a transaction.

Smart contracts must be deterministic, in that given an input they will always produce the same output based on that input. Additionally, all the nodes executing the smart contract must agree on the new state that is obtained after the execution. To achieve this, smart contracts cannot operate on data outside of what is directly passed into it (e.g., smart contracts cannot obtain web services data from within the smart contract—it would need to be passed in as a parameter). Any smart contract which uses data from outside the context of its own system is said to use an Oracle.

For many blockchain implementations, the publishing nodes execute the smart contract code simultaneously when publishing new blocks. There are some blockchain implementations in which there are publishing nodes which do not execute smart contract code but instead validate the results of the nodes that do. For smart contract enabled permissionless blockchain networks (such as Ethereum) the user issuing a transaction to a smart contract will have to pay for the cost of the code execution. There is a limit on how much execution time can be consumed by a call to a smart contract, based on the complexity of the code. If this limit is exceeded, execution stops, and the transaction is discarded. This mechanism not only rewards the publishers for executing the smart contract code but also prevents malicious users from deploying and then accessing smart contracts that will perform a denial of service on the publishing nodes by consuming all resources (e.g., using infinite loops).

For smart contract enabled permissioned blockchain networks, such as those utilizing Hyperledger Fabric's chaincode, there may not be a requirement for users to pay for smart contract code execution. These networks are designed around having known participants, and other methods of preventing bad behavior can be employed (e.g., revoking access).

P2P Encryption

Point-to-Point encryption is being done through third-party solution providers comprising of secure devices, applications and processes that encrypt data from the point of interaction (for example, at the point of swipe or dip) until the data reaches the solution provider's secure decryption environment. The PCI P2PE solution must include all of the following: Secure encryption of payment card data at the point-of-interaction (POI), P2PE-validated application(s) at the point-of-interaction, secure management of encryption and decryption devices, management of the decryption environment and all decrypted account data, and use of secure encryption methodologies and cryptographic key operations, including key generation, distribution, loading/injection, administration and usage.

The P2PE solution provider is a third-party entity (for example, a processor, acquirer, or payment gateway) that has overall responsibility for the design and implementation of a specific P2PE solution and manages P2PE solutions for its merchant customers. The solution provider has overall responsibility for ensuring that all P2PE requirements are met, including any P2PE requirements performed by third-party organizations on behalf of the solution provider (for example, certification authorities and key-injection facilities).

The PCI P2PE Standard contains detailed security requirements and testing procedures for application vendors and providers of P2PE solutions to ensure that their solutions can meet the necessary requirements for the protection of payment card data. Version 1.1 of the P2PE Standard contains security requirements and testing procedures for third-party, hardware-based P2PE solutions. Subsequent releases of the P2PE program will address requirements for securing software-based decryption and key management operations, as well as scenarios where merchants manage their own cryptographic keys. P2PE assessors, such as QSA P2PE and PA-QSA P2PE are qualified by the Council to evaluate P2PE solutions and applications.

The random number is widely used in computer application. What is used commonly in practice is a pseudo-random number generated by the mathematical algorithm. Several useful pseudo-random numbers generating algorithm and random testing methods are discussed. And according to the disadvantage of the traditional algorithm, improvement of pseudo-random number generating algorithm and some new methods to generate real-random number are summarized and analyzed.

The best way to generate random numbers is to use a good physical measurement. Many natural phenomena have such measurement, only if they have some measurable characteristics, and their behaviors are random. The hardware devices for random collection include pulse detector based on ionizing radiation incident, gas discharge tube and capacitors with leakage. The disadvantages of random numbers generation using physical methods are slow, inefficient, the requirement of a dedicated hardware device and non-reproducibility and so on. Another method to generate random numbers is to generate a pseudo-random number which is consistent with the probability distribution by using algorithms. The second method is mostly used in software development.

Commonly used pseudo-random number generation algorithm: Pseudo-random number an accurate random number must be extracted from a variety of physical random events, while cannot be obtained through a specific algorithm. But it is not realistic to equip a dedicated physical device for each computer which needs random numbers. We can generate a pseudo-random number of sequences through some algorithm. Since the algorithm is determinate, the number sequences are not true random numbers with statistic stochasticity. In practice, if the algorithm is so good that the number of sequences generated is in line with some random testing, the numbers can be used as random numbers, called pseudo-random number. The linear congruential method is the most widely used pseudo-random number generation algorithm.

The middle-square method was first suggested by John Von Neumann in 1946. To generate a sequence of ten-digit pseudo-random numbers, a ten-digit starting value is created and squared. The middle ten digits of the result would be the next number in the sequence and returned as the result. This process is then repeated to generate more numbers. In practice, it is not a good method, since its period is usually very short, and it has some crippling weaknesses.

Software implementation of physical methods: The random numbers generated through physical method are truly random. But the requirement of dedicated hardware devices in physical methods results in high cost and low commonality. One acceptable way is to use a variety of random events exist in computer systems as a random source. Through the utilization of these random events or library data which are essentially random provided by some advanced operating systems (such as Linux1.3.30 or higher version), the true random number can get through the software mathematical conversion and processing to the random source.

Physical methods to generate accurate random numbers with the development of computer technology and semiconductor manufacturing technology, it becomes a new direction of research to generate truly random numbers using physical methods with dedicated hardware. The random numbers generated through physical methods are best in randomness and quite well in security. Currently, Intel Corporation and the University of Geneva, Switzerland, as well as State Key Laboratory of Information Security of Graduate School of Chinese Academy of Sciences have developed accurate random number generator based on different theory, respectively. It is predicted that there would be a vast prospect for development for generating true random number through physical methods in the future.

The use of a random number in a variety of computer applications became more and more. The pseudo-random number generated through traditional mathematical algorithm must be tested in various ways before it is used as a random number. A better pseudo-random random numbers sequence could be produced by improving the pseudo-random number generation algorithm. But the new direction of development is to generate truly random numbers through software or hardware device.

Cryptographic Technologies

Two principal types of cryptographic technologies are symmetric key (secret key or private key) cryptography and asymmetric (public key) cryptography. In symmetric key cryptography, both the receiver and sender share a common secret key. In asymmetric key cryptography, the sender and receiver respectively share a public and private key. The public and private keys are related mathematically and, in an ideal case, have the characteristic where an individual, who has the public key, cannot derive the private key.
Because of the amount of computation involved in public key cryptography, the private key is on the order of 1,000 times faster than public key cryptography (Krutz & Vines, 2001).

Symmetric encryption, also referred to as conventional encryption, secret-key, or single-key encryption, was the only type of encryption in use prior to the development of public-key encryption in the late 1970s. It remains by far the most widely used of the two types of encryption.

Symmetric encryption constitutes the universal technique for providing confidentiality with the transmission or storing of data where data encryption standard (DES) and advanced encryption standard (AES) are the two most important of symmetric encryption algorithms. Symmetric encryption is conventional encryption or single-key encryption where its scheme has five ingredients, such as plaintext, encryption algorithm, secret key, ciphertext, and decryption algorithms. The plaintext is the original message fed into the algorithm where the encryption algorithm numerous substitution and plaintext transformations. The secret key is input into the algorithm were the exact replacement or performed conversion by the algorithm depends on the key; the ciphertext is the scrambled message produced as an output that depends on the plaintext and secret keys. Similarly, the decryption algorithms run in reverse by taking the ciphertext and secret key to produce the original plaintext or message. There are two ways to attack symmetric encryption by cryptanalysis and brute force attacks. The cryptanalytic attacks exploit the algorithm characteristics to attempt or deduce the plaintext and key being used whereas for the brute force attack are to try every possible key of the ciphertext until plaintext translation is obtained. The most important symmetric algorithms in the form of block ciphers are DES, Triple DES, and AES; DES takes a plaintext block of 64 bits along with a key of 56 bits to generate a ciphertext block of 64 bits. The triple DES repeat the same process of DES, but three times more using two or three unique keys of 112 or 168 bits whereas AES must be a symmetric block cipher and block length of 128 bits with supporting key lengths of about 128, 192, and 256 bits.

Because of its drawbacks, the triple DES is not a reasonable candidate for long-term use. As a replacement, NIST in 1997 issued a call for proposals for a new AES, which should have a security strength equal to or better than triple DES and significantly improved efficiency. In addition to these general requirements, NIST specified that AES must be a symmetric block cipher with a block length of 128 bits and support for key lengths of 128, 192, and 256 bits; the same 128-bit AES key is used for both integrity and confidentiality. Evaluation criteria included security, computational efficiency, memory requirements, hardware and software suitability, and flexibility. In the first round of evaluation, 15 proposed algorithms were accepted. A second-round narrowed the field to 5 algorithms. NIST completed its evaluation process and published a final standard (FIPS PUB 197) in November of 2001. NIST selected Rijndael as the proposed AES algorithm. AES is now widely available in commercial products. The AES was issued as a federal information processing standard (FIPS 197). It is intended to replace DES and triple DES with an algorithm that is more secure and efficient.

An effective measure is a symmetric encryption using AES or triple DES where the secret key must be protected and only available to the audit trail software and subsequent audit analysis software.

The message authentication and hash functions explain that encryption protects against passive attacks, such as eavesdropping, but it doesn't protect against active attacks like data falsification and transactions where a message or data authentication is required. The message or data authentication allows communicating parties to verify the received information along with stored messages to review its authenticity. The message authentication code (MAC) involves the use of a secret key generating a small block of data where a hash function does not take a secret key as an input. The one-way hash function and secure hash functions are necessary for message authentication and digital signatures. The purpose of a hash function is to generate a fingerprint of a file along with a message where approaches of attacking secure hash functions are cryptanalysis and brute-force attacks. The secure hash algorithm (SHA) constitutes to be the most used of hash functions.

Asymmetric public key encryptions are used for message authentication and key distribution where public key algorithms utilized mathematical functions, and it is not based on a simple operation of bit patterns. There are six ingredients to a public key encryption scheme, such as plaintext, encryption algorithm, public and private key, ciphertext, and decryption algorithm. The plaintext is the readable message; the encryption algorithm performs a transformation on the plaintext, the public and private keys where one is used for encryption and the other for decryption. Similarly, the ciphertext is the scrambled message being produced as output where the decryption algorithm accepts the ciphertext along with the matching of keys to produce the original plaintext. The key used in symmetric encryption is the secret key, and the two keys used in public-key encryption are the public and private keys.

The Diffie-Hellman Key Agreement enables two users to reach a security agreement for a shared secret to be used as a secret key regarding subsequent symmetric encryption of the messages. Digital signatures and key management are used to secure public key distributions, public-key encryption for secret keys distribution, and temporarily use of public-key encryption for message encryption. The use of random and pseudorandom numbers use encryption for various network security applications, such as uniform distribution and independence where the random numbers generate a generation of a sequence of random numbers. Cryptographic applications use algorithmic methods for random number generator that produces a sequence of numbers not statistically random, and if the algorithm is good, then it will pass a series of randomness test to determine pseudorandom numbers (Stallings & Brown, 2015).

Public Key Infrastructure

Public Key Infrastructure (PKI) constitutes a set of hardware, software, people, policies, and procedures that are imperative to create or manage, store, distribute, and revoke the digital certificates, which are based on asymmetric cryptography. The integration of digital signatures and certificates and the other services required for E-commerce is also called PKI where these services provide integrity, access control, confidentiality, authentication, and non-repudiation for electronic transactions. The principal objective for developing a PKI is to enable secure, convenient, and efficient acquisition of public keys.

The PKI includes the following elements:
1. Digital certificates
2. Certificate Authority (CA)
3. Registration authorities
4. Policies and procedures
5. Certificate revocation
6. Non-repudiation support
7. Timestamping
8. Lightweight Directory Access Protocol (LDAP)
9. Security-enabled applications
10. Cross-certification To verify a certificate, you need to know the public key of the signing CA. This could, in turn, be provided in another certificate, signed by a parent CA, with the CA's organized in a hierarchy. Eventually, however, you must reach the top of the hierarchy, and have a copy of the public key for that root CA. The X.509 standard describes a PKI model that originally assumed there would be a single internationally specified hierarchy of government regulated CAs. This did not happen. Instead, current X.509 PKI implementations came with a large list of CAs and their public keys, known as a "trust store." These CAs usually either directly sign "end-user" certificates or sign a small number of Intermediate-CAs that in turn sign "end-user" certificates. Thus, all the hierarchies are very small, and all are equally trusted.

Users and servers that want an automatically verified certificate must acquire it from one of these CAs. Alternatively, they can use either a "self-signed" certificate or a certificate signed by some other CA. However, in both these cases, such certificates will initially be recognized as "untrusted" and the user presented with stark warnings about accepting such certificates, even if they are legitimate.

There are many problems with this model of a PKI, and these have been known for many years. Current implementations suffer from several critical issues. The first is the reliance on the user to make an informed decision when there is a problem verifying a certificate. Unfortunately, it is clear that most users do not understand what a certificate is and why there might be a problem. Hence, they choose to accept a certificate, or not, for reasons that have little to do with their security, which may result in the compromise of their systems. Another critical problem is the assumption that all of the CAs in the "trust store" are equally trusted, equally well managed, and apply equivalent policies. This was dramatically illustrated by the compromise of the Digi-Notar CA in 2011 that resulted in the fraudulent issue of certificates for many well-known organizations.

It is widely believed these were used by the Iranian government to mount a "man-the-middle" attack on the secured communications of many of their citizens. Therefore, the DigiNotar CA keys were removed from the "trust store" in many systems, and the company was declared bankrupt later that year. Another CA, Comodo, was also compromised in 2011, with a small number of fraudulent certificates issued.

A further concern is that different implementation, in the various web browsers and operating systems, use different "trust stores," and hence present different security views to users.

Given these and other issues, several proposals exist to improve the practical handling of X.509 certificates. Some of these recognize that many applications do not require formal linking of a public key to a verified identity. In many web applications, for example, all users really need is to know that if they visit the same secure site and are supplied with a certificate for it, that it is the same site and same key as when they previously visited. This is analogous to ensuring that if you visit the same physical store, you see the same company name and layout and staff as previously. And further, users want to know that it is the same site and the same key as other users in other locations see.

The first of these, confirming continuity in time, can be provided by user's applications keeping a record of certificate details for all sites they visit and checking against these on subsequent visits. Certificate pinning in applications can provide this feature, as is used in Google Chrome. The Firefox "Certificate Patrol" the extension is another example of this approach.

The second, confirming continuity in space, requires the use of a number of widely separated "network notary servers" that keep records of certificates for all sites they view, that can be compared with a certificate provided to the user in any instance. The "Perspectives Project" is a practical implementation of this approach, which may be accessed using the Firefox "Perspectives" plugin. This also verifies the time history of certificates in use, thus providing both desired features for this approach. The "Google Certificate Catalog" and "Google Certificate Transparency" project are other examples of such notary servers.

In either of the above cases, identification of a different certificate and key to that seen at other times or places may well be an indication of attack or other problems. It may also simply be the result of certificates being updated as they approach expiry, or of organizations incorrectly using multiple certificates and keys for the same but replicated server. These latter issues need to be managed by such extensions.

Internet Engineering Task Force (IETF) Public Key Infrastructure X.509 (PKIX) the working group has been the driving force behind setting up a formal (and Inter-Integrated Circuit abbreviated as I2C is a serial bus short distance protocol developed by Philips Semiconductor about two decades ago to enhance communication between the core on the board and various other ICs involved around the core. I2C is a serial communication protocol where data is transferred bit by bit along a single wire, such as the SDA line. The I2C is synchronous and the output of bits is synchronized to the sampling of bits by a clock signal shared between the master and slave.

The most popular serial bus communication protocols available today in the market are, SPI, UART, I2C, CAN, USB, IEE1394, and so on. Philips originally developed I2C for communication between devices inside of a TV set. Examples of simple I2C-compatible devices found in embedded systems include EEPROMs, thermal sensors, and real-time clocks. I2C is also used as a control interface to signal processing devices that have separate, application-specific data interfaces. Philips, National Semiconductor, Xicor, Siemens, and other manufacturers offer hundreds of I2 C-compatible devices. I2C buses can typically reach speeds up to 400 Kbps.

I2C is appropriate for interfacing to devices on a single board and can be stretched across multiple boards inside a closed system. An example is a host CPU on a main embedded board using I2C to communicate with user interface devices located on a separate front panel board. I2C is a two-wire serial bus that uses only two wires, such as serial clock (SCL) and serial data (SDA) where both need to pull up with a resistor to +Vdd. There's no need for chip select or arbitration logic, making it cheap and simple to implement in hardware. The two I2C signals are serial data and serial clock. Together, these signals make it possible to support the serial transmission of 8-bit bytes of data-7-bit device addresses plus control bits-over the two-wire serial bus. In a bind, an I2C slave can hold off the master in the middle of a transaction using what's called clock stretching (the slave keeps SCL pulled low until it's ready to continue). Most of the I2C protocol can also support multiple masters. There may be one or more slaves on the bus. Both masters and slaves can receive and transmit data bytes. Each I2C-compatible hardware slave device comes with a predefined device address, the lower bits of which may be configurable at the board level. The master transmits the device address of the intended slave at the beginning of every transaction. Each slave is responsible for monitoring the bus and responding only to its own address. This addressing scheme limits the number of identical slave devices that can exist on an I2C bus without contention, with the limit set by the number of user-configurable address bits.

Communication in I2C signaling protocol provides device addressing, a read/write flag and a simple acknowledgment mechanism. Other elements of I2C protocol are general call (broadcast) and 10-bit extended addressing. Standard I2C devices operate up to 100 Kbps, while fast-mode devices operate at up to 400 Kbps. Most often, the I2 C master is the CPU or microcontroller in the system. Some microcontrollers even feature hardware to implement the I2C protocol. You can also build an all-software implementation using a pair of general-purpose I/O pins. Since the I2C master controls transaction timing, the bus protocol doesn't impose any real-time constraints on the CPU beyond those of the application. For a fixed I2C, the high and low logic are defined at 3.0 V and 1.5 V. For dependent I2C, these are defined at 0.7Vdd and 0.3Vdd, respectively. The pull-up resistor values required for I2C are typically at 1K for 3.0V of Vdd and 1.6K for 5V of Vdd. Typical operating temperatures are between −40 degrees and +85 degrees Centigrade.

No one questions the fact that technology changes. A quick look at developments in communication, transportation, production, and bio-technologies of today are impressive as compared to the technologies of just ten or twenty-five years ago. The invention of the microprocessor is a key player in many of these technological changes. Today we use personal computers in our classrooms and technology laboratories for teaching and learning. We use them for word processing, database systems, reference work, tutorials, simulations, and to control robotic devices as well as many other applications much the same as people in business and industry use computers. But there may be a "chip" revolution we missed that drives many of the electronic gadgets and devices that we use-the chip revolution of embedded processors and controllers. The diffusion of these specialized microprocessor technologies is almost beyond imagination. From automobile control systems to microwave ovens, microcontroller chips make programmed decisions for us daily.

Automobile microcontrollers manage engine performance and operation, braking, and other safety features. For example, an automobile engine system may have a dozen or more sensors that monitor engine temperature, air flow, fuel mixture, the oxygen level of the engine exhaust, engine speed, and other details to ensure the best performance and minimum engine emissions. Antilock braking systems (ABS) now are included on many automobiles to provide safe controlled stopping in emergency braking situations. Sensors sense the speed of the wheels and control the braking resistance of the individual wheels to prevent skidding. Smart microwave ovens cook by time and temperature according to the type of food and control settings selected.

Even NASA's Mars Rover Sojourner uses this technology for specialized control. Microcontrollers differ from general-purpose microprocessors such as those designed and manufactured by Intel, Motorola, Advanced Micro Devices and others that are used in personal computers. Microcontrollers are "embedded" into electronic products and are virtually transparent to the user. They are controlled by programs embedded into the processor package and may be operated by numeric keypads, sensors, and touch buttons. Processors such as the 8051, 68HC11, 68H005, and 80085 differ from their personal computer microprocessor counterparts in that they include not only a central processor, but also onboard memory (EPROM and EEPROM), input/output control, timers, and other functions. Additionally, special LED or LCD displays may be coupled to the embedded controller to display information about processor actions being executed or status. Examples include displays on video players and recorders, electronic games, and geographic information from a global positioning system (GPS).

In today's world, everything from a small needle to airplane engineering is surrounded by embedded systems. Embedded system technology not only lays the foundation for development but is also acting as backbone for mankind in almost in every area of science, engineering, research, and daily living. The world of embedded systems is mainly surrounded by microcontrollers and microprocessors. To work in the area of Embedded Systems design and development is both interesting and challenging—Interesting in the sense, as everything is getting intelligent, advanced and feature rich day by day and the embedded system's field is progressing by leaps and bounds. But challenging in the way, that resources are very limited in terms of design and implementation. The most important crucial challenges nowadays in front of embedded system engineers are—Which programmer to Use? Which compiler to use for source code development? Which simulator to use to simulate the overall behavior of the system? As every compiler, programmer and simulator have distinct features, so selecting the best one as per one's requirement has always remained a challenge.

Embedded systems are managed by single or multi-processing cores in the form of microcontrollers or digital signal processors (DSPs), field-programmable gate arrays (FPGA) and application-specific integrated circuits (ASIC) and gate arrays. Taking the case of computer systems, all sorts of hardware's like routers, switches, Wi-Fi systems etc. are embedded systems and in normal life, embedded systems are available everywhere from wristwatches to powerful electronic home appliances and from daily use items to power electronic gadgets. The first modern embedded system was Apollo guidance computer invented by Charles Stark Draper at MIT labs. Since then, embedded system technology has grown up by leaps and bounds and embedded systems are becoming cheap in terms of price and getting powerful in terms of processing and multi-functioning capabilities. Basically, embedded systems were developed to perform a specific task as compared to general purpose computers. Embedded systems comprise of tons of small and handy computerized parts and act as a general-purpose machine. In order to enable any embedded machine to perform some task, the most important part required for that functioning is "firmware" which is basically regarded as a program stored on ROM or flash memory chip of the system and can contain small to millions of different sorts of instructions for performing varied tasks. Embedded systems can have GUI or no interface and nowadays most of the standalone machines like ATM etc. have touch screen interface for performing input and output operations.

Embedded system=embedded hardware+embedded software example: Considering an example of ATM machine which comprises of both hardware and software. The hardware consists of Touch Screen, Keyboard, Printer, and Money operating Black Box and in addition to the hardware, it consists of sophisticated cum secured embedded software which acts as Middleware between the User and Hardware. Embedded software is being interacted by the user to control all sorts of operations like money transfer, money withdrawal, password changing and making FD's or any other banking operation etc. Without proper embedded software, an embedded system is of no use. Embedded system (hardware+software) is further divided into two categories: Microprocessor & microcontroller the main difference between microprocessor and Microcontroller is that Microprocessor has the same functionalities as normal computer CPU on a single IC. The microprocessor is regarded as a multipurpose programmable device which takes input from the user, process the data as per the instructions and gives output. Whereas Microcontroller has all parts like CPU, RAM, ROM in-built into it. Microprocessors outperform microcontrollers in terms of performance and processing capabilities but have limitations in terms of cost and size.

Considering the wide applications being developed nowadays which is making everything intelligent cum smart, microcontrollers are playing an efficient role. But no microcontroller is efficient and performance oriented unless combined with an intelligent piece of program code. Time to time, there has come a remarkable change in Microcontroller technology and various types of microcontroller generations have evolved. Starting from 8051 to ARM these days, everything has been changed by microcontrollers. Various microcontrollers like 8051, PIC, AVR, ARM, and ARDUINO along with their various customized boards have come up in the market and has given researchers and industry to take up and develop a wide range of products from daily use to highly sophisticated and reliable operations.

A compiler is system software which performs the task of converting High-Level Language instructions to Machine Level Language instructions. The basic reason behind the use of a compiler to convert the source code in the executable form. If the compiled code can run on a different machine with another type of CPU, operating systems, then the compiler is termed as Cross-Compiler. A program which gets translates from low-level language to high-level one is called "Decompiler". A program which translates between various high-level languages is called source-to-source compiler. A compiler performs various types of operations like lexical analysis, preprocessing, parsing, semantic analysis, code generation and code optimization.

Identity Access Management (IAM)

Security continues to be one of the major challenges in today's world of electronic information. The sharing of electronic information has become crucial to the business's success. The strategies and methods for controlling access to important electronic resources must be implemented to provide security for businesses; therein to facilitate the authentication of users only once to obtain access to multiple resources, the concept of single sign-on (SSO) was introduced. With SSO, users need to sign-on only once per SSO Session. Then, the authenticated user is automatically allowed access to a variety of resources that are within the authorization level of the user. Another security solution many enterprises employ is known as a circle of trust. Precisely, a circle of trust is established among service providers and at least one identity provider. The circle of trust ensures that each service provider and the identity provider know each other's identity and are authenticated with each other (i.e., trust is established between the services providers and the identity provider). Once a user's credentials have been verified and the user has been authenticated by the identity provider, the user is automatically authenticated to and recognized by all service providers within the circle of trust. Frequently, enterprises employ diverse access management technologies and security solutions in response to specific tactical problems. Typically, each of the access management technologies and/or security solutions operate independently, causing an often-inefficient mix of solutions and technologies to be used. IAM for enterprise systems provides a framework and method for authentication of users that simplifies access control management for enterprise systems. Wherein it also provides a method for authentication of a user requesting access to applications of an enterprise system. IAM scalable framework provides a security architecture that is used to provide information security.

IAM makes sure that the right people can access the right services at the right time. IAM manages user identities and provides secure access to devices, IT systems, networks and data for which they are authorized and authenticated. IAM is important for citizens because of the increasing demand for online access to state services has created new security challenges to protect personal and government data. The state government employees use technology in new ways to collaborate with each other, and to access systems and data; IAM is a strong security plan that controls access and security systems. It is a framework that simplifies the management of access to services, implements policy, increases transparency, and integrates enterprise identity management infrastructure.

The IAM features include simplified sign-on, fault-tolerant, redundant system 24/7 self-service password reset and user registration Oracle IAM suite. The IAM also provides benefits including economy of scale, highly reliable service, improved security profile, consistent with enterprise standards, privacy assurance, integration support is available to provide a rapid implementation for your organization, centralized service desk, statewide identity, and identity proofing.

Managing user accounts and privileges—user access management—isn't getting easier. The related "enterprise directory" project has proved to be an elusive goal. As enterprises externalize their business processes over the Internet to customers and trading partners, they have expanded the number and types of users with which they must contend. Accordingly, more users need access to IT resources; platform environments will remain complex and heterogeneous; and Web services are driving the need to manage transactions, as well as user access to IT resources. Thus, enterprises no longer can effectively manage user access to the heterogeneous IT environment (for example, external and internal user identity information repositories, databases, operating systems, and applications) for multiple access purposes, such as business roles, password management rules and business hours access policies. Directories and platform-specific security administration products can't address all the demands of a well-managed and automated security administration function. Therefore, a range of other technologies, including user provisioning and extranet access management (EAM) products, has evolved to address enterprises' growing need for the user account and privilege administration. No product does everything—user account management, privilege management, password management and single sign-on (SSO)—across all platforms and for all application types. A multiproduct implementation is the only way to meet these enterprise requirements. Vendors are addressing this multiproduct approach by delivering IAM product suites. The four "A's" of information security (Witty et al., 2003).

Administration Through Identity Management: IAM solutions solve two main functions: administration and real-time enforcement. Identity management solutions address enterprises' need to administer (create, modify and delete) user accounts, user profiles and corporate policies across the heterogeneous IT environment via a combination of user roles and business rules. Also included as part of administration activities is the capability to abstract and automatically correlate data from HR, customer relationship management and e-mail systems (and other "identity stores"), and from the managed systems. These can be accomplished in a variety of ways, such as in response to a self-service request or self-registration, a line of management request where the manager has a new employee who starts work on a specific date, user needs access to an application, employee termination, change in the HR system, and merger acquisition.

The markets and associated functionalities within identity management are: Password management includes simplified help desk password reset, self-service password reset and password synchronization, including bidirectional synchronization. Password synchronization can be a problem for the information security organization because if the single password is guessed by a hacker, then he or she has access to many more applications than if there was a unique password for each application. This could cause more harm. However, the information security organization's resistance to password synchronization can be overcome if the password formation, history and retention capability of the password management product can provide a stronger password management position enterprise-wide.

User provisioning encompasses user account management (create, modify and delete user accounts and privileges) for access to the heterogeneous IT resources. Enterprises typically use user provisioning to manage internal user access. User provisioning products act as the single point of administration for legacy and client/server application environments, as well as corporate utilities such as e-mail. Most user provisioning products offer password management functionality, delegated administration, a role-based access control model, workflow (a distinguishing feature from earlier consolidated security administration products) and automated fulfillment of the access request. Some products offer synchronization of user profile information among authoritative sources of user identity information.

The instant invention eliminates these limitations, any IoT device will have an IP Address utilizing the BCE and the intended applications, such as IAM and the central server. Limitations are also being identifying by exposing phishing and malware into various components not utilizing BCE or utilizing the Internet or the traditional transactions that are being done today it's a limitation because of the one-sided IoT authentication/authorization.

Two-factor authentication passwords are limitations because they're done within close company's systems utilizing the Internet or utilizing PKI certificates, but without an overall arching environment, such as BCE that does the three-way-handshaking validating and invalidating an IoT device that it has a P2PE MC 64-bit MC (A) and MC (B), and utilizes IAM and central server software. Further references on how it is done today and what are the limitations address IAM for different vendors like Microsoft that utilizes the federation services and active directories, ORACLE IAM, and some other vendors that they're doing IAM at the application layer. The limitations today with all these vendors and IAM frameworks are lacking as they don't identify and authenticate/authorize the actual IoT device, and if they do, it's by some pseudo manner utilizing PKI digital certificates, which is an end to end transaction, not P2PE which is limited by the PKI certificate longevity and time to live till its expiration set its date.

The MC 64-bit MC (A) and MC (B) and software are used for ID identification entities, authentication, IoT, electronic elections, PCI using blockchain for P2PE to be utilized by all entities that process credit card payments including hotels and retail stores.

The MC 64-bit MC (A) and MC (B) and software can be used in servers, such as mail servers, database servers, DNS servers, web servers, file servers, print servers, game servers, and application servers and others. It can be used for commercial drones' registration, commercial research utilizing blockchain security capabilities, telecommunication towers, Mobil devices, and (OnStar) satellite secure communications. It can also be can be used for the automobile industry such as autonomous self-driving and to solve theft cases, agriculture industry such as farming (cows, crops, etc.) using blockchain security capability sensors, Cybersecurity to address security, risk, and compliance.

IAM has been done today utilizing two-factor authentications or using credentials such as login account & password at the authentication stage where authorization is being done at the application layer. The devices are being authenticated in an environment sometimes using PKI digital certificates such as workstation to the server or wireless environments to authenticate smart devices.

The following are some limitations, not exclusively identified. In "the payment card industry data security standard (PCI DSS)" environment at P2PE can be utilized for point to point of sales equipment to do a P2PE transactions utilizing traditional PCI DSS credit card processing networks. The limitations are no authentication and authorization not being at the IoT level.

Metadirectories include user account management (create, modify and delete user accounts and privileges) for access to the authoritative sources of user identity information. Metadirectories also provide data accuracy and precedence for those user identity repositories, as well as synchronizing the user profile information. Historically, Meta directories products have lacked functionality such as password management, role management and workflow, which are standard functions of user provisioning products.

Real-time enforcement is addressed by access management solutions that can enforce, in real time, an access control policy (or policies) for each user of enterprise IT resources. The two information security activities involved in the real-time enforcement process are authentication and authorization. Users must be identified, their identities must be validated, and a decision must be made whether they are authorized to access the requested resource. Some enterprises must perform dynamic authorization to resources based on the status of the user at the time of the access request.

The markets and associated functionality within access management are: Authentication services help identify users and validate their identities. This area contains multiple markets: Directory services store user identity information, include technologies such as LDAP, X.500, relational databases, and others. Virtual directory technologies can be used to ease the administration and real-time authentication problems of user identity information that is being stored in many repositories, each with its own schema and owner. User authentication products, such as public-key infrastructure, tokens, and biometrics, provide multifactor identity validation. SSO products enable a user to access multiple computer platforms or applications after being authenticated with a single password. SSO products support inter-enterprise and intraenterprise SSO for non-Web applications (complex because of the need to manage multiple authentication protocols) and Web applications (simple because of the common authentication token is known as a "cookie"). Federated identity services, which are best defined by the Liberty Alliance and Microsoft Passport, provide a "trusted" authentication environment. The enterprise that is being asked to grant access to the user (the "consumer") can trust the user identity information provided by the user's initial authentication service (the "producer"). Authentication management infrastructure products offer a single "authentication gateway" to target systems. The gateway supports a variety of authentication technologies. It requests the user to provide the appropriate authentication method based on the requirement of the application being accessed.

Enterprise access management is the real-time enforcement for authorization to an IT resource based on access policy. Enterprise access management also comprises multiple markets: Operating-system access enforcement is delivered through products such as RACF, CA-ACF2 and CA-Top Secret for the mainframe, native platform access control services and third-party products for AS/400, Unix, NT and others. Database row and column access are provided by products such as Oracle's Label Security. EAM, also known as Web access management, offers integrated IAM for Web-based applications. Initial implementations focused on external user access. However, the growing use of portals for employee access is also driving demand for EAM solutions. Most products offer self-service password reset, delegated administration (including user self-service), a role-based access control model, workflow and automated fulfillment of the access request.

There is functional overlap in the area of administration for IAM products. IAM products need an interface to manage the product and to add, modify and delete users, as well as some level of delegated administration. User provisioning and EAM products have further overlap in the areas of workflow, role management, delegated administration, and password management. Enterprises are looking for one interface to manage all user access to legacy and client/server applications and Web-enabled applications—regardless of the user's relationship to the enterprise. Thus, vendors in the user provisioning and EAM markets are providing such functionality at an abstracted level that Gartner calls identity administration. Identity administration functionality is provided through a common console that can direct the user provisioning and EAM products to fulfill the access request.

The future of IAM markets are related to the management of user access, and enterprises want to manage user access from a common, integrated facility. Vendors such as IBM/Tivoli, Computer Associates International, Novell, RSA Security, Entrust and Netegrity offer integrated products in the two main areas of IAM: user provisioning and EAM.

Identity theft has become an important concern since a substantial contributing factor is that an individual's social security number and other confidential identifying data are required on many application forms; therein, as a result, individuals may lose control over what is applied for in their names. The existence of the Internet including its growth relates to the existing opportunities for individuals to represent themselves improperly and without authorization acting as other individuals; it can be done by making purchases, obtain credit cards or debit cards, and other purposes. Misrepresentations can be done using stolen social security numbers, bank accounts, personal identifying number, and other confidential documents.

Transport Layer (TLS)

Procedures are available to address the improper use of credit and debit cards, such as a pairing of two tokens may be used to identify a card and by extrapolation the cardholder. Also, with modern chipcards, the chip may contain an encrypted token and the cardholder may supply another token, usually a personal identification number (pin). The combination of these tokens is used by the authorization system to identify the card. It is not possible to say that the proper cardholder is using the card, though, because anyone could have the card and the pin. Nonetheless, this procedure, referred to as Authentication, does, to a significant degree, limit the fraud.

The most notable internet is called the Internet (uppercase letter "I"), a collaboration of hundreds of thousands of interconnected networks. Most end users who want an Internet connection to use the services of Internet service providers (ISPs). The set, or suite, of protocols that control Internet today, is referred to as the TCP/IP protocol suite. The suite is made up of five layers: The application layer enables the user to access the network. It provides support for services such as electronic mail, remote file access, and transfer, browsing the World Wide Web, and so on. The addresses on the application layer are specific to the application programs.

The transport layer is responsible for process-to-process delivery of the entire message; this means that a logical communication is created between the transport layers of the client and the server computer. During the life of the TCP/IP protocol suite, three transport layers protocols have been designed: UDP, TCP, and SCTP.

The user datagram protocol (UDP) is the simplest of all three protocols. UDP does multiplexing and demultiplexing by adding source and destination ports to the packet.

Transmission control protocol (TCP) is a protocol that supports all duties of a transport layer. TCP uses sequence numbers, acknowledgment numbers, and checksums. It also uses buffers at the sender's site.

Stream control transmission protocol (SCTP) is a new protocol that is designed for new services expected from the Internet, such as Internet telephony and video streaming. This protocol combines the advantages of both UDP and TCP. The network layer is responsible for the source-to-destination delivery of a packet, possibly across multiple networks. The Network layer ensures that each packet gets from its point of origin to its destination. In the TCP/IP protocol suite, the main protocol at the network layer is Internet Protocol (IP).

The data-link layer delivers a packet from one node to another. The data-link layer is also responsible for the error and flow control between "hops". It uses physical or MAC address to identify the nodes. The physical layer coordinates the functions required to carry a bit stream over a physical medium. Although the data-link layer is responsible for moving a frame from one node to another, the physical layer is responsible for moving individual bits that enable the frame to reach the next node.

Electronic mail (e-mail) is the most popular application on the Internet. The main protocol used for e-mail is called simple mail transfer protocol (SMTP). Other protocols used for electronic mail are POP and IMAP.

File transfer protocol (FTP) is the standard mechanism for one of the most common tasks on the Internet, copying a file from one computer to another. FTP differs from other client-server application is that it establishes two connections: one for data transfer and one for exchanging control commands.

Database Management System

Data storage traditionally used individual, unrelated files, sometimes called flat files. In the past, each application program in an organization used its own file. For example, in a university, each department might have its own set of files: the record office kept a file about the student information and their grades, the financial aid office kept its own file about students that needed financial aid to continue their education; the scheduling office kept the name of the professors and the courses they were teaching, and the payroll department kept its own file about the whole staff including professors. All of these flat files can be combined in a single entity, the database for the whole university.

A database is a collection of data that is logically, but not necessarily physically, coherent—its various parts can be physically separated. The advantages of a database can be with less redundancy because in a flat-file system there is a lot of redundancy. For example, in a flat file system for a university, the names of professors and students are stored in more than one file. Other advantages of a database would address inconsistency avoidance if the same piece of information is stored in more than one place, then any changes in the data need to occur in all places that data is stored. For instance, if a female student marries and accepts the last name of her husband, the last name of the student needs to be changed in all files that hold information about the student. Lack of care may create inconsistency in the data. Efficiency can be addressed also as an advantage of a database because it is usually more efficient than a flat file system where a piece of information is stored in fewer locations. In a database system, it is easier to maintain data integrity because a piece of data is stored in fewer locations. It is easier to maintain the confidentiality of the information if the storage of data is centralized in one location.

A database management system (DBMS) defines, creates, and maintains a database. The hardware is the physical computer system that allows access to data. For example, the terminals, hard disk, main computer, and workstations are considered parts of the hardware in a DBMS. The software is the actual program that allows users to access, maintain, and update data. In addition, the software controls which user can access which parts of the data in the database. The data in a database is stored physically on the storage devices. In a database, data is a separate entity from the software that accesses it. This separation allows the organization to change the software without having to change the physical data or the way in which it is stored. If an organization decides to use a DBMS, then all the information needed by the organization should be kept together as one entity, to be accessible by the software in the DBMS.

The term users in a DBMS has a broader meaning. We can divide users into two categories: end users and application programs. End users are those humans who can access the database directly to get information. There are two types of end users: database administrator (DBAs) and normal users. Database administrators have the maximum level of privileges and can control other users and their access to the DBMS, grant some of their privileges to somebody else but retain the ability to revoke them at any time. A normal user, on the other hand, can only use part of the database and has limited access. The last component of a DBMS is a set of procedures or rules that should be clearly defined and followed by the users of the database.

The American national standards institute/standards planning and requirements committee (ANSI/SPARC) has established a three-level architecture for a DBMS: internal, conceptual, and external. The internal level determines where data is stored on storage devices. This level deals with low-level access methods and how bytes are transferred to and from storage devices, such as the internal level interacts directly with the hardware.

The conceptual level defines the logical view of the data. The data model is defined on this level, and the main functions of the DBMS, such as queries, are also on this level. The DBMS changes the internal view of data to the external view that users need to see. The conceptual level is an intermediary and frees users from dealing with internal level.

The external level interacts directly with the user (end users or application programs). It changes the data coming from the conceptual level to a format and view that is familiar to the users.

Traditionally, three types of database model were defined: hierarchical, network, and relational. In the hierarchical model, data is organized as an inverted tree, each entity has only one parent but can have several children.

In the network database model, the entities are organized in a graph, in which some entities can be accessed through several paths. There is no hierarchy.

In the relational model, data is organized in two-dimensional tables called relations, there is no hierarchical or network structure imposed on the data. In the relational database management system (RDBMS), the data is represented as a set of relations. A relation has the following features: name, attributes, and tuples. In a relational database, we can define several operations to create new relations based on existing ones. We mentioned nine operations in the context of the database query language SQL (structured query language): insert, delete, update, select, project, join, union, intersection, and difference.

The design of a database, for example for an organization, is often a lengthy task that can only be done through a step-by-step process. The first step often involves interviewing potential users of the database to collect the information that needs to be stored. The second step is to build an Entity-Relationship Model (ERM) that defines the entities for which information must be maintained. The next step is to build relations based on the ERM. Normalization is the process by which a given set of relations are transformed into a new set of relations with a more solid structure.

Normalization is required to allow any relation in the database to be represented, to allow a query language such as SQL to use powerful retrieval operations composed of atomic operations, to remove anomalies in insertion, deletion, and updating, and to reduce the need for restructuring the database as new data types are to be added. The relational database is not the only model of the database in use today. The other two common models have distributed databases and object-oriented databases. The distributed database model is not a new model but is based on the relational model. However, the data is stored on several computers that communicate through the Internet or a private wide area network. Each computer on site maintains either part of the database or the whole database. In other words, data is fragmented, with each fragment stored at one site, or data is replicated at each site.

An object-oriented database tries to keep the advantages of the relational model and at the same time allows applications to access structured data. In an object-oriented database, objects and their relations are defined. In addition, each object can have attributes that can be expressed as fields. For example, in an organization, one could define object types for employee, department, and customer. The employee class could define the attributes of an employee object (first name, last name, social security number, salary, and so on) and how they can be accessed. The department object could define the attributes of the department and how they can be accessed. In addition, the database could create a relationship between an employee object and department object to denote that employee works in that department.

PRIOR ART

US Patent Application Publication US 2017/0279620 A1 (2017) to Kravitz teaches a system and method for internet of things (IoT) security and management: System and method for establishing a secure communication between a plurality of Internet of Things (IoT) devices, includes provisioning a first and a second IoT devices by providing a unique identification, a digital identity token and a cryptographic key to each of the first and second IoT devices; authenticating the second IoT device by the first IoT device; inviting the second IoT device by the first IoT device to establish a communication line with the first IoT device; establishing a secure communication line between the first IoT device and the second IoT device by authenticating the communication line between the first IoT device and the second IoT device and issuing a digital certificate to the communication line between the first IoT device and the second IoT device; establishing secure communication lines between the first IoT device, the second IoT device and a plurality of more devices; and grouping the first IoT device, the second IoT device and the plurality of more devices into different groups based on a predetermined criteria.

The instant invention has the MC (A) and the MC (B) embedded on the device which is inserted in the IoT device; hence the IoT device generates a P2PE using a higher Encryption Algorithm of AES-SEA 512-bit key to communicate with the PKI server AES 2048 key where in sequence, the PKI server AES 2048 key places the PKI certificates on the device to communicate with secure channels to the IAM, central server, and the central server database passing the information to its central server database registering the IoT devices in a very secure way using encryption protocols. At that point, the device registers in the IAM, central server, and the central server database that communicate with the blockchain ecosystem to register all these devices using the prover and the verified protocols protecting the content that has proprietary and confidentiality information through the ZKP protocol together with DApp in the blockchain ecosystem taught by the instant invention. Kravitz teaches a system and method which do not use the combined system of P2PE, IAM, and BCE where the communication between the devices are not handled by the central server and the central server database as described in the instant invention, in which it is used independently by Kravitz system and methods. Kravitz system and methods does not have the highest level of encryption, blockchain dimensions to secure and track devices in the BCE, and the combination of these aspects as it is taught by the instant invention.

US Patent Application Publication US 2017/0302663 A1 (2017) to Nainar teaches a blockchain based IoT device Identity verification and anomaly detection. The focus of the invention is in a device in a network that receives a network registration request from a particular node; wherein the network registration request comprises information about a particular node. Then, the device causes validation of the information about such particular node via comparison of the information about the particular node to a distributed Blockchain; therein includes information about the particular node including one, and more other nodes. Consequently, the device causes an update to the blockchain based on the information about the particular node; wherein the device uses the updated block to control behavior of the particular node and the one, and more other nodes. Nainar does make use of the distributed blockchain based IoT device Identity verification and anomaly detection. However, blockchain based IoT that received a network registration request, validation, and distributed blockchain updates of Nainar does not bear a relationship and use of validation improved of credentials utilizing ZKP and DAPP protocols and complex MC (A) and MC (B) capable of generating higher encryption levels of AES-SEA 512-bit key being taught by the instant invention.

US Patent Application Publication US 2017/0345019 A1 (2017) to Radocchia teaches an open registry for internet of things. An identity system for the Internet of Things (IOT) that enables users and machines to identify, authenticate and interact with products and collectibles without relying on a third-party-controlled authentication service. The system includes wireless tamperproof tags coupled to products and an open registry database where a chain of ownership of the items is able to be stored. The open registry enables public access to the item identity and data combined with item registration anonymity.

The instant invention does not bear any relationship to the Radocchia identity system because a USB P2PE device is employed along with a complex MC (A) and MC (B) which generates an AES-SEA 512-bit key algorithm to provide P2PE between the IoT device to a central server database that communicates into BCE utilizing ZKP Protocol and DApp; therein utilizing the prover and verifier to establish a protection in the communication such as the content of those devices. Radocchia uses an open registry environment with minimum security to identify information in IoT devices where its system does not make use of IAM to authenticate the IoT devices and authorized them via BCE communicating in a secure manner improving the security of the IoTs, and the environment as being taught by the instant invention.

US Patent Application Publication US 2018/0183610 A1 (2018) to Kravitz teaches a secure communication of IoT devices for vehicles. Method for establishing secure communication between a plurality of IoT devices in one or more vehicles include: provisioning the plurality of IoT devices by providing a unique identification, a digital identity token and a cryptographic key to each of the plurality of IoT devices; establishing a secure communication line between the plurality of IoT devices by authenticating respective communication lines between respective IoT devices and issuing a digital certificate to the respective communication lines; grouping the plurality of IoT devices into different groups based on a predetermined criteria; and including a group membership for a group of the different groups in an attribute certificate indicating group characterization.

The Kravitz method does not use the same AES-SEA 512-bit key encryption, generation, and strength of the master private key of the MC (A) and MC (B) methods and systems that are enforced by the instant invention using P2PE to the MC (A) and MC (B) in the device to generate its own identity using high levels of AES-SEA 512-bit key encryption where communications are enciphered to the IAM where the IoT gets its own PKI certificate, and from there goes to the central server and to the central server database, which collects the information to provide a unique identity; hence the ZKP protocol next to the DApp communication channels stable in the connection to the blockchain ecosystem where the verifier and prover make the protection of confidential information without relieving it, establishing an identity in the blockchain ecosystem to communicate with the device 1 or more devices within the blockchain ecosystem, which differs from Kravitz's methods. The Kravitz methods does not make use of the combined system of P2PE, INA, BCE, system architecture functionality, and roadmap of how to combine these components of the instant invention. The instant invention teaches a system combined and not a system separately having a complex system hardware architecture and software with levels of complexity of combined systems of P2PE, IAM, and BCE which does not bear any relationship with Kravitz's methods.

US Patent Application Publication US 2018/0254905 A1 (2018) to Chun teaches an IoT-based things management system and method using block-chain authentication. An Internet of Things (IoT)-based thing management system using block chain authentication wherein unit nodes connect to each other through a wire and/or wireless communication network, things connect to each other in each of the unit nodes, and control instructions for causing the things to operate are mutually authenticated by the unit nodes to confirm the validity of the instructions; each of the unit nodes includes: a plurality of things which connect to the wire and/or wireless communication network, each of the things performing individual functions separately; and a core which includes n block chain having n blocks recording operation histories of the things thereon, the blocks being linked one after another in the form of a chain, and the core generating public keys and private keys based on the n block chain and providing the generated keys to each of the things, wherein one of the things includes a controller which has a list of public keys provided by the core, each of the public keys is unique to each of the things, the controller sends a control instruction with the controller's private key combined thereto, to a thing of which a public key is selected by the controller from the list of the public keys, so as to control operations of the thing based on the sent control instruction, and the thing sends the controller a response signal with the thing's private key combined thereto in response to the control instruction and performs an operation according to the control instruction.

The instant invention begins with P2PE device in a way that generates a high level of algorithm encryption of AES-SEA 512-bit key which gets the PKI keys of the PKI server AES 2048 key, while IoT devices that Chun mentions, list their own public keys communicating independently. In our invention, we use IAM to manage the IoT devices and obtain their information using the Blockchain Ecosystem to validate the IoT devices and communicate between them which were validated within the blockchain ecosystem. Chun does not use the same AES-SEA 512-bit key algorithm, IAM, central server, central server database, ZKP, and DApp protocols taught by the instant invention.

US Patent Application Publication US 2018/0330348 A1 (2018) to Uhr teaches a method for paying cost of IoT device based on blockchain, and server, service providing device, and digital wallet using the same. A method for a payment for an Internet of Things (IoT) device is provided. The method includes steps of: a payment supporting server (a) on condition that the payment supporting server has registered certificates of the IoT device, a service providing device, and a digital wallet, and manages corresponding blockchain transaction IDs and link information, if a billing transaction is acquired, validating the billing transaction including identification information on the service providing device and the IoT device, a billing detail, and a signature value; (b) acquiring identification information on the digital wallet corresponding to the billing transaction from the blockchain database; and (c) (i) paying the billing detail using the digital wallet, (ii) registering a payment result including a payment detail in the blockchain database and managing its blockchain transaction ID, and (iii) transmitting the payment result to the service providing device, the IoT device, and the digital wallet.

The instant invention utilizes MC (A) and MC (B) which generates the AES-SEA 512-bit key algorithm to establish a P2PE communication between the IoT device to the PKI Server 2048 key, central server, and central server database gathering information from the IoT device such as the MAC address, serial number, and IOS; therein establishing an identity for these devices and registering them as valid into the central server database to communicate with the BCE via ZKP protocol, DApp to approve, and verify the IoT device going back to the central server database to check if its valid. And if another device is not part of the BCE, its marked as not valid. Uhr methods does not employ the same use of the AES-SEA 512-bit key, BCE, ZKP, and DApp being taught by the instant invention.

US Patent Application Publication US 2018/0337769 A1 (2018) to Gleichauf teaches blockchain for securing and/or managing IoT network-type infrastructure. Briefly, example methods, apparatuses, and/or articles of manufacture are disclosed that may be implemented, in whole or in part, using one or more Internet of Things devices to facilitate and/or support one or more operations and/or techniques for a blockchain for securing and/or managing IoT network-type infrastructure, such as implemented in connection with one or more computing and/or communication networks and/or protocols.

The instant invention utilizes MC (A) and MC (B) in a P2PE device that is inserted into an IoT to established P2PE communication to the PKI server AES 2048 key for encrypted communication and secured channels to the central server, central server database; therein the IoT critical information such as MAC address, serial number, and IOS is being registered into the central server database along with the PKI certificates from the PKI server AES 2048 key where communications to the BCE is established through ZKP protocols and DApp communication channels. This ensures that the identity and authentication of the IoT is established by going back to the central server database where the IoT is already being validated and approved as part of the BCE. Gleichauf blockchain for securing and/or managing IoT network-type infrastructure does not bear any relationship being taught by the instant invention.

US Patent Application Publication US 2019/0013948 A1 (2019) to Mercuri teaches an Internet of Things (IoT) blockchain interface system facilitates receiving and deploying events from an IoT gateway to a blockchain using the event stack. The system also provides an interface between events that may affect objects on the blockchain from IoT sensors. The system also serves to authenticate IoT events such as sensor data.

The instant invention utilizes a P2PE device comprising of MC (A) and MC (B) to generate a higher encryption level of AES-SEA 512-bit key which is inserted into an IoT establishing a P2PE communication to the PKI server AES 2048 key; therein the certificates are being established and the communication channels are secured connected to the central server database where the information such as MAC address, serial number, and IOS are collected from the IoT. Mercuri IoT blockchain interface system does not employ the use of the same AES-SEA 512-bit key, complex microcontrollers, BCE prover and verified through ZKP protocols, and data being pass to the IAM via DApp being taught by the instant invention.

US Patent Application Publication US 2019/0036711 A1 (2019) to Qiu teaches a method, apparatus, and electronic device for communication between blockchain nodes, and method, apparatus, and electronic device for blockchain-based certificate management. A first communication request including a digital certificate of a first node sent from the first node in a blockchain is received at a second node in the blockchain, where the digital certificate of the first node is stored in the blockchain. Certificate validity information stored in the blockchain and associated with the nodes in the blockchain is accessed by the second node based on the first communication request, where the certificate validity information reflects the validity status information of digital certificates of the nodes in the blockchain. A verification of whether the digital certificate of the first node is valid is performed by the second node based on the first communication request and the accessed certificate validity information. A communication connection to the first node is established by the second node in response to verifying that the digital certificate of the first node is valid.

Qiu methods, apparatus, and electronic devices communications with blockchain nodes does not bear any relationship within the instant invention that employs a complex combination of MC (A) and MC (B) to generate a higher encryption algorithm of AES-SEA 512-bit key; therein once is inserted into an IoT, the IoT communicates with the PKI server AES 2048 key on a P2P2E to obtain the certificates passing information into the central server database, such as MAC address, serial number, and IOS to establish an identity into the IAM. Then, the central server database communicates with the BCE which passes information, such as the identity of the IoT including PKI certificates being already validated, and the communication takes place between the central server database to BCE via ZKP and DApp protocols to the verifier and the prover of the IoT; therein a secure communication back to the central server database is established to check the certificates and the validation of the IoT which concludes the identity of the IoT at that point.

US Patent Application Publication US 2019/0036906 A1 (2019) to Biyani teaches a system and method for IoT security. An architecture for a security frame work based on blockchain specifications for an access manager including a software development kit (SDK) and an application programming interface (API) is described. The access manager insures only authorized entities can be integrated in the managed security framework environment. Only authorized applications can access a resource. From a security perspective, the Access Manager enables horizontal security between a data provider and a data consumer. The security protocols insure confidentiality, integrity of the messages and peer authentication based on blockchain security. For the privacy perspective, it is important to dissociate the security roles. For example, it is important that data can only be received by allowed entities. All technical components (gateways, proxies . . . ) used to transport data shall not have access to the data. This principle insures data cannot be retrieved and used by entities without user controls.

The instant invention utilizes Microchip microcontrollers having complex MC (A) and MC (B) in a P2PE device which is inserted into an IoT to generate an AES-SEA 512-bit key; therein the IoT communicates securely to the PKI server AES 2048 key utilizing P2PE. The central server database is populated with the IoT information such as MAC address, serial number, and IOS along with the PKI certificates. This done to establish an identity of the IoT at that point where the central server, central server database communicates to BCE via ZKP and DApp protocols; therein ensures secure communication utilizing the prover and verifier to established communications and validations of the IoT identities by not revealing confidential information and private information that are being passed underneath the IoT devices, which are registered and validated in the central server databases using the BCE. Biyani's system and method for IoT security does not employ or bear any relationship being taught by the instant invention.

With respect to the prior art as is known to the within applicants, U.S. Pat. No. 9,635,000 B1 (2017) to Muftic teaches a blockchain identity management system based on public identities ledger using an identity management system (IDMS) based on the concept of peer-to-peer protocols and the public identities ledger that support user security, privacy, and anonymity for their identity and transaction data. The focus of the invention is on using cryptographic mechanisms, peer-to-peer protocols, and global, distributed, append-only public identities ledgers to protect identities, to perform all identity management functions, and to support identity claims.

In conclusion, the essence of the blockchain in the Bitcoin system is to make available and to guarantee the correctness of all transactions in the system and to provide the mechanisms to validate their correctness. Interpreting these two features formally and applying them to an IDMS leads to the conclusions that (a) the identities of individual entities can be included in the blockchain and thus be available to the entire community, and (b) identities and their blocks should be hashed and signed based on proof-of-work by miners, so that their content is guaranteed. However, such a formal approach has no significant advantages. First, the distribution of identities is not an essential problem for any IDMS. Second, the integrity of attribute values can be guaranteed by using standard cryptographic algorithms. And third, miners cannot solve the key problem of any IDMS: binding of identity attributes to real-world persons. Therefore, an innovative solution must address and eliminate these issues and introduce additional features that offer clear benefits. The system proposed in this invention performs its functions as truly peer-to-peer transactions without any third parties and without the requirement to place the trust in any component of the system. As such, the proposed system is an IDMS based on the concept of the public identities ledger. The resources of the system (identities) are strongly protected, maintained, and distributed only by the consent of their owners. The system provides full security, privacy, and anonymity of user identities. Such an IDMS represents the backbone of infrastructure supporting applications that require security, privacy, and anonymity for their users, transactions, and data. However, Muftic does not make use of IoT for security privacy and anonymity of IoT identities used by the instant invention.

WIPO Publication No. 107103252 (2017) to Zhang teaches a data assessing control method based on blockchain. A data assessing control method on a blockchain, mainly comprises with the steps that data of all users can be only accessed through users and agents, any third party who wants to access user data must send requests to the agents so that the third party can conduct accessing as the identity of the agents; the data assessing method based on the blockchain is used for designing a data sharing and accessing control system based on a large data environment. The instant invention utilizes blockchain to relate the technical information from the IoT device using P2PE, therein to the central server via the IAM platform; the IoT devices and the data can be access via the IAM method application and it can be identifying, confirmed for validation, and controls.

US Patent Application Publication US 2018/0288022 A1 (2018) to Madisetti teaches a method and system for identity and access management for blockchain interoperability. Madisetti relates to blockchain networks that can be either public or private. Public blockchain networks are free and open to all and any user can create an account, participate in the consensus mechanism on a public blockchain, and view all the transactions on the network. Private blockchain networks are usually controlled and operated by a single organization and only the users within the organization can view the transactions. Public blockchain networks are usually unpermissioned or permissionless, as any node can participate in the consensus process. Some public blockchain networks adopt a permissioned model where the consensus process is controlled by a pre-selected set of nodes. Private blockchain networks usually adopt the permissioned model. While public blockchain networks can be considered as fully decentralized, private blockchain networks are partially decentralized. Organizations can have multiple private blockchain networks where each network is dedicated to a specific use case, department, or business vertical. The blockchain networks within an organization may be created either using the same blockchain platform technology or with different platforms and technologies. On each blockchain network, a user can create multiple externally owned accounts (EOAs). Each EOA has a public-private key pair associated with it. The account address is derived from the public key. When a new EOA is created, a key file is created which has the public and private keys associated with the account. The private key is encrypted with the password, which is provided while creating the account. For sending transactions to other accounts, the private key and the account password are required.

Other Information of Interest

Existing blockchain platforms lack identity management beyond the blockchain accounts and there is no way to know if two blockchain accounts belong to the same person. Blockchain applications can be prone to Sybil attacks where the attacker can create a large number of pseudonymous identities and then use them to gain a large influence on the network. In existing Blockchain platforms, there is no way to securely link a blockchain account to a real-user. Prior art linking blockchain accounts to real users is based on knowing your customer (KYC) processes that require the user to provide KYC documents such as a government-issued identity card (such as passport or driving license). The KYC processes require manual verification by the platform or application team. When using multiple private and/or permissioned blockchain networks within a single organization, there is no way for a user to work on multiple blockchain networks while maintaining the same identity. For multiple blockchain networks within an organization or different applications deployed on the same blockchain network, existing solutions require the KYC process to be completed separately either for each blockchain network or for each application. Mostly, it is related to a method of generating wallets for discrete blockchain networks comprising receiving a primary seed, generating an enhanced hierarchical deterministic wallet, comprising deriving an enhanced parent public key and an enhanced parent private key from the primary seed, and performing an identity registration and certification procedure for the enhanced hierarchical deterministic wallet.

The instant invention relates to the verification and the confirmation of the IoT Identity and not the user identity as it is being taught by Madisetti. Also, the instant invention confirms upon the IoT Identity which generates a combination timestamp certificates that will be shared within the other IoT to verify the IoTs ownership via a contract using the blockchain. Further, this will be a combination between the complex MC (A) and MC (B) and the digital certificates to verify the IoT devices. Further, the instant invention does not utilized wallets as it is being described by Madisetti for generating public key, private key pairs; the instant invention employs the AES-SEA 512-bit key and MC (A) and MC (B) to generate the private master key for identity and registration of the IoT devices and certification procedures.

U.S. Pat. No. 9,531,712 (2016) to Barnett teaches systems and methods for decryption of payloads configured for decrypting thousands of transactions per second, wherein the systems and methods are scalable, such that many thousands of transactions can be processed per second upon replicating particular architectural components. The focus of the invention relates generally to P2PE and management of P2PE systems to protect cardholder data integrity in the event of a breach through PCI-validated P2PE. PCI-validated P2PE renders any potential cardholder data useless and void of value in the event of a data theft because the cardholder data cannot be decrypted. The systems and methods of Barnett does not make use of the same AES-SEA 512-bit key algorithm, MC 64-bit MC (A) and MC (B) methods, and system as is taught by the within invention.

U.S. Pat. No. 10,044,686 (2018) to Barnett teaches systems and methods for decryption as a service via a hardware security module; wherein generally relates P2PE and management of P2PE systems. The focus of the invention relates generally to management of encryption processes, management of encryption devices, validation handling of encryption devices (including P2PE devices), and managing, assigning, and reporting state changes of encryption devices. The instant invention have a method for decryption for Point-to-Point not as a service, but actually on the hardware security models, such as the MC (A) and MC (B), therein executing P2PE with thousands and thousands of transactions to verified, not just for the PCI credit cards, but also to check the payloads and the encryption decryption of service via MC (A) and MC (B) and verification of the IoT via the blockchain ecosystem, which is not addressed by Barnett. The instant invention also includes a method on an encrypted Point to Point utilizing hardware, payloads via blockchain to verified transmissions and transactions, such as PCI credit cards and IoT to IoT verification. The systems and methods for decryption using for P2PE of Barnett bear no relationship to that taught by the instant invention. Barnett systems and methods do not make use of the MC 64-bit MC (A) and MC (B) methods, AES-SEA 512-bit key algorithms, BCE, IAM, and central server.

REFERENCES CITED

Non-U.S. Patent Documents

Atlam, H. F., Alenezi, A., Alassafi, M. O., & Wills, G. B. (2018). Blockchain with internet of things: Benefits, challenges, and future directions. *International Journal of Intelligent Systems and Applications*, 10(6), 40. doi: http://dx.doi.org/10.5815/ijisa.2018.06.05

Deal, Walter F., I., II. (1998). Cool chips: Microcontrollers and robots. The Technology Teacher, 58(3), 29.

Dworkin, M. J. (2015). *SHA-3 standard: Permutation-based hash and extendable-output functions* (No. Federal Inf. Process. Stds. (NIST FIPS)-202).

Forouzan, B. A., & Mosharraf, F. (2008). *Foundations of computer science* (2nd ed.). Cengage Learning EMEA.

Krutz, R. L, & Vines, R. D. (2001). *The CISSP prep guide: Mastering the ten domains of computer security*. New York: John Wiley & Sons.

Li, Y. F., & Zhao, Q. F. (2010). Analysis and improvement of random number generating algorithm. *Applied Mechanics and Materials*, 34-35, 153. doi: http://dx.doi.org/10.4028/www.scientific.net/AMM.34-35.153

Michigan State University. (2009). Inter-integrated circuit (I2C). Retrieved from https://www.egr.msu.edu/classes/ece480/capstone/fall09/group03/AN_hemm anur.pdf Microchip Technology. (2018). ATSAM4E16C. Retrieved from https://www.microchip.com/wwwproducts/en/ATSAM4E16C Nayyar, A. (2016). An encyclopedia coverage of compiler's, programmer's & simulator's for 8051, PIC, AVR, ARM, arduino embedded technologies. International Journal of Reconfigurable and Embedded Systems, 5(1), http://iaes-journal.com/online/index.php/IJRES/issue/archive.

Nichol, P. B. (2016a). Interactive and zero-knowledge proofs for better patient interactions with Blockchain technology. Cio, Retrieved from http://proxy.stu.edu:2048/login?url=https://search.proquest.com/docview/1815 889128?accountid=14129

Nichol, P. B. (2016b). State channels linked to Blockchains will solve the scalability problem for healthcare. Cio, Retrieved from http://proxy.stu.edu:2048/login?url=https://search.proquest.com/docview/1824 790072?accountid=14129

Panarello, A., Tapas, N., Merlino, G., Longo, F., & Puliafito, A. (2018). Blockchain and IoT integration: A systematic survey. *Sensors*, 18(8), 2575. doi: http://dx.doi.org/10.3390/s18082575

PCI Security Standards Council. (2012). Payment card industry (PCI) point-to-point encryption (P2PE). Retrieved from https://www.pcisecuritystandards.org/documents/P2PE_v1_1_FAQs_Aug201 2.pdf Shankar, S. (2018). Blockchain: Advisory verification tech. Dataquest, Retrieved from http://proxy.stu.edu:2048/login?url=https://search.proquest.com/docview/2084 340633?accountid=14129

Stallings, W., & Brown, L. (2015). *Computer security: principles and practice* (3rd ed.). Boston: Pearson.

The Office of Enterprise Technology State of Minnesota. (n.d.). Identity and access management services. Retrieved from https://mn.gov/mnit/images/SRV_SEC_IAM_OV.pdf Witty, R. J., Allan, A., Enck, J., & Wagner, R. (2003). Identity and access management defined. Research Study SPA-21-3430, Gartner. Google Scholar.

Yaga, D., Mell, P., Roby, N., & Scarfone, K. (2018). Blockchain technology overview. Draft NISTIR, 8202.

U.S. PATENT DOCUMENTS

| | | |
|---|---|---|
| 9,531,712 B2 | December 2016 | Barnett |
| 9,635,000 B1 | April 2017 | Muftic |
| 10,044,686 B2 | August 2018 | Barnett |
| US 2017/0279620 A1 | September 2017 | Kravitz |
| US 2017/0302663 A1 | October 2017 | Nainar |
| US 2017/0345019 A1 | November 2017 | Radocchia |
| US 2018/0183610 A1 | June 2018 | Kravitz |
| US 2018/0254905 A1 | September 2018 | Chun |
| US 2018/0288022 A1 | October 2018 | Madisetti |
| US 2018/0330348 A1 | November 2018 | Uhr |
| US 2018/0337769 A1 | November 2018 | Gleichauf |
| US 2019/0013948 A1 | January 2019 | Mercuri |
| US 2019/0036711 A1 | January 2019 | Qiu |
| US 2019/0036906 A1 | January 2019 | Biyani |

FOREIGN PATENT DOCUMENTS

| | | |
|---|---|---|
| WIPO Publication No. 107103252 | August 2017 | Zhang |

SUMMARY OF THE INVENTION

The present invention includes a MC 64-bit method of MC (A) and MC (B) having an advanced encryption standards (AES) and a strong encryption algorithm (SEA) of 512-bit key utilizing the blockchain ecosystem (BCE), IoT identity to validate transactions between the authentication, and identity of the IoT devices. The MC 64-bit MC (A) and MC (B) also includes with a real-time randomly validation symmetrical key utilizing pseudorandom numbers. The MC 64-bit MC (A) and MC (B) further includes its own fingerprint identity IOS to finger the blockchain environment in gathering information from each device that becomes registered in the BCE. The MC 64-bit MC (A) and MC (B) includes a serial number and fingerprint unique to each device sending data into the central server. The MC 64-bit MC (A) and MC (B) embedded in a device to authenticate that device into the central server, therein having a central server database to track IoT devices to keep the database with all MC entries and validations. Mostly, the central server identifies if any of these IoT devices fall off the BCE by sending an output: IAM blockchain device not valid; thereby gathering the data and creating an identity for devices to be IAM blockchain device valid.

The IAM blockchain software identifies IoT devices as part of the BCE. To be part of the BCE, every device must be registered and validated through the IAM blockchain software and the central server. Once a device becomes part of the BCE, all the transactions is from P2PE. P2PE is the most secure transaction because one cannot intercept it. The present invention teaches a P2PE utilizing the MC 64-bit MC (A) and MC (B) including: a MC 64-bit MC (A) and MC (B) communicates with the IAM blockchain software and central server to track all registered and non-registered IoT devices. The MC is embedded into the electronics of a docking mechanism to be used as retrofitting. The IAM blockchain software utilizing the BCE sends a signal to the central server to communicate with a Machine 1 and The Machine 1 sends a signal to the central server to engage in communication. The central server checks the identity of all devices that are part of the BCE and validates Machine 1 with an output: IAM blockchain device valid. The MC 64-bit of MC (A) and MC (B) device runs more securely with a different way to communicate more efficiently than how it's done today.

Once the encryption AES 256-bit key is generated in the MC (A) and the encryption AES 256-bit key is generated in MC (B), the communication between the MC (A) and MC (B) will generate the AES-SEA 512-bit key with 10 bits; the pseudo random number process can be modified using a time based to be programmed with a timer which has an input of the clock frequency to generate an unpredictable real time randomly symmetrical key encryption in rounds of 10 bits. The MC (A) and MC (B) can be programmed in a master mode and slave mode using the method in the source code of the flash memory 1024 Kbytes The present invention teaches a P2PE utilizing the MC 64-bit including with MC (A) and MC (B) to communicate with the novel IAM blockchain software and central server database to track all registered and non-registered IoT devices in the BCE.

An object of the invention is to provide a MC 64-bit also including with MC (A) and MC (B) having a novel SEA of 512-bit Key to produce a real-time randomly validation symmetrical key utilizing pseudorandom numbers for secure IoT device communication and P2PE.

Another object of the invention is to provide a method for MC 64-bit of MC (A) and MC (B) to communicate securely with the central server.

It is a further object of the invention to provide a system, inclusive of a novel MC 64-bit of MC (A) and MC (B) circuit hardware for the practice of the above method.

It is yet further object to provide a method and system of the above type by which the BCE, IAM blockchain software, and central server validate transactions between the authentication, and identity of the IoT devices; therein using AES-SEA 512-bit key and AES 2048 algorithm key to generate PKI certifications for validation, authentication, and authorization through the BCE.

It is a still further object of the invention to provide a method, system, and device of the above type, by which inventive MC 64-bit of MC (A) and MC (B) and novel AES-SEA of 512-bit key facilitates a real-time randomly validation asymmetrical key, sending data into the central server and The IAM blockchain software to authenticate each device, track IoT devices, MC entries, and validations.

Definitions Used Herein

"Advanced encryption standard (AES)" means a symmetric-key block cipher that uses block size and cipher key of 128 bits.

"Algorithm" means the logical steps necessary to solve a problem with a computer.

"American National Standards Institute (ANSI)" means an organization that cerates standards in programming languages, electrical specifications, communication protocols, and so on.

"Application layer" means the seventh layer in the TCP/IP model: provides access to network services.

"Asymmetric-key cryptography" means a type of cryptography that uses two different keys: a public key for encryption and a private key for decryption.

"Asymmetric-key encryption" means an encryption using a public key.

"Bit" means an acronym for binary digit. In a computer, basic storage unit with a value of either 0 or 1.

"Blockchain" means distributed digital ledgers of cryptographically signed transactions that are grouped into blocks. Each block is cryptographically linked to the previous one (making it tamper evident) after validation and undergoing a consensus decision. As new blocks are added, older blocks become more difficult to modify (creating tamper resistance). New blocks are replicated across copies of the ledger within the network, and any conflicts are resolved automatically using established rules.

"Block data" means the portion of a block that contains a set of validated transactions and ledger events.

"Block header" means the portion of a block that contains information about the block itself (block metadata), typically including a timestamp, a hash representation of the block data, the hash of the previous block's header, and a cryptographic nonce (if needed).

"Block" means a data structure containing a block header and block data.

"Bus" means the physical channel that links hardware components in a computer: the shared physical medium used in a bus-topology network.

"Cipher" means a cryptographic transformation that operates on characters or bits.

"Compilation" means the process of translating the whole source program written in a high-level language into machine language before executing the program.

"C language" means a procedural language developed by Dennis Ritchie.

"Compiler" means system software that converts a source program into executable object code: traditionally associated with high-level languages.

"Computer language" means any of the syntactical languages used to write programs for computers, such as machine language, assembly language, C, COBOL, and FORTRAN.

"Confidentiality" means a security goal that defines procedures to hide information from an unauthorized entity.

"Constant" means a data value that cannot change during the execution of the program. Contrast with variable.

"Control bus" means the bus that carries information between computer components.

"Cryptographic hash function" means a function that creates a message digest from a message.

"Cryptographic nonce" means an arbitrary number that is used once.

"Cryptography" means a science and art of transforming messages to make the secure and immune to attack.

"Data bus" means the bus inside a computer used to carry data between components.

"Data confidentiality" means a security service designed to protect data from disclosure attacks, snooping, and traffic analysis.

"Database" means a collection of organized information.

"Database management system (DBMS)" means a program or a set of programs that manipulates a database.

"Database model" means a model that defines the logical design of data.

"Decipher" means to undo the encipherment process and make the message readable.

"Digital signature" means a method used to authenticate the sender of a message and to preserve the integrity of its data.

"Distributed database" means a database in which data is stored on several computers.

"Encipher" means to make the message unintelligible to all but the intended recipients.

"Encryption" means converting a message into a form that is unreadable unless decrypted.

"Erasable programmable read-only memory (EPROM)" means programmable read-only memory that can be programmed. Erasing EPROM requires removing it from the computer.

"Hash chain" means an append-only data structure where data is bundled into data blocks that include a hash of the previous data block's data within the newest data block. This data structure provides evidence of tampering because any modification to a data block will change the hash digest recorded by the following data block.

"Hash digest" means the output of a hash function (e.g., hash(data)=digest).

"IOS" (formerly iPhone OS) is a mobile operating system created and developed by Apple Inc. exclusively for its hardware. It is the operating system that presently powers many of the company's mobile devices, including the iPhone, iPad, and iPod Touch.

"Ledger" means a collection of transactions recorded chronologically.

"Integrated circuit" means transistors, wiring, and other components on a single chip.

"I2C" means Inter-Integrated Circuit, abbreviated as I2C is a serial bus short distance protocol developed by Philips Semiconductor about two decades ago to enhance communication between the core on the board and various other ICs involved around the core.

"Internet" means the global internet that uses the TCP/IP protocol suite.

"Ledger" means a record of transactions.

"Linux" means an operating system developed by Linus Torvalds to make UNIX more efficient when run on an Intel microprocessor.

"MAC address" means a MAC (Media Access Control) address referred to as a hardware address and physical address, is an ID code that's assigned to a network adapter and any device with built-in networking capability, such as a printer.

"Merkle tree" means a data structure where the data is hashed and combined until there is a singular root hash that represents the entire structure.

"Method" means a function in an object-oriented language.

"Operating system" means the software that controls the computing environment and provides an interface to the user.

"Output data" means the results of running a computer program.

"Parent" means a tree or graph node with one or more child nodes.

"Private key" means one of the two keys used in public key encryption.

"Public key infrastructure" means a system of processes, technologies, and policies that allows you to encrypt and sign data. You can issue digital certificates that authenticate the identity of users, devices, or services.

"P2PE" means a combination of secure devices, applications, and processes that encrypt data from the point of interaction (for example, at the point of swipe) until the data reaches the solution provider's secure decryption environment.

"Public key" means one of the keys in a public key encryption, revealed to the public.

"Public key encryption" means an encryption method using two keys, private and public. The private key is kept secret, the public key is revealed.

"Public key certificate" means a certificate that binds an entity to its public key.

"Smart contract" means a collection of code and data (sometimes referred to as functions and state) that is deployed using cryptographically signed transactions on the Blockchain network. The smart contract is executed by nodes within the Blockchain network; all nodes must derive the same results for the execution, and the results of execution are recorded on the Blockchain.

"Secure Hash Algorithm (SHA)" means a hashing algorithm used in many blockchain technologies with an output size of 256 bits (SHA-256). Many computers support this algorithm in hardware, making it fast to compute. SHA-512/256 offer the same set of digest lengths, the digest lengths in FIFS-approved hash functions are 160, 224, 384, and 512 bits.

"Structured Query Language (SQL)" means a database language that includes statements for database definition, manipulation, and control.

"Subalgorithm" means a part of an algorithm that is independently written and is executed when called inside the algorithm.

"Symmetric-key cryptography" means a type of cryptography in which a single secret key is used for both encryption and decryption.

"Symmetric key encryption" means encryption using a symmetric-key cipher.

"TCP/IP protocol suite" means a five-layer protocol suite that defines the exchange of transmission across the Internet.

"Transaction" means a recording of a transfer of assets (digital currency, units of inventory, etc.) between parties.

"Zero-knowledge authentication" means, the claimant does not reveal anything that might endanger the confidentiality of the secret. The claimant proves to the verifier that they know a secret, without revealing it.

"Zero-knowledge proof" means a protocol between two parties in which one party, called the prover, tries to prove a particular fact to the other party, called the verifier. This concept is used for identification and authentication.

BRIEF DESCRIPTION OF THE DRAWINGS

FIG. 41, shows a view of an example for the registration and validation for the IAM of the IoT device.

DETAILED DESCRIPTION OF THE INVENTION

The MC 64-bit MC (A) and MC (B) 16 comprising with the Atmel® SMART SAM4E series of flash microcontrollers are based on the high-performance 32-bit ARM® Cortex®-M4 RISC processor, a floating-point unit (FPU), and cryptography feature of AES 256-bit key algorithm compliant with FIPS Publication 197. The MC 64-bit MC (A) and MC (B) 16 operates at a maximum speed of 120 MHz and features up to 1024 Kbytes of flash, 2 Kbytes of cache memory and up to 128 Kbytes of SRAM; therein the SAM4E offers a rich set of advanced connectivity peripherals including 10/100 Mbps Ethernet MAC supporting IEEE 1588 and dual CAN. With a single precision FPU, advanced analog features, as well as a full set of timing and control functions, the SAM4E is the ideal solution for industrial automation, home and building control, machine-to-machine communications, automotive aftermarket and energy management applications.

The MC 64-bit MC (A) and MC (B) 16 comprises with the peripheral set, wherein includes a full-speed USB device port with embedded transceiver, a 10/100 Mbps Ethernet MAC supporting IEEE 1588, a high-speed MCI for SDIO/SD/MMC, an external bus interface featuring a static memory controller providing connection to SRAM, PSRAM, NOR flash, LCD module and NAND flash.

Further, the MC 64-bit MC (A) and MC (B) 16 includes a parallel I/O capture mode for camera interface, hardware acceleration for AES256, 2 USARTs, 2 UARTs, 2 TWIs, 3 SPIs, as well as a 4-channel PWM, 3 three-channel general-purpose 32-bit timers with stepper motor and quadrature decoder logic support, a low-power RTC, a low-power RTT, 256-bit general purpose backup registers, 2 analog front end interfaces (16-bit ADC, DAC, MUX and PGA), one 12-bit DAC (2-channel), and an analog comparator.

The MC 64-bit MC (A) and MC (B) 16 comprises with the SAM4E devices having three software-selectable low-power modes, such as sleep, wait and backup. In sleep mode, the processor is stopped while all other functions can be kept running. In wait mode, all clocks and functions are stopped but some peripherals can be configured to wake up the system based on predefined conditions. The real-time event management allows peripherals to receive, react to and send events in active and sleep modes without processor intervention.

Figure 1:
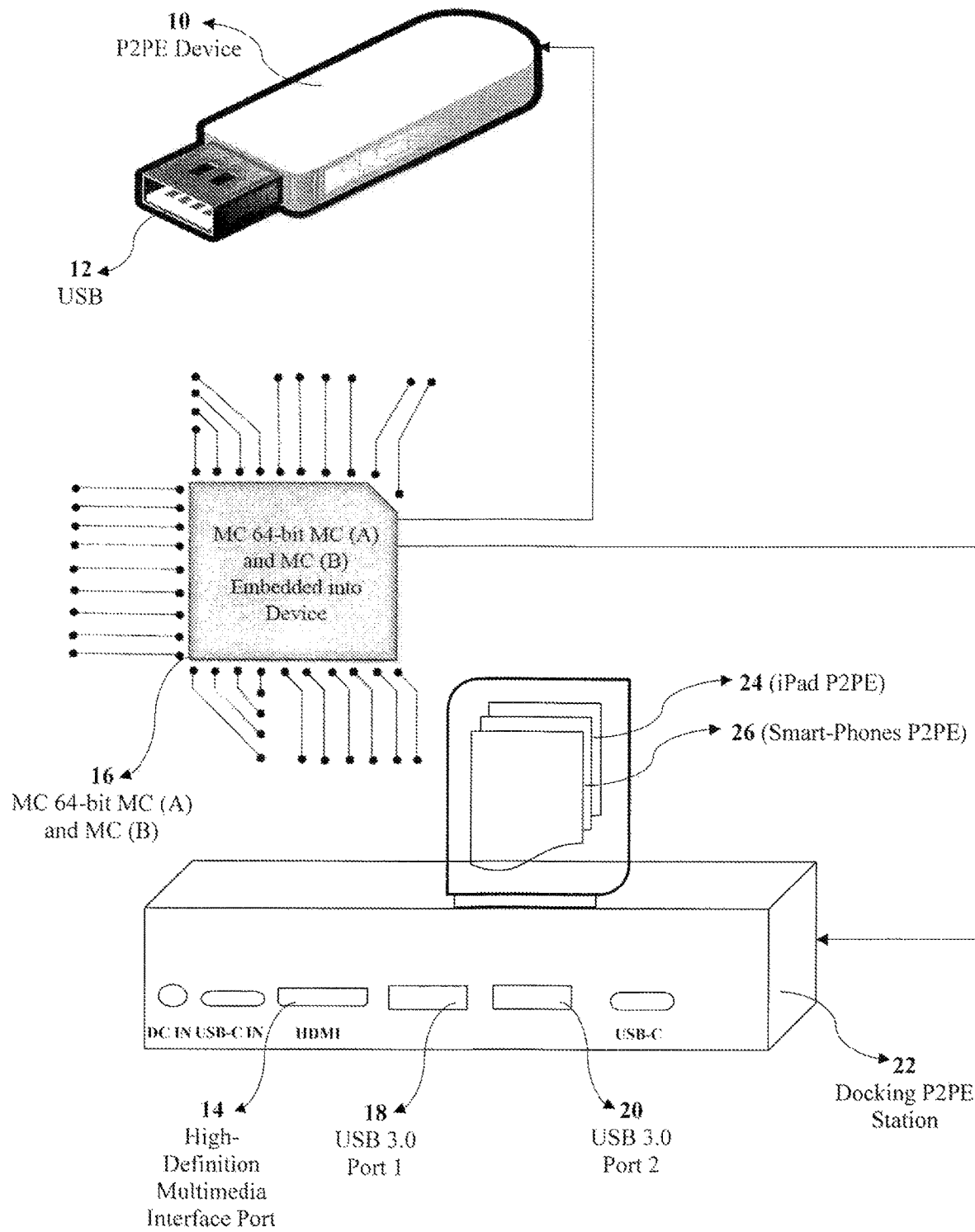
FIG. 1 shows a schematic view of the MC 64-bit MC (A) and MC (B) device embedded into the electronics of a docking P2PE station used as retrofitting by the USB port and IoT devices associated therewith.

As shown in FIG. 1, shows 10 P2PE device having a USB connector 12, therein the docking P2PE station 22 with USB port 18, USB port 20, and HDMI port 14; the MC 64-bit MC (A) and MC (B) 16 resides in the docking station so when you dock an IoT device such as an iPad 24 and smart-phones 26 into the docking P2PE station 22; therein the MC 64-bit MC (A) and MC (B) 16 encrypted devices, the transactions are being P2PE right from there all the way back to the blockchain and back to the host.

Figure 2A:
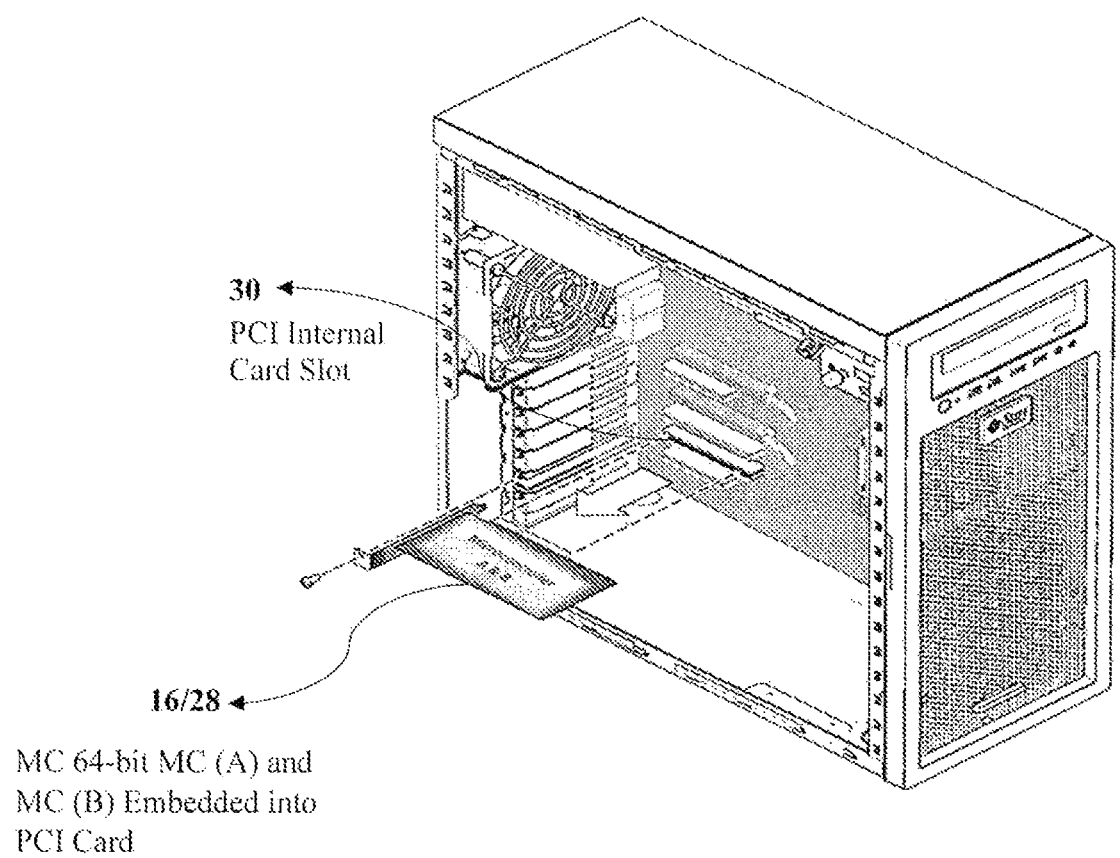
FIG. 2A shows a computer console view of the MC 64-bit MC (A) and MC (B) PCI Card embedded and slot insertion.

As shown in FIG. 2A, shows 16/28 MC 64-bit MC (A) and MC (B) embedded in the PCI card and inserted into the 30 PCI internal card slot of a computer console.

A PCI card is a parallel bus synchronous to a single bus clock; therein attached devices take form of an integrated circuit fitted on the motherboard, such as planar device and expansion card that fits into the 30 PCI internal card slot.

Figure 2B:
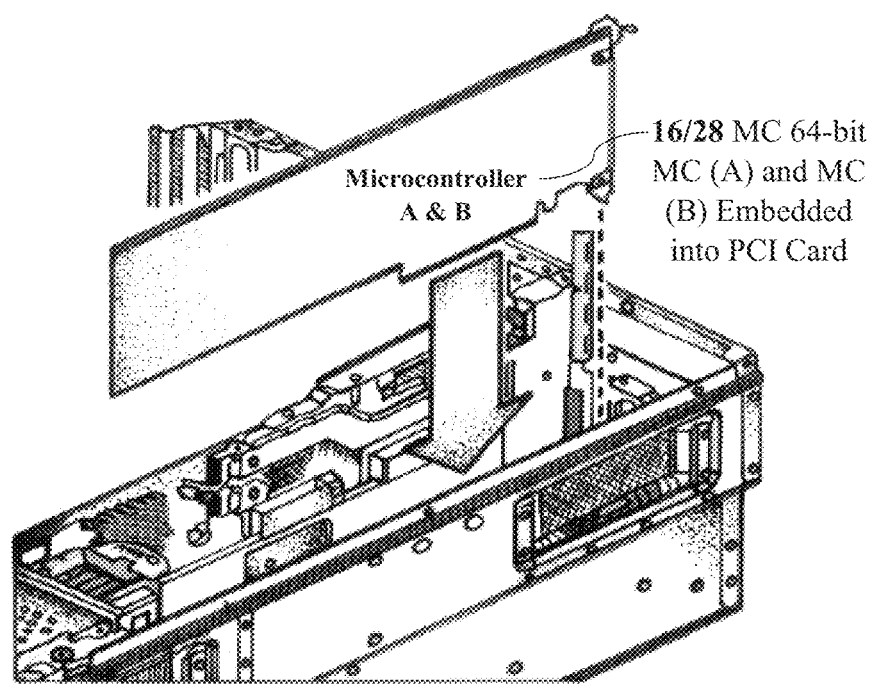
FIG. 2B shows another view of the computer console of the MC 64-bit MC (A) and MC (B) PCI card embedded and slot insertion.

As shown in FIG. 2B, shows 16/28 MC 64-bit MC (A) and MC (B) embedded in the PCI card and inserted into the 30 PCI internal card slot seen in another view of the computer console.

Figure 3:
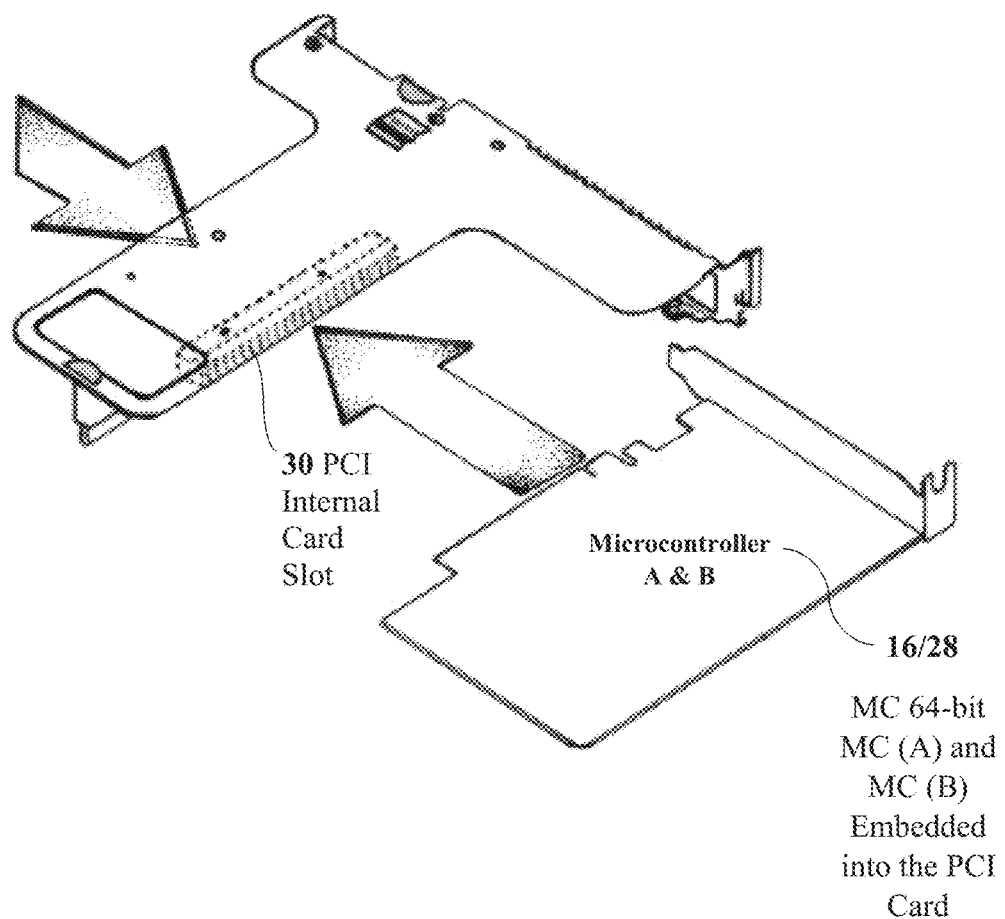
FIG. 3 shows a view of an adapter used for retrofitting for the embedded MC 64-bit MC (A) and MC (B) into the PCI and slot insertion.

As shown in FIG. 3, shows 32 the adapter for retrofitting purposes for the MC 64-bit MC (A) and MC (B) 16/28 which is embedded in the PCI card; therein inserted into the 30 PCI internal card slot of where the 32 adapter is located. The PCI standard can be used in various shapes of connectors; PCI wireless cards can be connected directly to the motherboard of a computer via a 30 PCI internal card slot. It can be related to the bus technology using basic PCI protocols to transfer data at 132-megabytes per second.

Figure 4:
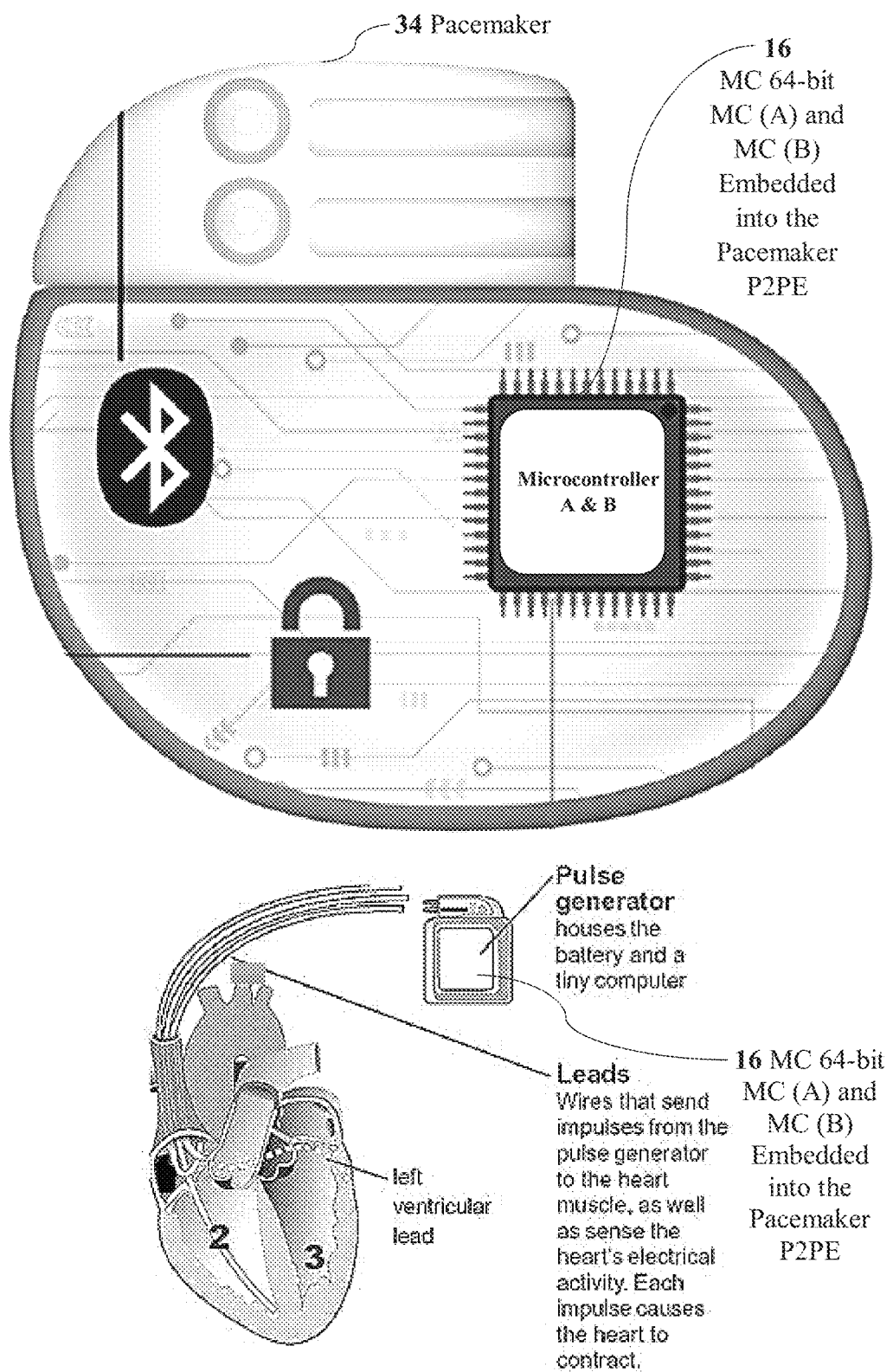
FIG. 4 shows a view of a MC 64-bit MC (A) and MC (B) embedded into the pacemaker device.

As shown in FIG. 4, shows the pacemaker device 34 and the 16 MC 64-bit MC (A) and MC (B) embedded into the 34 pacemaker P2PE; therein showing a different view of the pulse generator that houses the battery, and a tiny computer. The pacemaker 34 lead wires send impulses from the pulse generator to the heart muscle, senses the heart electrical activity, and causes the heart to contract by each impulse.

Figure 5:
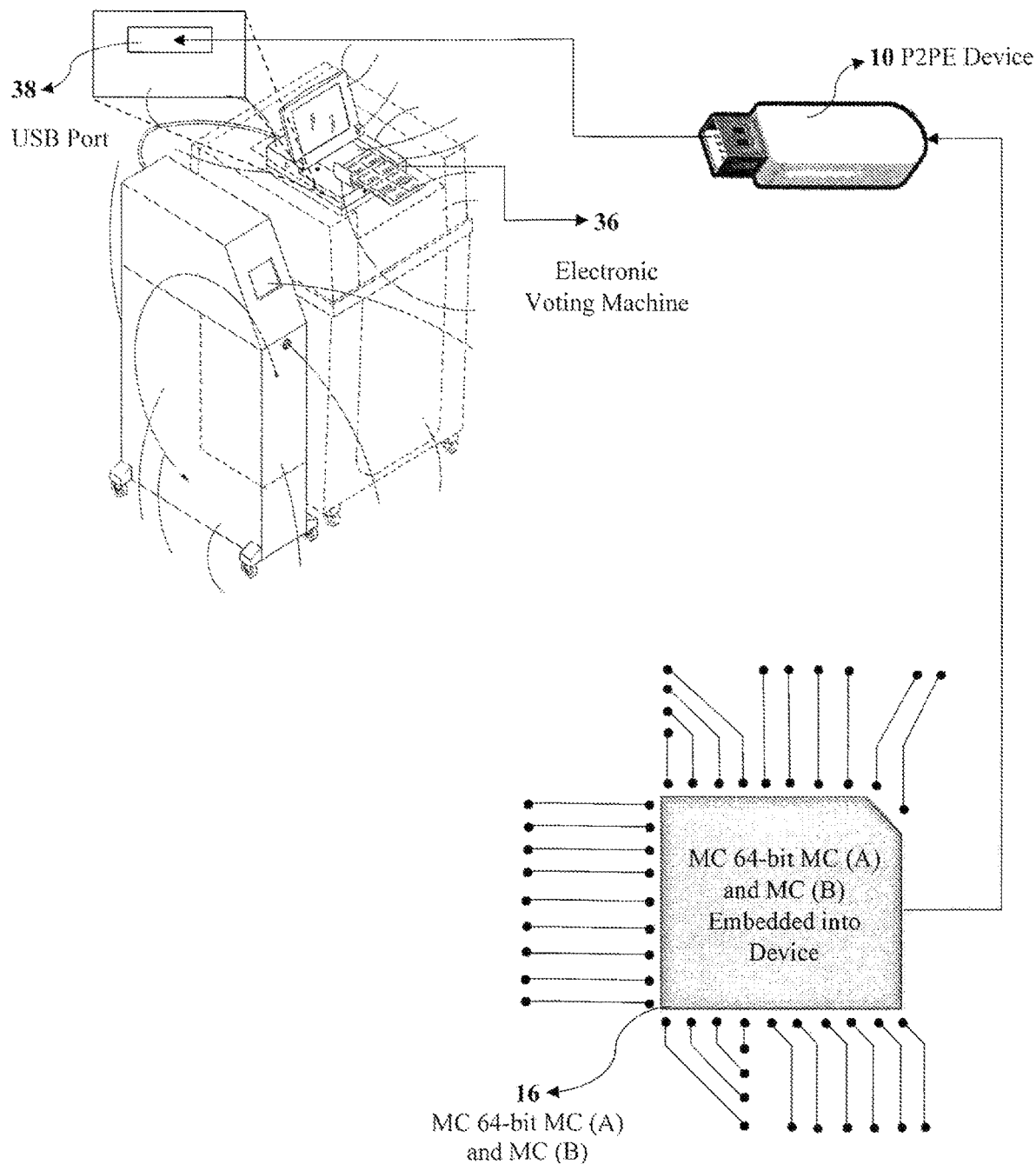
FIG. 5 shows a vertical view of an electronic voting machine with retrofitting capabilities via USB port for P2PE device.

As shown in FIG. 5, shows an electronic voting machine 36, having a USB port 38 that allows USB devices to be connected using communication protocols allowing two and more entities of a communication system to communicate with each other and transfer digital data over USB cables. Therein, 10 P2PE device is inserted for P2PE communication using USB port 38 of the electronic voting machine 36; wherein 16 MC 64-bit MC (A) and MC (B) is embedded into the 10 P2PE device.

Figure 6:
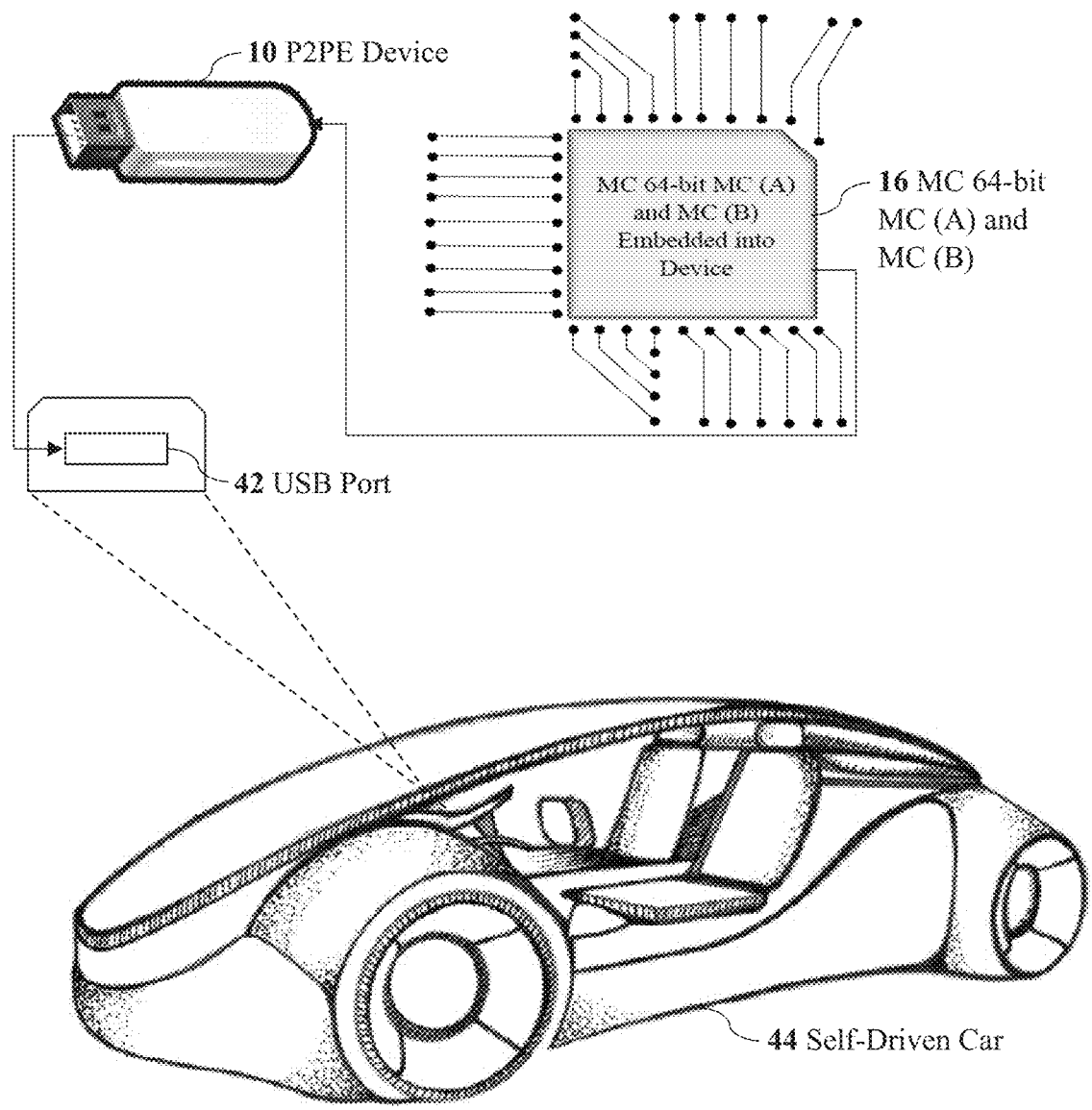
FIG. 6 shows a horizontal and top view of the self-driven car design with retrofitting capabilities via USB port for P2PE device.

As shown in FIG. 6, shows a self-driven car 44 in several views with 42 USB port capacity to facilitate the protocol communication through 10 P2PE device, therein 16 MC 64-bit MC (A) and MC (B) is embedded into the 10 P2PE device and inserted into the USB port 42 of the self-driven car 44.

Figure 7:
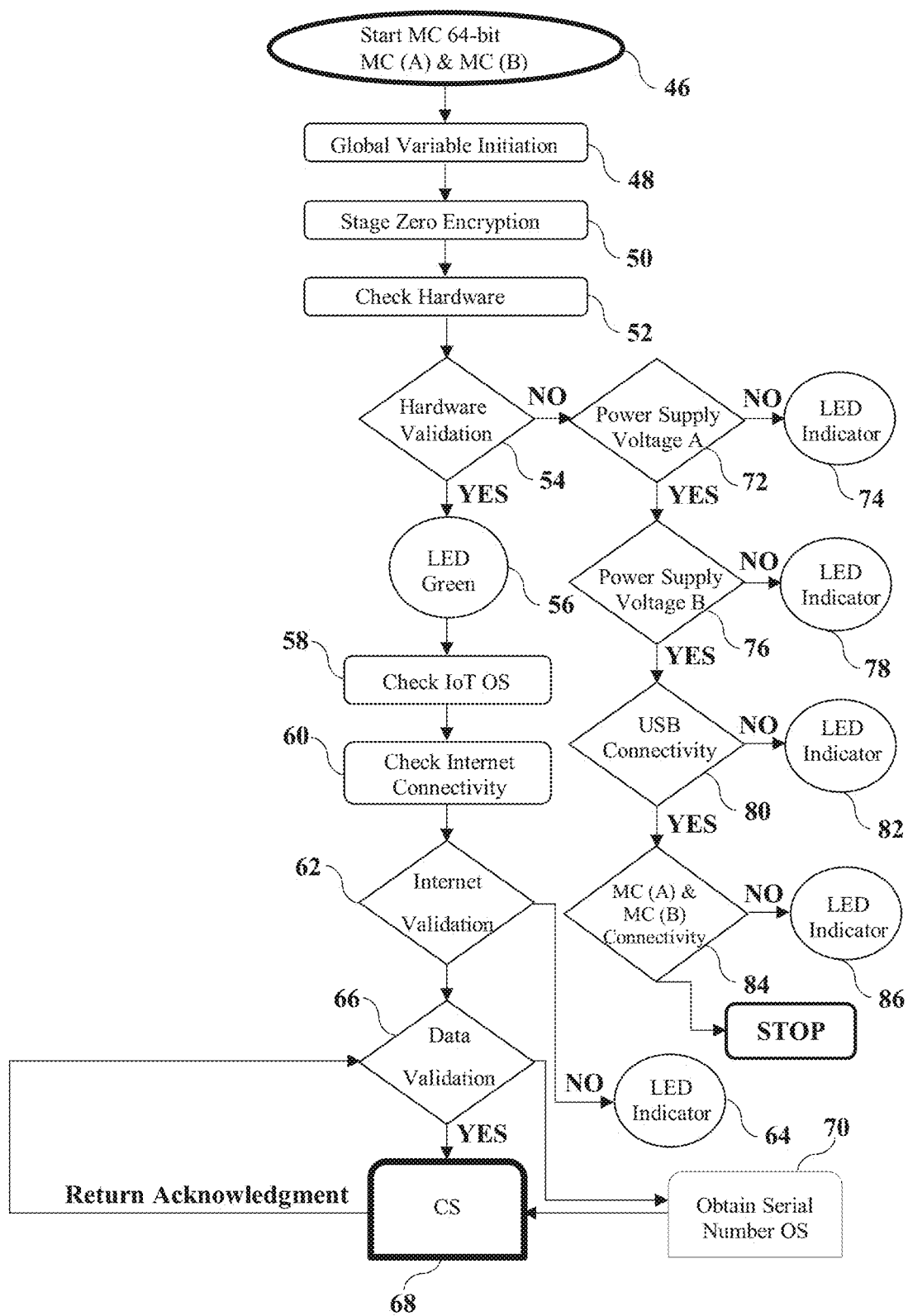
FIG. 7 shows a flowchart view of MC 64-bit with MC (A) and MC (B) communication methods to the central server.

As shown in FIG. 7, shows the start step 46 MC 64-bit MC (A) and MC (B) where the USB connector 12 is inserted into the IoT device USB port; step 48 shows activated global variable initiation and in operation, therein as it is shown in step 50, the stage zero encryption is initiated and on the P2PE program it's in operation. With respect to step 52, the check of hardware starts to validate connectivity and hardware operational. The step 54 hardware validation starts, wherein step 56 if all is check Yes, the LED green light turns on. In step 58 check IoT OS is initiated and harvest the OS version, whereas in step 60, checks Internet connectivity if it's on. As of step 62, Internet validation starts, therein step 64 if there is no Internet connectivity and the validation is not operational the LED indicator blinks. Continuing, the step 66 data validation starts if there is connectivity to the internet the 68 central server acknowledges the connectivity and returned it to the MC 64-bit MC (A) and MC (B) device as of step 46. After the Internet validation is completed, step 70 obtains a serial number of the IoT and the OS version, and it is sent to the central server 68. It is noted that in step 72, the power supply voltage A starts checking, and if there is no hardware validation, no connectivity, and not validated, the LED indicator turns on as it appears in step 74. Step 76 shows the power supply for voltage B on MC B, and if there is no connectivity, step 78 LED indicator turns on. The next step 80, the USB connectivity if there is no connectivity, step 80 LED indicator turns on. The 84 MC (A) and MC (B) connectivity is applied, and if there is no connectivity, the step 86 LED indicator blinks and stops.

Figure 8:
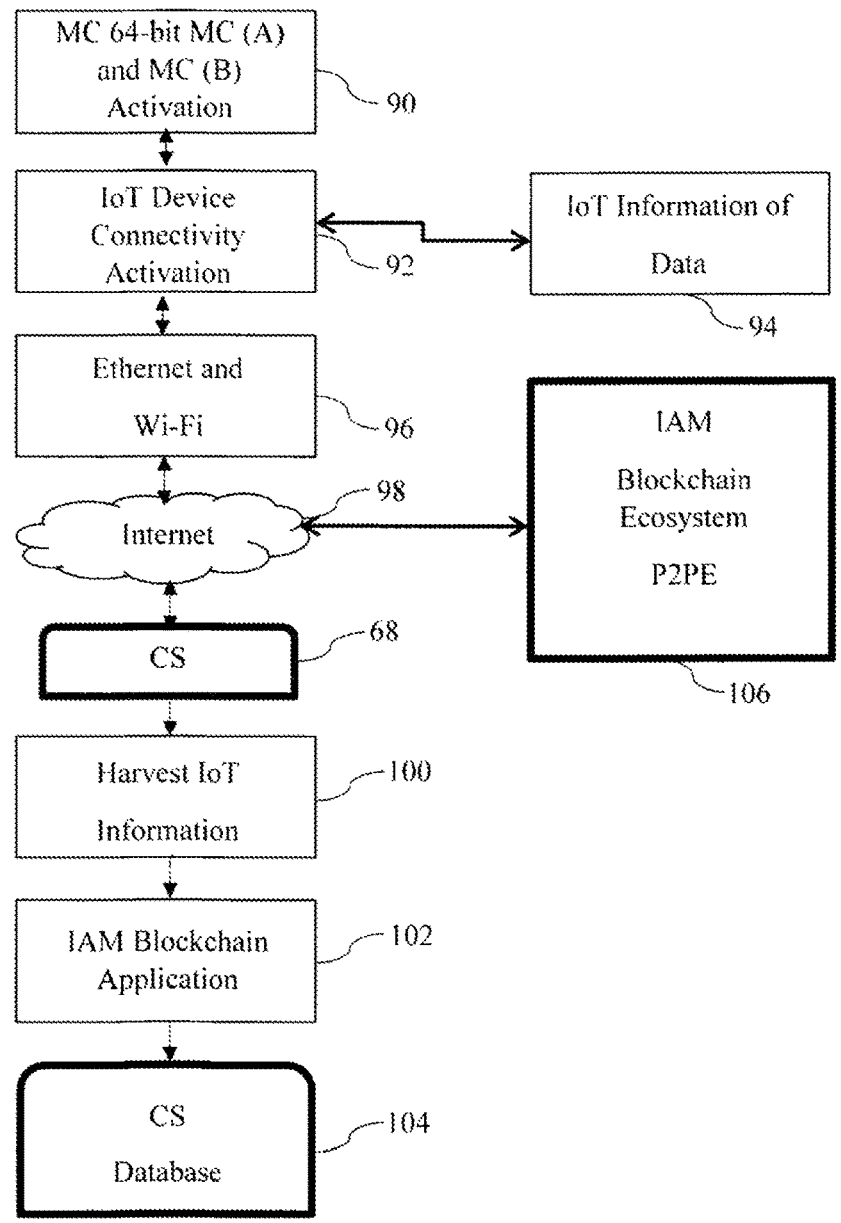
FIG. 8 shows a flowchart view of the IAM blockchain P2PE ecosystem.

As shown in FIG. 8, shows step 90 MC 64-bit MC (A) and MC (B) via USB port inserted for activation and initialization into your IoT device, step 92 IoT device connectivity validation starts the connectivity validation via USB port, wherein step 94 IoT information of data is being gathered such as the OS and serial number. The step 96 Ethernet and Wi-Fi, it validates if there is network connectivity via Ethernet and Wi-Fi, step 98 Internet connectivity is established, wherein step 68 central server communication is activated and communicated back to step 90 MC 64-bit MC (A) and MC (B). The step 100 harvest IoT information, 90 MC 64-bit MC (A) and MC (B) sends the data from step 94 IoT information of data which is OS and serial number, therein step 102 IAM blockchain application records the information, wherein step 104 central server databases, the information of serial number IoT OS version is put into the database. As of step 106, the IAM blockchain ecosystem P2PE, shows connectivity to IAM BCE with the P2PE being established and the IoT device is part of the ecosystem.

Figure 9:
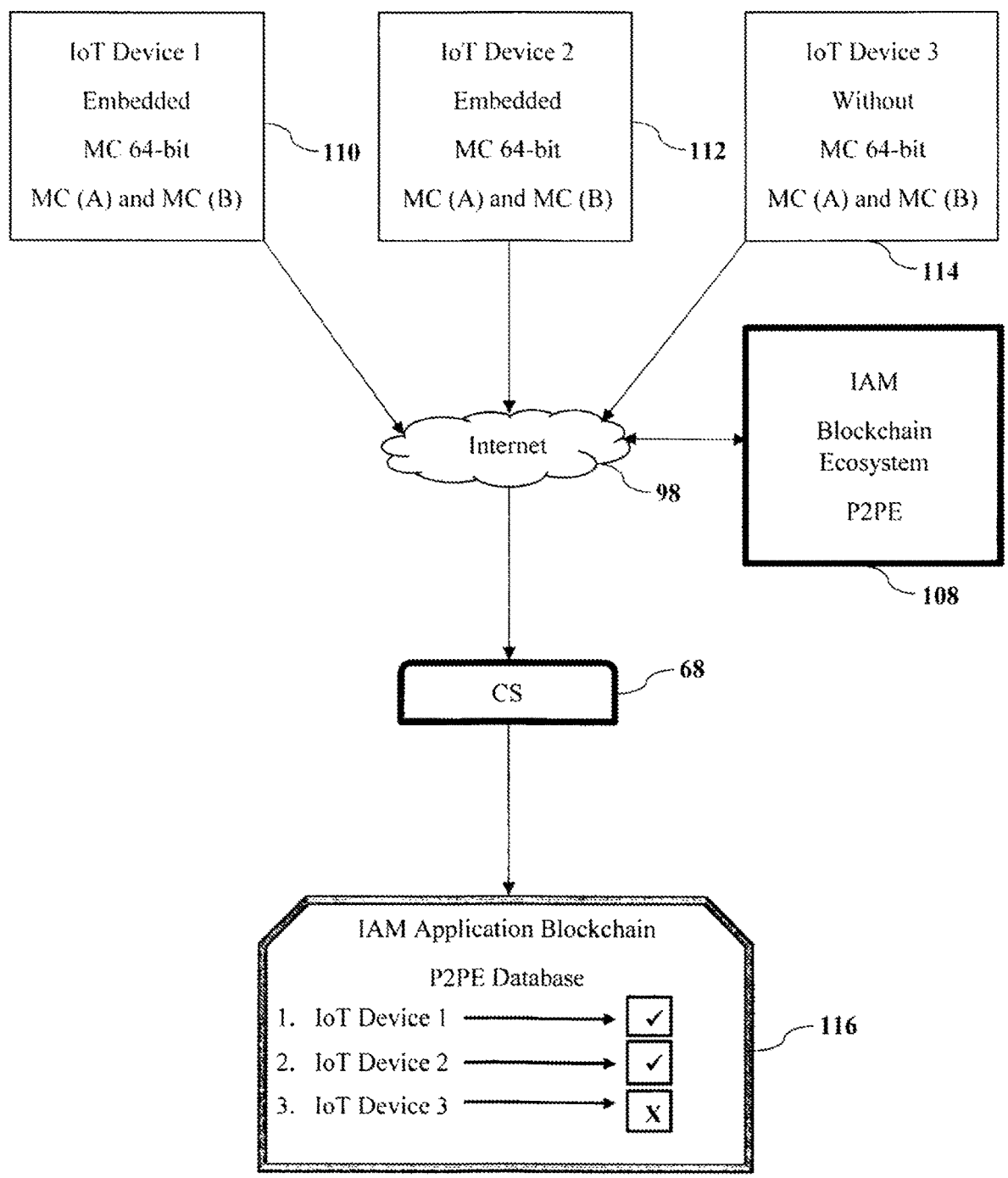
FIG. 9 shows a flowchart view of the IAM blockchain P2PE IoT communications.

As shown in FIG. 9, shows step 110 IoT device 1 with embedded MC 64-bit MC (A) and MC (B) is initiated and activated with the novel AES-SEA 512-bit key and AES 2048; the step 112 IoT device 2 with embedded MC 64-bit MC (A) and MC (B) is activated with the novel AES-SEA of 512-bit key and AES 2048. Therein, step 114 shows the IoT device 3 without MC (A) and MC (B). As of step 98 Internet, the devices are connected to the Internet, wherein step 68 central server, the step 110 IoT device 1 with embedded MC 64-bit MC (A) and MC (B) and step 112 IoT device 2 with embedded MC 64-bit MC (A) and MC (B) are connected to the 68 central server where information is harvest, such as the IOS Version and serial number. Step 108 shows the IAM blockchain ecosystem P2PE in operation; the step 116 shows the IAM application blockchain P2PE database which harvest the data for step 110 IoT device 1 with embedded MC 64-bit MC (A) and MC (B) and step 112 IoT device 2 with embedded MC 64-bit MC (A) and MC (B), wherein 110 IoT device 1 with embedded MC 64-bit MC (A) and MC (B) communicates with step 112 IoT device 2 with embedded MC 64-bit MC (A) and MC (B) because of the encryption and exchange of keys as part of claims and contracts in the IAM blockchain encryption ecosystem as part of P2PE. As of step 114, the IoT device 3 without embedded MC 64-bit MC (A) and MC (B) attempts to communicate with step 110 IoT device 1 with embedded MC 64-bit MC (A) and MC (B) and step 112 IoT device 2 with embedded MC 64-bit MC (A) and MC (B) showing rejection because it is not in the step 68 central server application database being mark as IAM blockchain device not valid.

Figure 10:
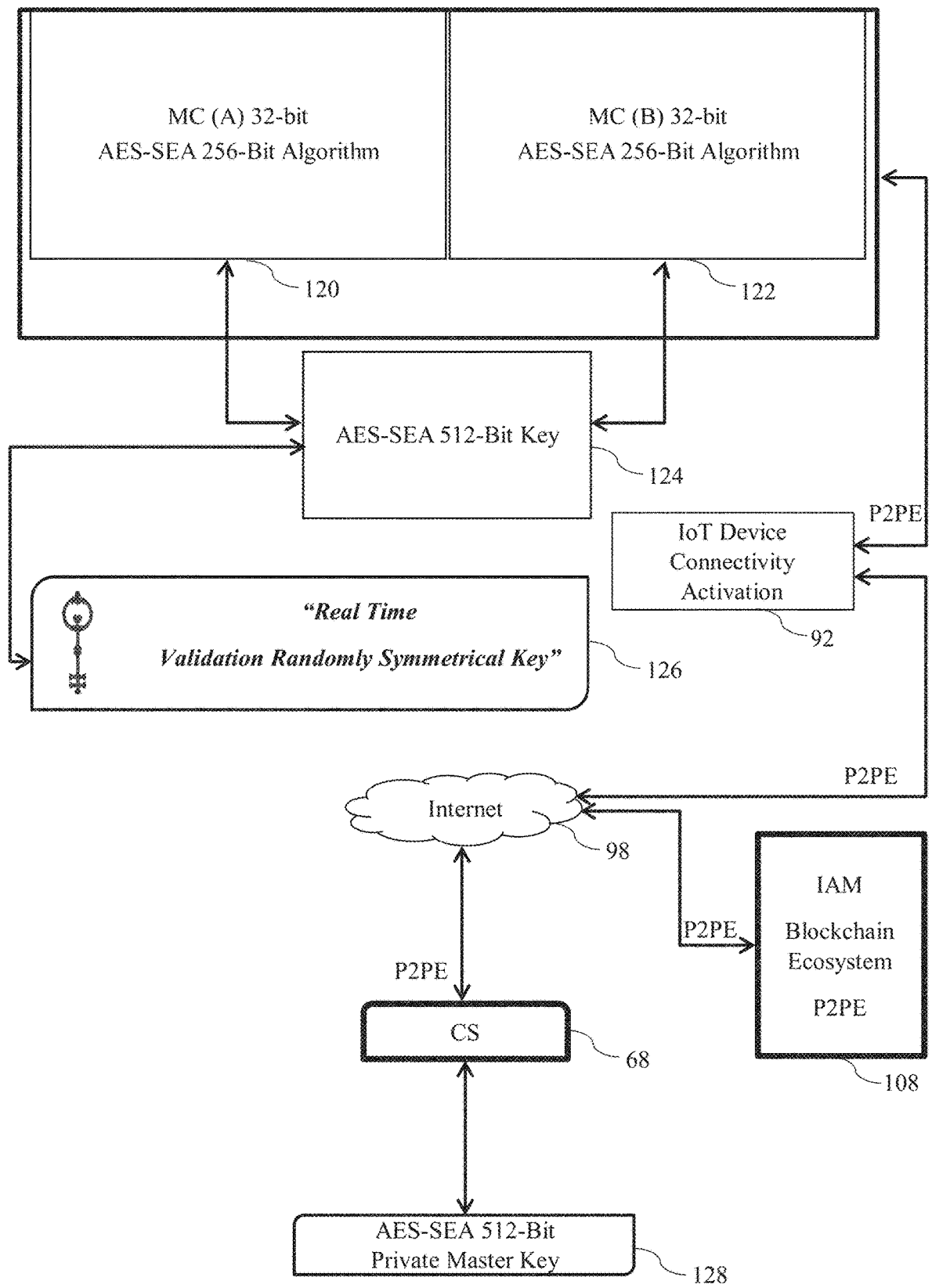
FIG. 10 shows a flowchart view of the P2PE AES-SEA 512-bit key generation.

As shown in FIG. 10, shows the communication between the 120 MC (A) 32-bit and 122 MC (B) 32-bit within two options of communication, such as parallel ports and I2C communication protocols. Step 120 MC (A) 32-bit and step 122 MC (B) 32-bit identical utilizing the communication protocols to connect between each other. Step 92 shows the IoT device connected to 120 MC (A) 32-bit and 122 MC (B) 32-bit communication P2PE. Therein the communication goes through the step 98 Internet via P2PE. As of step 108, communication is being P2PE to the IAM blockchain ecosystem. During the step 68, central server gathers the information from the IoT device via P2PE protocol; therein step 128 AES-SEA 512-bit private master key is generated and communicated back to 120 MC (A) 32-bit (A) and 122 MC (B) 32-bit via step 124 AES-SEA 512-bit key algorithm and the communication is being established P2PE from the symmetric key of step 126 in real time validation randomly symmetrical key generated between the 120 MC (A) 32-bit and 122 MC (B) 32-bit utilizing the P2PE protocols from the 92 IoT device to the 68 central server.

Figure 11:
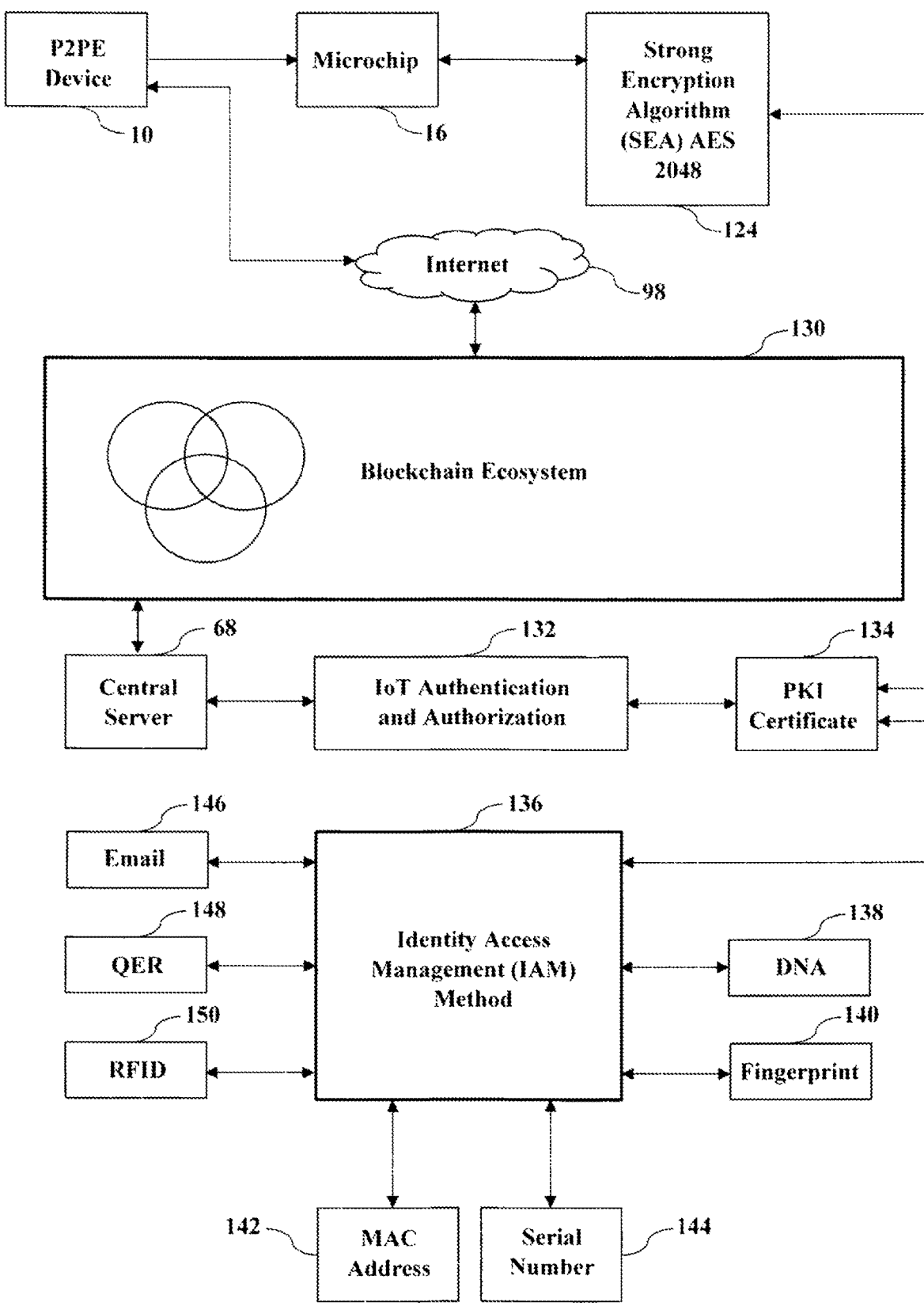
FIG. 11 shows a block diagram view of the blockchain technology P2PE device mechanism and system software.

As shown in FIG. 11, shows the 10 P2PE device that comprises of a 16 microchip or MC 64-bit MC (A) and MC (B) utilized for the authentication/authorization of the devices connected to 130 BCE and registered through the central server 68 via 132 IoT authentication and authorization. Therein, the 16 microchip of MC 64-bit MC (A) and MC (B) is inserted in encryption devices where the 124 SEA/AES 2048 algorithm serves for PKI certifications; wherein 98 Internet connectivity provides connectivity and transactional processing. Further, BCE 130 provides authentication and authorization for the IoT authentication and authorization 132 for contracts and claims. The central server 68 comprises all authenticated and authorized transactional values for identification; therein the IoT authentication and authorization 132 provides a transactional process for IoT authentication and authorization via 68 central servers. The PKI certificates 134 serves as the authentication and authorization entity for each IoT identity; the IAM method 136 serves as the repository directory for authentication and authorization for IoT and platforms. Furthermore, the DNA 138 serves as digital identity and the fingerprint 140 provides identity details; wherein the MAC address 142 serves as digital identity, and the serial number 144 serves also as a digital identity. Lastly, the email 146 serves as digital identity, quantum error recovery (QER) 148 serves as digital identity; wherein radio frequency identification (RFID) 150 serves as a digital identity.

Figure 12:
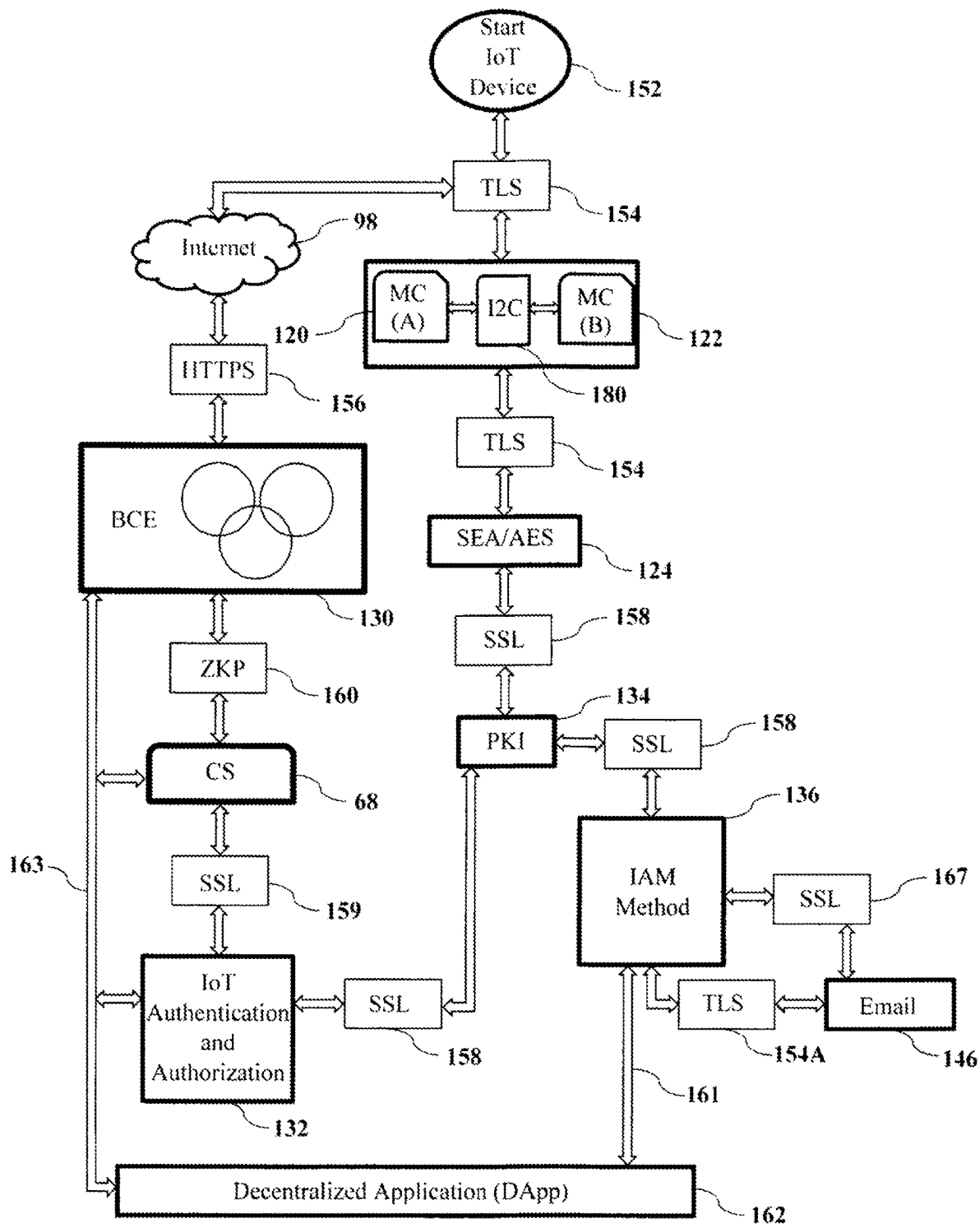
FIG. 12 shows a flowchart of IoT device communication channels to the central server.

As shown in FIG. 12, shows the flowchart of IoT communication channels to the central server, wherein step 152 start the IoT device, communicate with the MC (A) 120 and MC (B) 122. Step 154, the used protocol is TLS, which is Transport Layer Security to provide authentication and data encryption between servers, machines and applications operating over a network. Therein, go to step 120 M (A) and step 122 MC (B) communicating through the I2C 180 protocol, therein communication is being initiated, once the communication is completed and verified, then we go to the next step 154 TLS protocol to engaged again in communication, which at that point communicates with the next step 124 SEA-AES 512-bit key. Step 158 continues with secure communications using SSL protocols to the PKI step 134. PKI 134 is the public key infrastructure where the digital certificates randomly being generated to MC (A) 120 and MC (B) 122. Therein, first step 158 communication continues with SSL to step 132, which is the IoT authentication and authorization 132 where verification of the IoT takes place, then step 159 we continue the communication via SSL protocol. Step 68 central server verifies the validity and configuration of the IoTs, therein we go to step 160 ZKP protocol to communicate with the BCE 130, therein we go to step 156 via hypertext transfer protocol secure (HTTPS) for protected communication over a computer network and widely used on the 98 Internet to the next step, which is 98 the Internet. Next, we go to step 158 communicating via SSL from the previous step to bus 135 which is the 134 PKI since the IoT is being verified, validated, and became part of the BCE 130 with the certificates. Further, step 136 is when the IoT devices are registered into the IAM method, therein step 167 via SSL protocol communication and next step is 154A TLS communicating via TLS protocol to step 146, which is the email system. At that point, go to step 162, which is the decentralized application (DApp) communication 162 with bus 161 and between IAM 136 and said DApp 162, then via this method to communicate and verified on step 132 IoT authentication and authorization to bus 163, step 68 the central server, and step 130 BCE.

Figure 13:
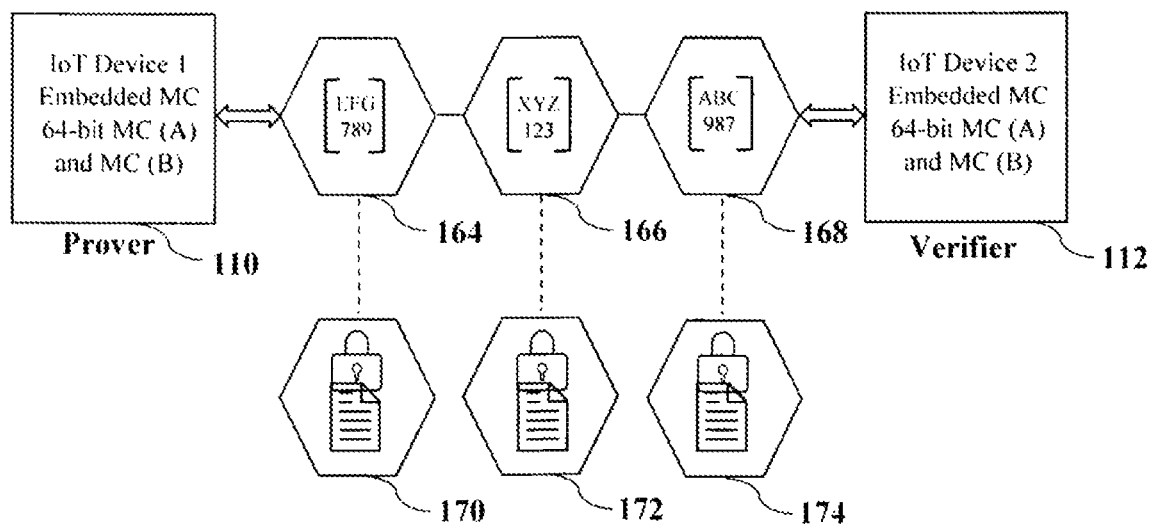
FIG. 13 shows a flowchart of the zero-knowledge proof protocol communication of IoTs.

As shown in FIG. 13, shows a flowchart with the ZKP protocol communication of IoTs, wherein step 110 is the first IoT device 1 embedded MC 64-bit MC (A) and MC (B) as the prover; the step 164 is the first proof of secret data that has not being unveil. Consequently, step 166 is the second proof of secret data that has not being unveil, therein the third step 168 which also shows the proof of secret data that has not being unveil. With respect to step 112, it is the second IoT device 2 embedded MC 64-bit MC (A) and MC (B), which is the verifier, once the prover and the verifier communicate via ZKP 160 protocol seen FIG. 14, the prover and the verifier calculate the ZKP 160 protocol communication channels, and they don't unveil any private confidential information via proofs and secret data as its shown-on step 170, step 172, and step 174. The proof and secret data are based on algorithm that are not known to the public, but only known to the 110 IoT device 1 embedded MC 64-bit MC (A) and MC (B) as the prover and step 112 IoT device 2 embedded MC 64-bit MC (A) and MC (B), which is the verifier. The 160 ZKP protocol communication of IoTs can be used for the self-driven car 44 shown on FIG. 6, wherein the 110 IoT device 1 embedded MC 64-bit MC (A) for 44 self-driven car 1 and MC (B) IoT device 2 embedded MC 64-bit MC (A) and MC (B) for 44 self-driven car 2, the two cars driving in parallel in a highway, and when they approach each other the prover 110 IoT device 1 embedded MC 64-bit MC (A) and MC (B), which is in the 44 self-driven car 1 communicates with the verifier 112 IoT device 2 embedded MC 64-bit MC (A) and MC (B), which is the self-driven car 2. At that point, the proofs and secret data shown on steps 170, 172, and 174 do not unveil the secret data between the 44 self-driven car 1 and 44 self-driven car 2.

Figure 14:
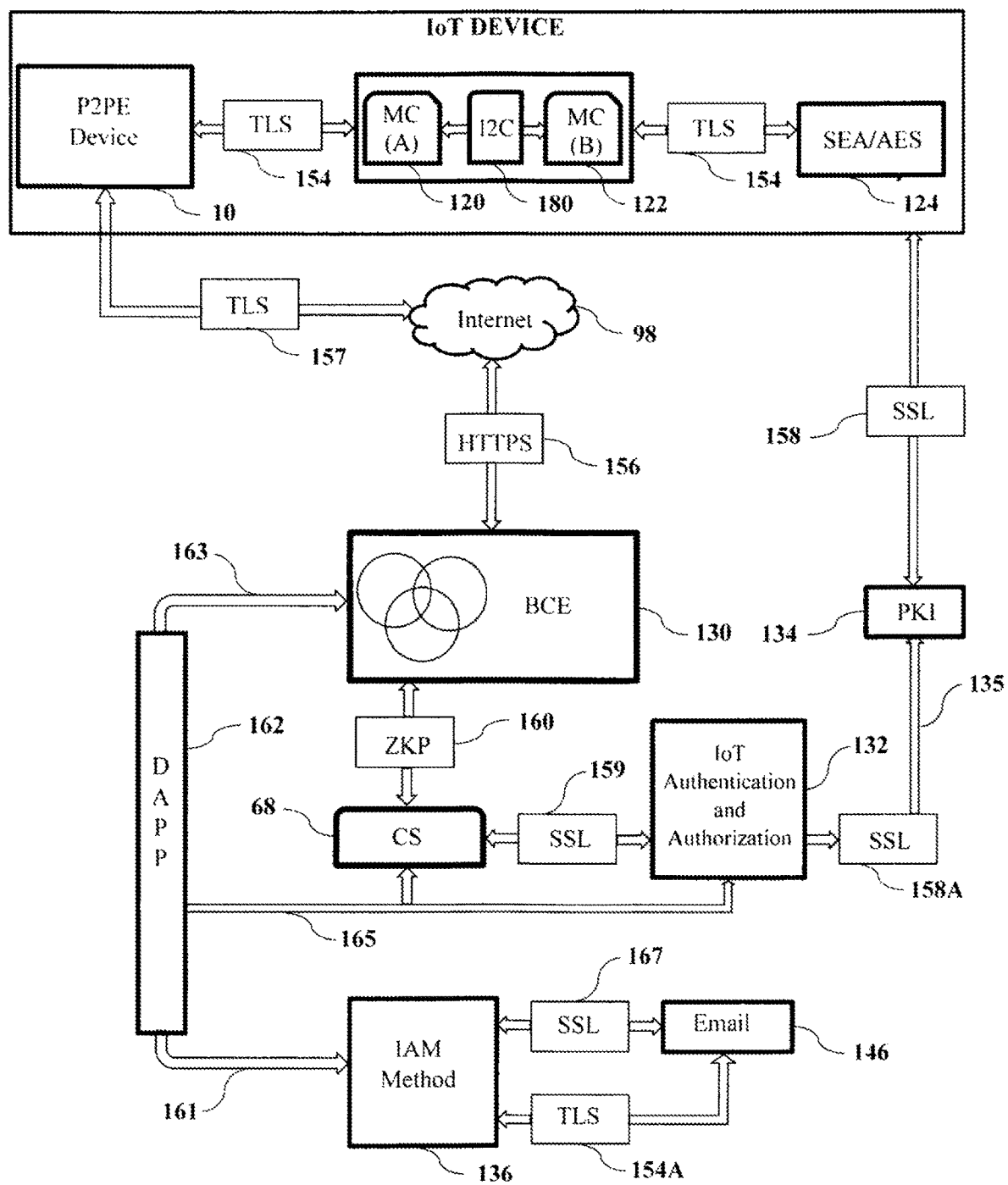
FIG. 14 shows a diagram of the IoT device, IAM, P2PE, blockchain, and central server communication channels.

As shown further to FIG. 14, shows a diagram of the IoT device, IAM, P2PE, BCE, and central server communication channels. First, the step 10 P2PE device is inserted into the IoT device following step 120 MC (A) and step 122 MC (B); the step 124 SEA/AES with step 154 TLS protocol, and step I2C 180 protocol, wherein the communication starts by turning the IoT device on. Once the P2PE device 10 is turn on, the step 120 MC (A) and step 122 MC (B) will do the verification via TLS protocol 154 and I2C 180 protocols. Further, step 158 via SSL protocol, the IoT device communicates to the PKI certificate, which is step 134 to bus 135 to obtain digital certificates via SSL protocol step 158A, wherein it communicates to the IoT authentication and authorization step 132. The IoT authentication and authorization shown in step 132, communicates via SSL step 159 to the step 68 central server, therein the step ZKP 160 protocol communicates to the BCE in step 130 via HTTPS protocol step 156. Then, the HTTPS protocol in step 156 communicates to the step 98 the Internet via TLS protocol step 154, which concludes the validation of the IoT device and certifications to the IAM methods in step 136 and central server step 68. Step 136, the IAM method communicates via SSL protocol step 167 to step 146 email via TLS protocol step 154A, therein step 154A TLS protocol communicates back to the IAM Method in step 136. Therein, the IAM method 136 communicates to bus 161 via protocol DApp in step 162 to bus 163 to the BCE step 130 to the central server step 68 and step 132 of bus 165 which is the IoT authentication and authorization 132. Then, the IoT authentication and authorization in step 132 registers the P2PE device 10 into step 68 the central server and to the IAM method, which is step 136.

Figure 15:
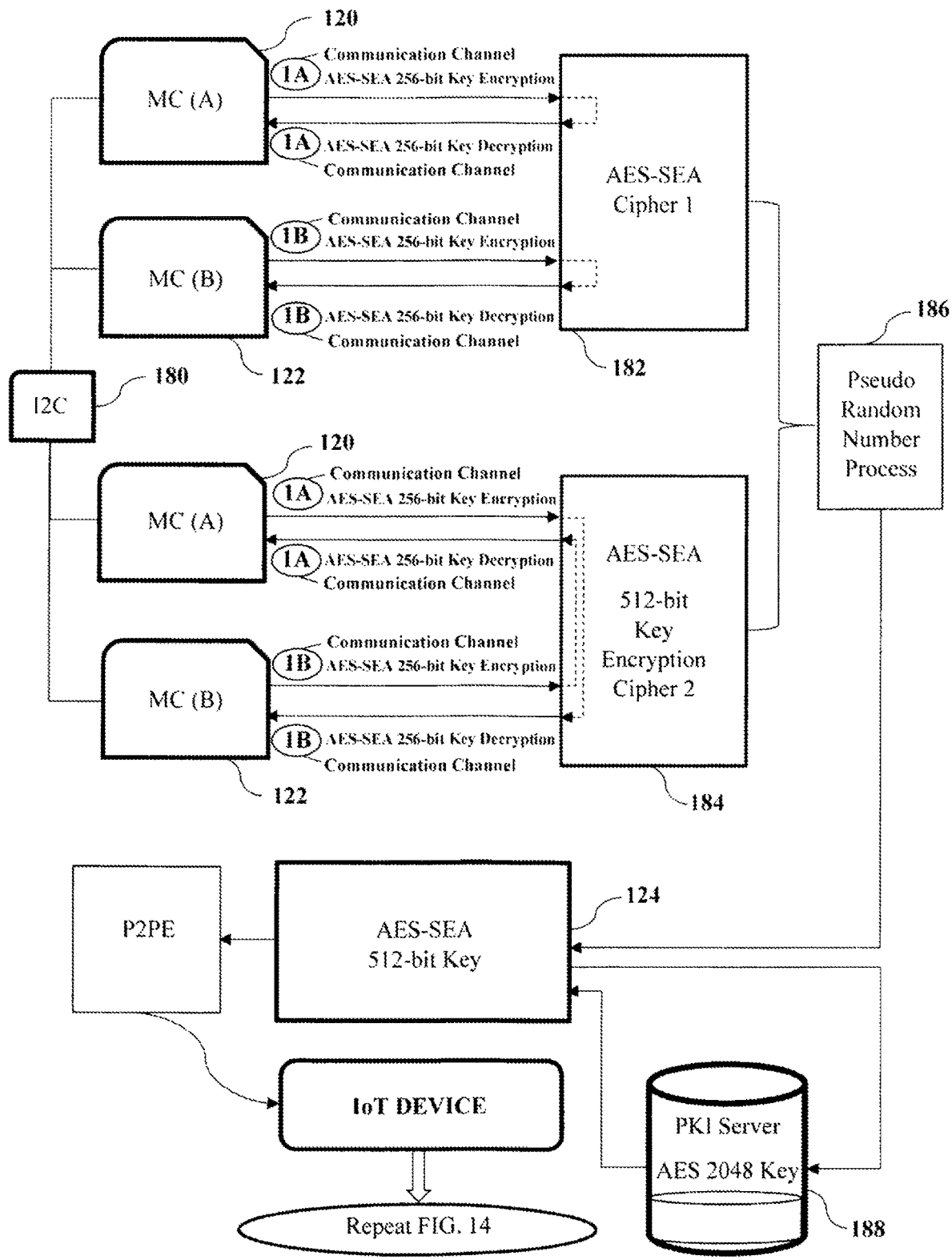
FIG. 15 shows a flowchart view of the AES-SEA 512-bit key.

As shown in FIG. 15, shows a flowchart view of the AES-SEA 512-bit key. First, start the IoT device and initiate the MC (A) 120 sends via 1A communication channel an encryption AES-SEA 256-bit key to the 182 AES-SEA cipher 1 and AES-SEA 256-bit key decryption goes back to MC (A) 120 via 1A communication channel and at the same time, the MC (B) 122 initiates via 1B communication channel an encryption AES-SEA 256-bit key to the 182 AES-SEA cipher 1; therein a decryption AES-SEA 256-bit key goes back via 1B communication channel to MC (B) 122. At that point, the pseudo-random number process is introduced 186, which is initiated via I2C 180 connection to MC (A) 120 initiates an encryption AES-SEA 256-bit key encryption via 1A communication channel to the 184 AES-SEA 512-bit key encryption cipher 2, wherein initiates an AES-SEA 256-bit key decryption back to MC (B) 122 via 1B communication channel. Then, MC (B) 122 via 1B communication channel initiates an encryption AES-SEA 256-bit key which goes back to MC (A) 120 via 1A communication channel, at that point via 180 I2C, the pseudo-random number process 186 generates an AES-SEA 512-bit key 124 which goes to the 188 PKI server AES 2048 key. Then, the 188 PKI server AES 2048 key sends an encryption AES-SEA 512-bit key 124 to the IoT device, wherein at that point a P2PE is initiated once the AES-SEA 512-bit key 124 is generated to encrypt from point A to point B via the IoT device; therein repeat FIG. 14.

Figure 16:
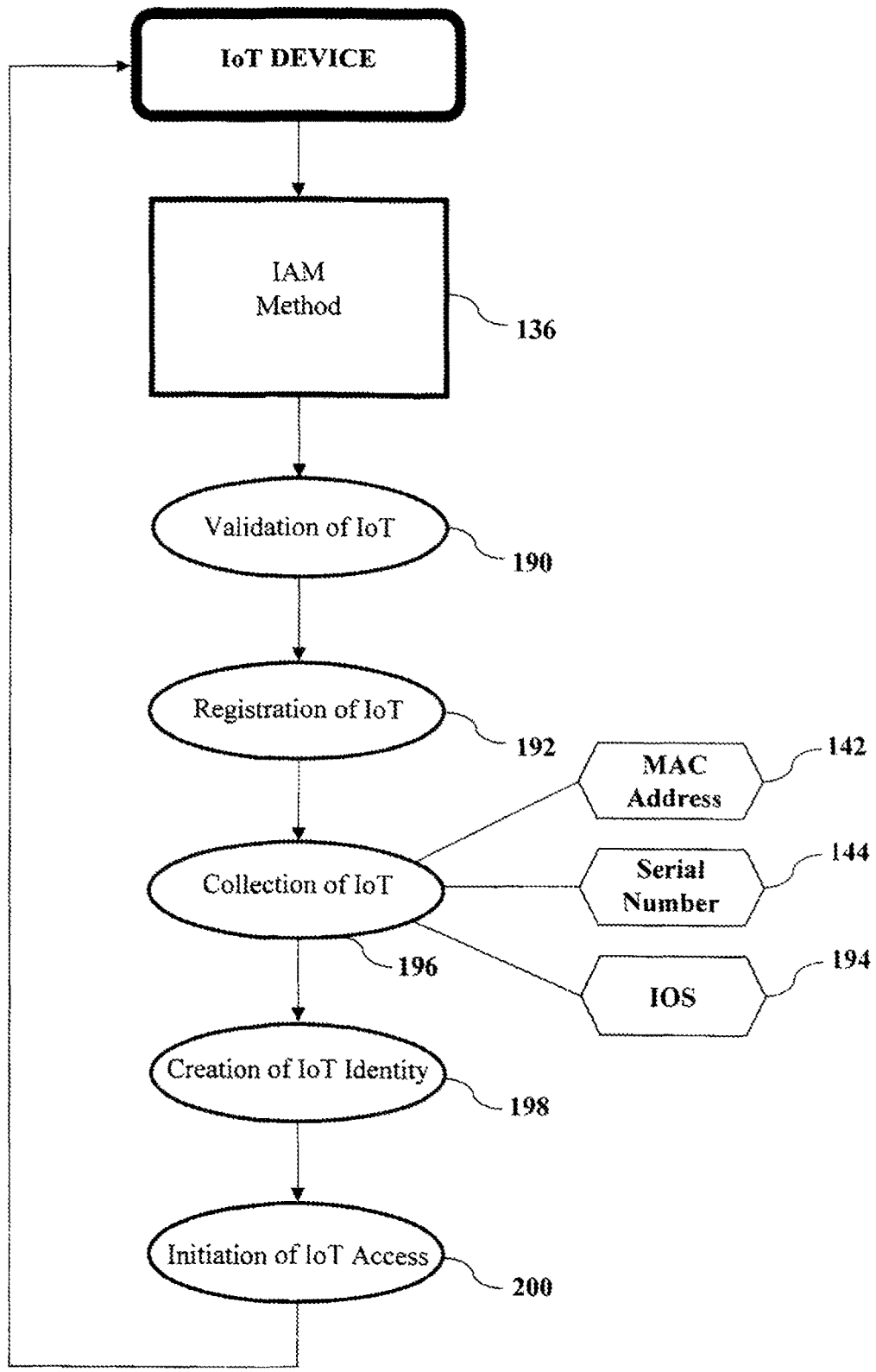
FIG. 16 shows a flowchart view of the IAM method.

As shown in FIG. 16, shows a flowchart view of the IAM method where the IoT device initiates the connection to the 136 IAM method, therein the 136 IAM method does the validation for step 190 of the IoT. Then, initiates the registration of the IoT in Step 192, wherein in step 196, it collects information from the IoT such as MAC address 142, serial number 144, and fingerprint identity IOS 194 of the IoT device. Therein continues to step 198, the creation of IoT Identity of the IAM method 136; wherein continues to step 200 initiation of IoT access.

Figure 17:
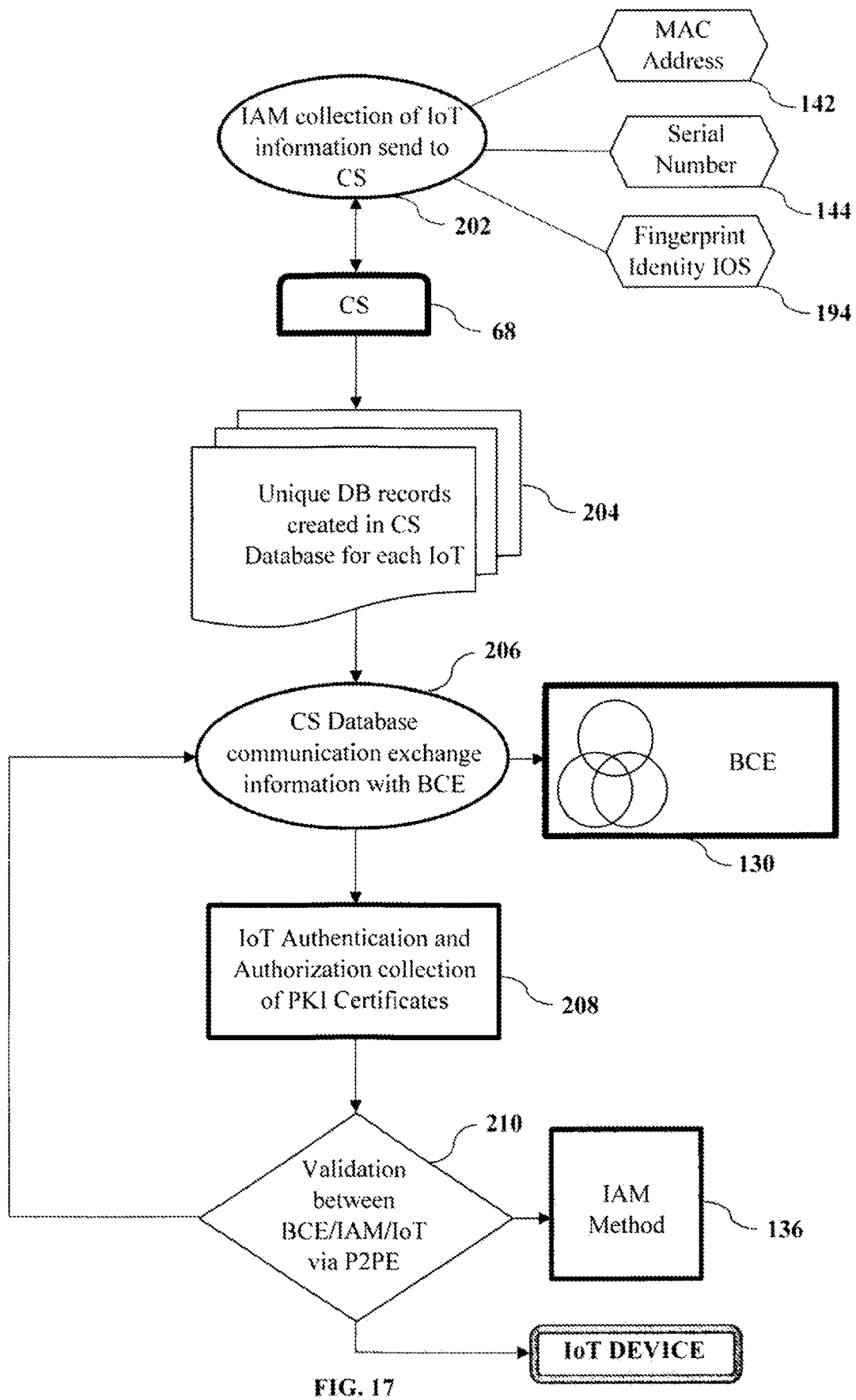
FIG. 17 shows a flowchart of the central server method.

As shown in FIG. 17, shows a flowchart view of the central server method, the step 202 IAM collection of IoT information is completed and information is being gathered such as the 142 MAC address, 144 serial number, and 194 fingerprint identity IOS, therein the collection is being sent to the central server 68. In step 204, the unique database records are created in the 104 central server databases for each IoT, then continues to step 206 which the 104 central server database server communication exchange information with the 130 BCE. The step 208, the IoT authentication and authorization collection of PKI certificates takes place, wherein the step 210, a point-to-point validation is done through the 130 BCE to the IAM method 136 and the IoT device via P2PE.

Figure 18:
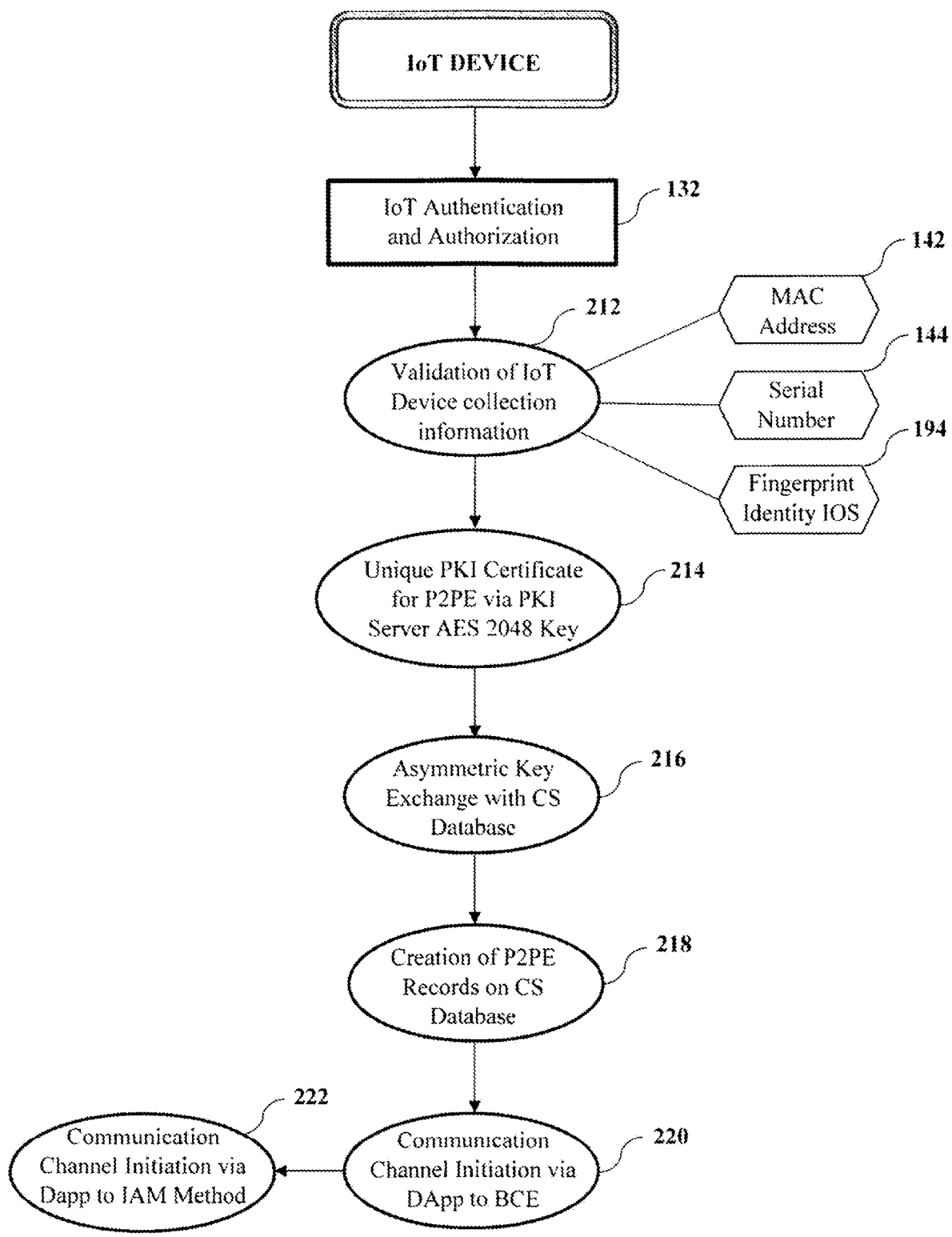
FIG. 18 shows a flowchart of the IoT authentication and authorization.

As shown in FIG. 18, shows a flowchart view of the IoT authentication and authorization 132 where the IoT device is initiated going to the initiation process to the 188 PKI Server AES 2048 key shown in FIG. 15. Step 212, validation of IoT device collection information which is the MAC address 142, serial number 144, and fingerprint identity IOS 194. At that point, the unique 134 PKI certificate for P2PE via the 188 PKI server AES 2048 key in step 214; therein step 216, a symmetric key exchange is done with the 104 central server databases. Then, step 218 shows the creation of P2PE records on the 104 central server databases, wherein step 220 starts the communication channel initiation via 162 DApp shown in FIG. 14 to the 130 BCE; therein step 222 shows the communication channel initiation via 162 DApp to the 136 IAM method.

Figure 19:
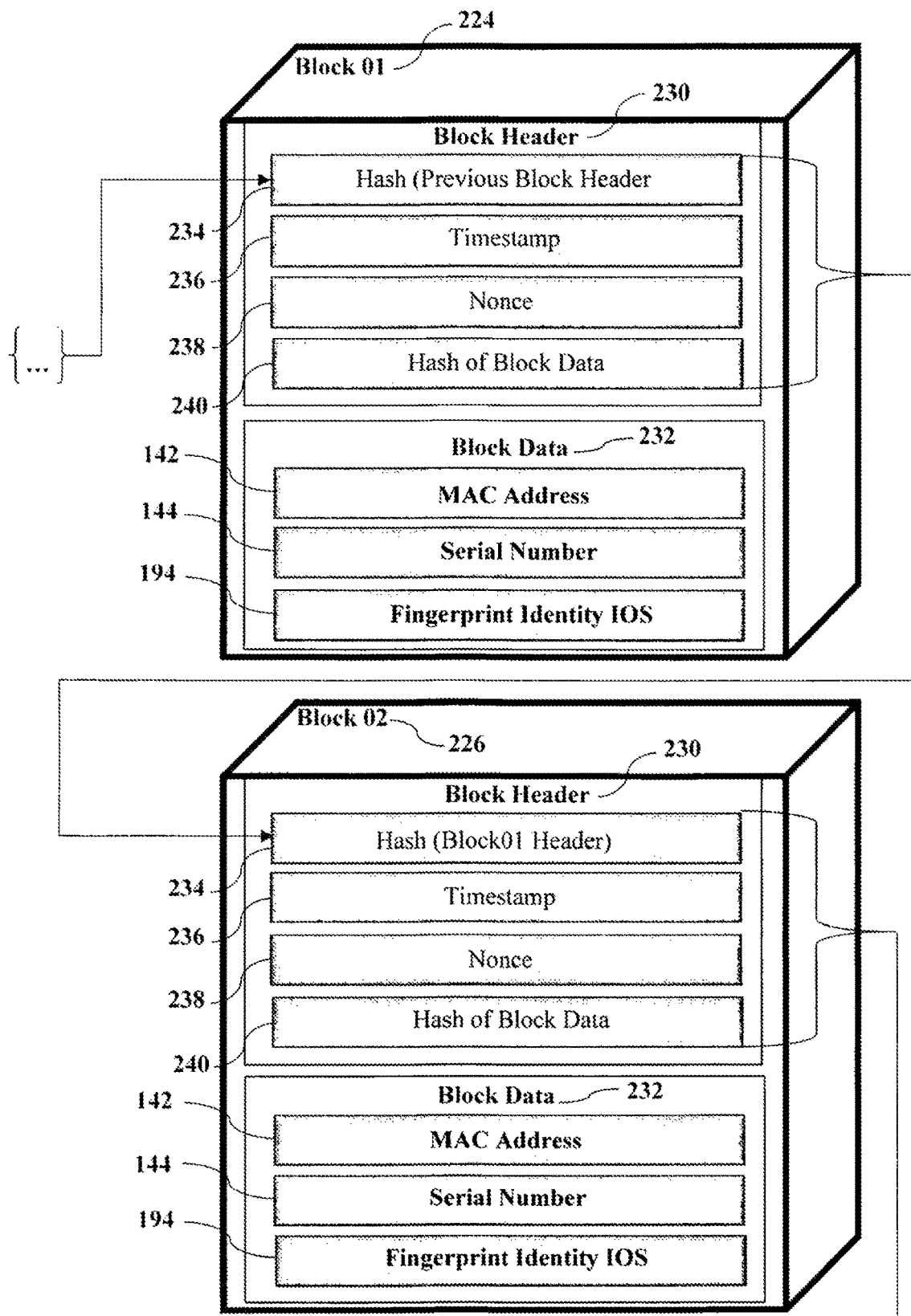
FIG. 19 shows a view of the blockchain ecosystem and IoT blockchain ledger transactional chain information.

As shown in FIG. 19, shows a view of the 130 BCE and IoT blockchain ledger transactional chain information, wherein blocks are chained together through each block containing the hash digest of the previous block's header 234, thus forming the blockchain. A block is a data structure containing the block header 230 and 232 block data. If a previously published block were changed, it would have a different hash. This in turn would cause all subsequent blocks to also have different hashes since they include the hash of the previous block. This makes it possible to easily detect and reject altered blocks. The 224 block 01 contains a block header 230, hash previous block header 234, block data 232, which is a list of transactions and ledger events included within the block, 236 timestamp process of securely keeping track of the creation and modification time of a document, and the nonce value 238. For blockchain networks which utilize mining, this is a number which is manipulated by the publishing node to solve the hash puzzle. Other blockchain networks may and may not include it and use it for another purpose other than solving a hash puzzle.

The 224 block 01 also contains the 240 hash of block data wherein the MAC address 142, serial number 144, and 194 fingerprint identity IOS are being recorded in the 232 block data blockchain transactional ledger. The hash of block data 240 is a hash representation of the block data, wherein different methods can be used, such as a generating a Merkle tree, which is a data structure where the data is hashed and combined until there is a singular root hash that represents the entire structure, and storing the root hash, or by utilizing a hash of all the combined block data 232. The hash chain is an append-only data structure where data is bundled into data blocks that include a hash of the previous data block's data within the newest data block. This data structure provides evidence of tampering because any modification to a data block will change the hash digest recorded by the following data block.

The 226 block 02 contains a block header 230, 234 hash block 01 header, block data 232, which is a list of transactions and ledger events included within the block, 236 timestamp process of securely keeping track of the creation and modification time of a document, and the 238 Nonce value, which is an arbitrary number that is used once. The 226 block 01 also contains the 240 hash of block data wherein the MAC address 142, serial number 144, and 194 fingerprint identity IOS are being recorded in the 232 block data blockchain transactional ledger.

The 228 block 03 contains a block header 230, 234 hash block 02 header, block data 232, which is a list of transactions and ledger events included within the block, 236 timestamp process of securely keeping track of the creation and modification time of a document, and the 238 nonce value, which is an arbitrary number that is used once. The 228 block 03 also contains the 240 hash of block data wherein the MAC address 142, serial number 144, and 194 fingerprint identity IOS are being recorded in the 232 block data blockchain transactional ledger.

The block header 230, also known as the block number and block height in some blockchain networks contains metadata for 224 block 01, 226 block 02, and 228 block 03; therein block data 232 contains a list of validated, authentic transactions where the portion of a block contains a set of validated transactions and ledger events for 224 block 01, 226 block 02, and 228 block 03 including the 142 MAC address, 144 serial number, and 194 fingerprint identity IOS which have been submitted to the blockchain network.

Figure 20:
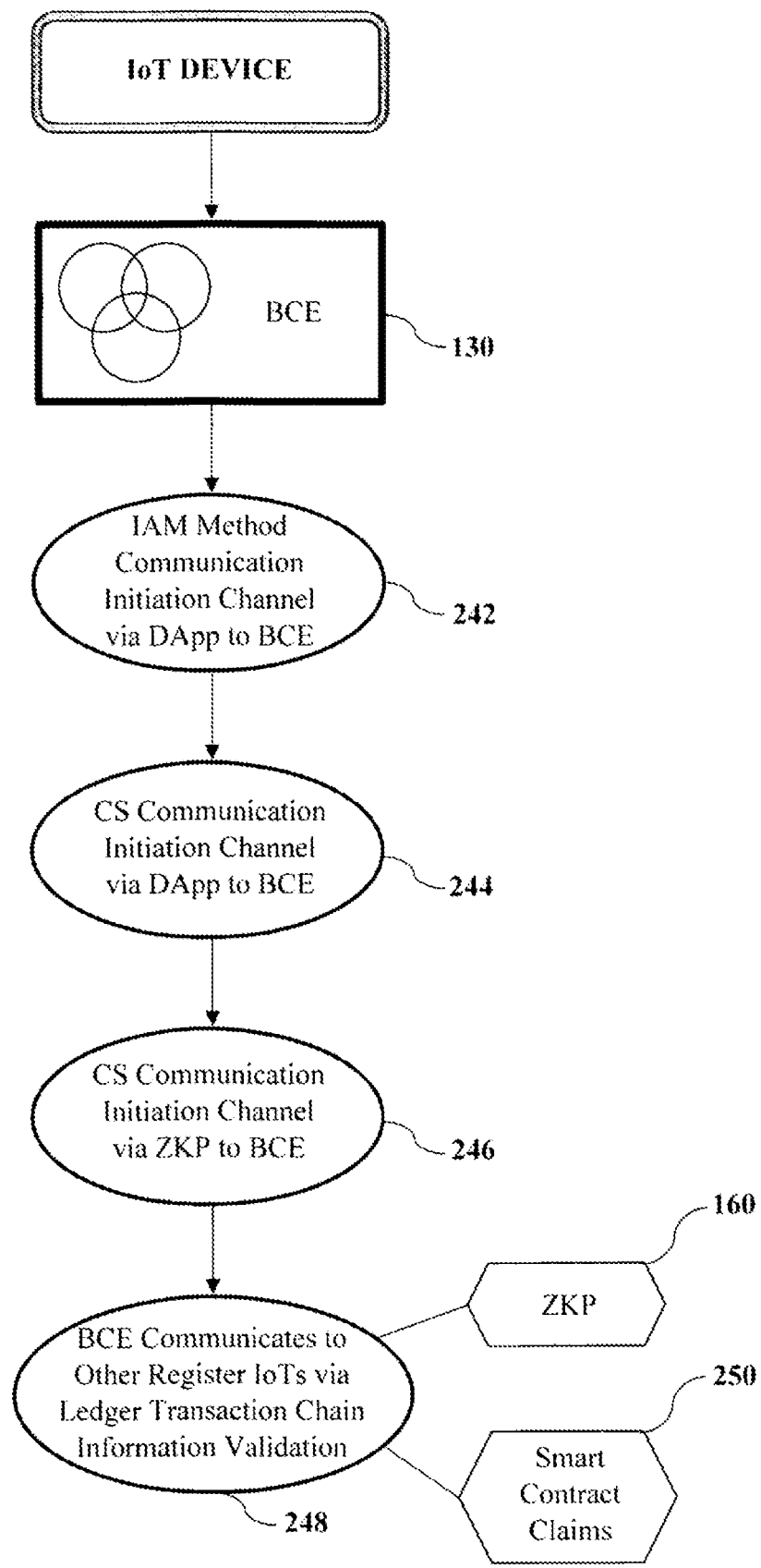
FIG. 20 shows a view of the blockchain ecosystem and IoT blockchain ledger transactional chain information.

As shown in FIG. 20, shows a view of the 130 BCE and IoT blockchain ledger transactional chain information, wherein the IoT device initiates and connects to the 130 BCE via the validation, configuration, registration in the central server 68, and 136 IAM method collecting the information from the IoT device. Step 242 shows the IAM method 136 communication initiation channel done via 162 DApp to 130 BCE; therein step 244 shows the 68 central server communication initiation channels via 162 DApp to 130 BCE is completed. The next step 246 shows the 68 central server communication initiation channels via 160 ZKP protocol to 130 BCE is completed, and in step 248, the 130 BCE communicates to other register IoTs done via the ledger transaction chain information; therein validation is done via 160 ZKP protocol shown in FIG. 13, and smart contract claims 250 shown in FIG. 19. Smart contract claims 250 is an attestable software application process; therein deployed on the blockchain and executed by computers running that blockchain, distributed ledger systems between businesses, and claims. The smart contract claims 250 are computerized transaction protocol that executes the terms of a contract, which is a collection of code and data that is deployed using cryptographically signed transactions on the blockchain network. The smart contract is executed by nodes within the blockchain network; all nodes that execute the smart contract must derive the same results from the execution, and the results of execution are recorded on the 130 BCE.

Figure 21:
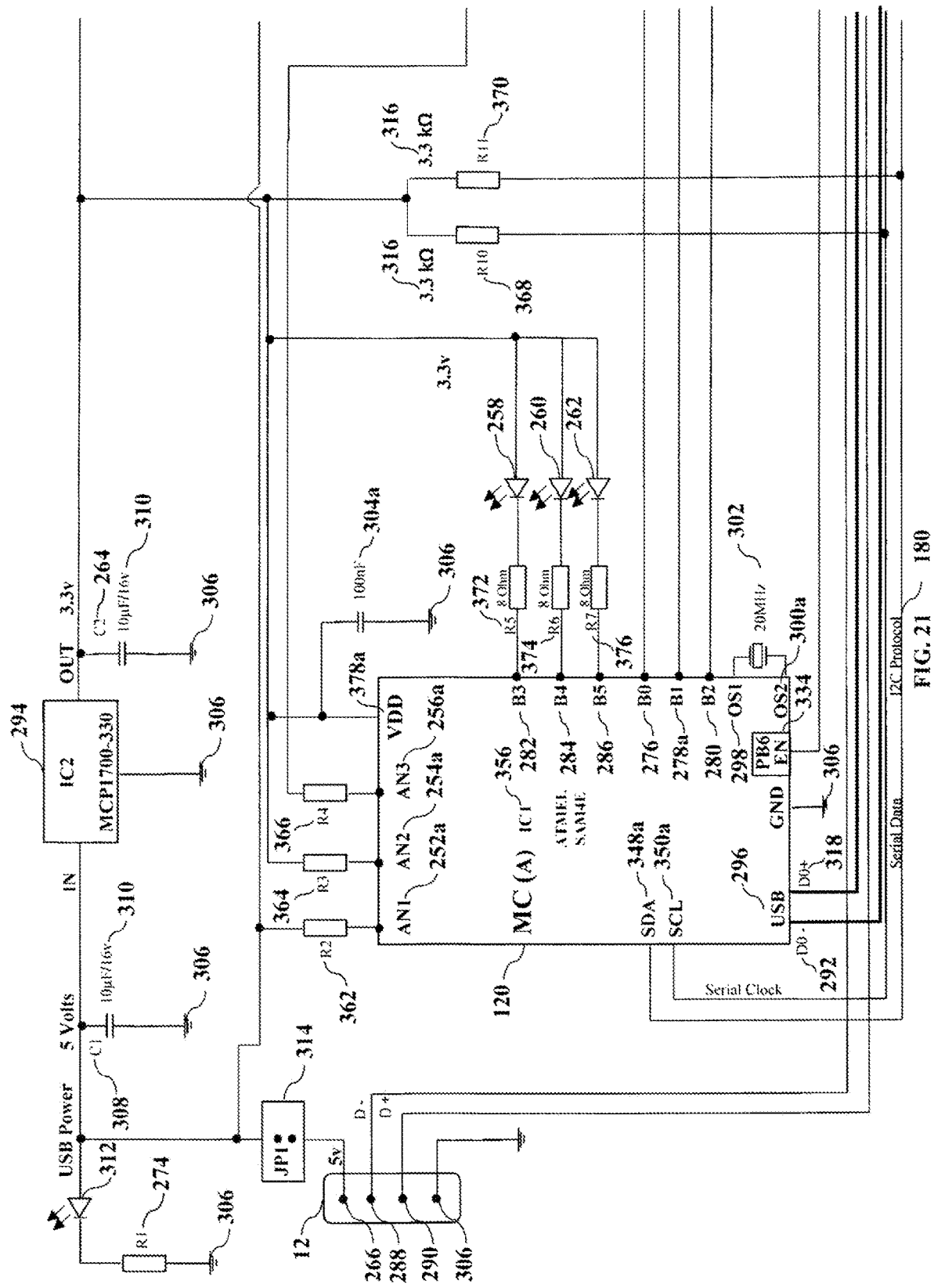
FIG. 21 shows a view of an electrical schematic layout of the integrated circuit of MC (A).
Figure 22:
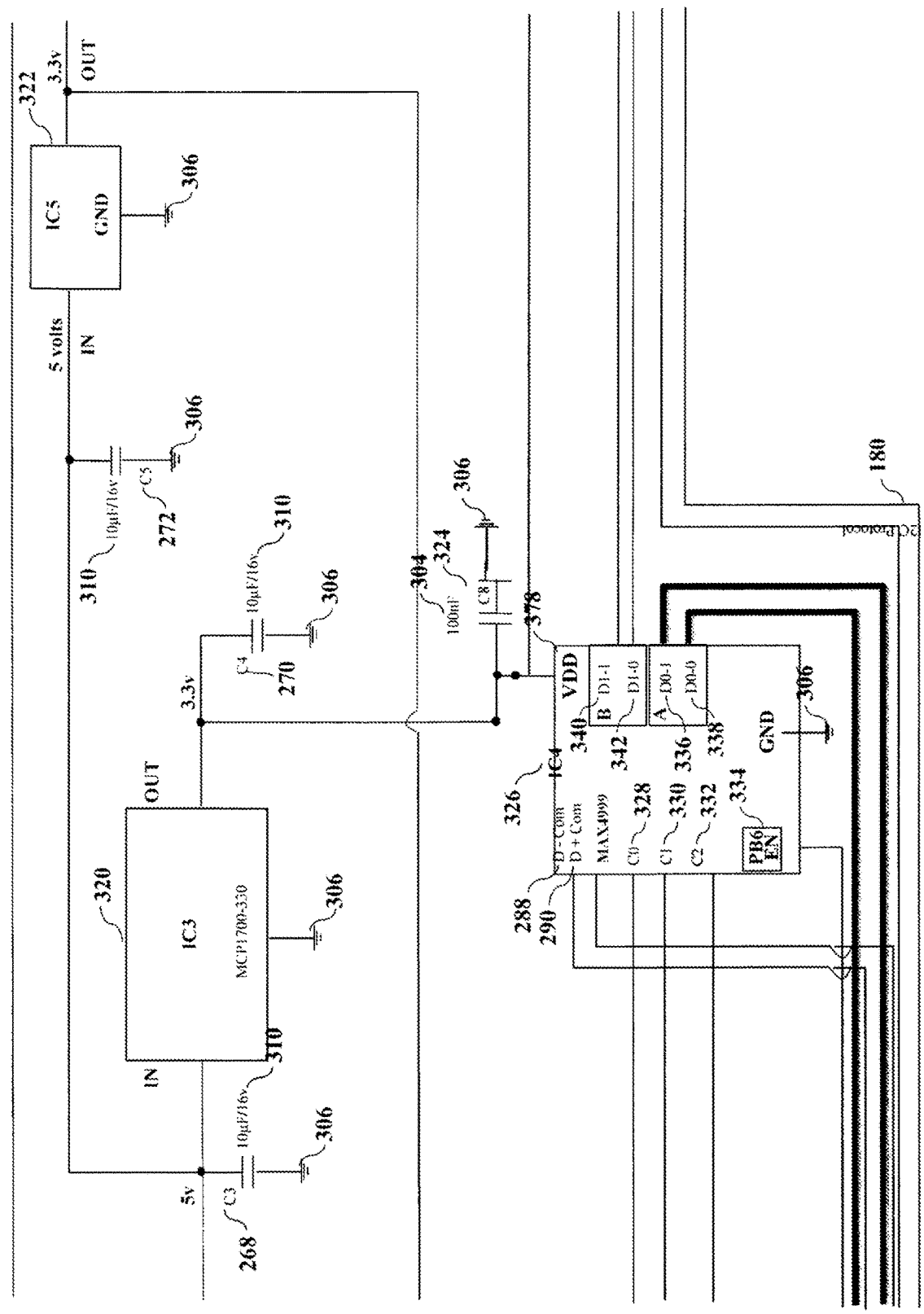
FIG. 22 shows the electrical schematic layout of the USB Multiplexer for the integrated circuit of MC (A) and MC (B).
Figure 23:
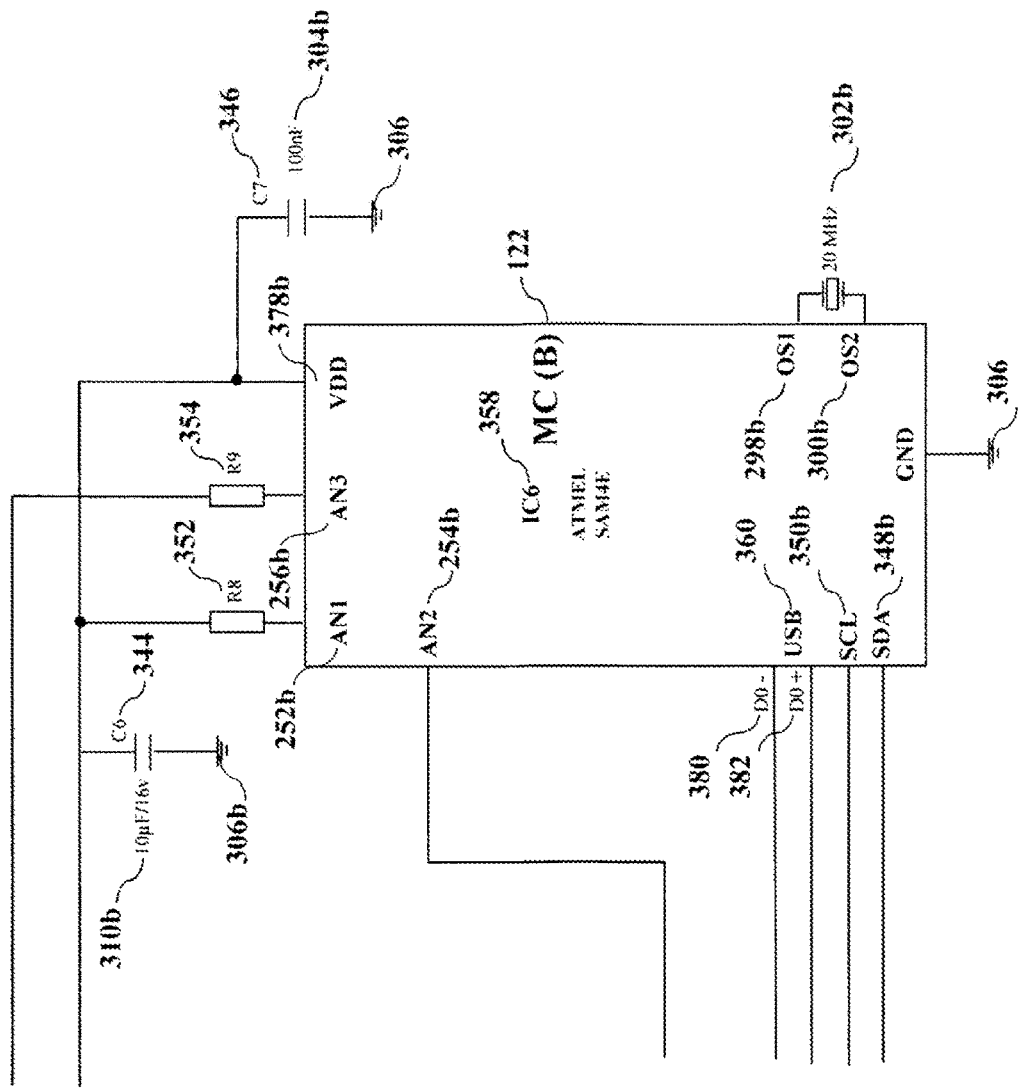
FIG. 23 shows the electrical schematic layout of the integrated circuit of MC (B).

As shown in FIG. 21, shows a view of an electrical schematic layout of the integrated circuit (IC) of MC (A) 120; therein the MC (A) 120 and MC (B) 122 includes 6 IC wherein the IC1 356 physical corresponds to the MC (A) 120 and the IC6 358 physical corresponds to the MC (B) 122 seen in FIG. 23, 1 USB Multiplexer the IC4 326, 3 voltage regulators of 5 volts up to 3.3 volts, which are the IC2 294, IC3 320 seen in FIG. 22, and IC5 322 seen in FIG. 22.

The electrical schematic layout of MC (A) 120 shows at the circuitry having the USB connector 12 which is composed by 4 pins, voltage pin 266 will always make 5 volts, the pin 288 D−, the pin 290 D+, and the last pin 306 the ground which is used for power supply reference; therein a Jumper that enables and disables the voltage throughout the circuit, the jp1 corresponding to the number 314 where the LED 312 having always the 5 volts on the 12 USB connector is going to light up. The LED 312 may be outside and inside the PC board. These 5 volts that reach the 12 USB connector must be regulated by always taking it to 3.3 volts. The regulators IC2 294, IC3 320 seen in FIG. 22, and IC5 322 seen also in FIG. 22, have a maximum capacity of 500 mA, but the instant invention circuit will consume about 150 mA.

The resistors R1 274, R2 362, R4 366 shown in FIG. 21, the main function is to limit the analogic electrical current entrance of the MC (A) 120; therein the R5 372, R6 374, and R7 376 main function is to let pass the proper operating current of the LEDS 258, 260, and 262. While I2C devices pull down the lines with open draindrivers FETs which can in general drive at least about 10 mA and more, the pull-up resistors 368 R10 and 370 R11 shown in FIG. 21, are responsible for getting the signal back to high level; therein 3.3 kΩ 316, resulting in typical pull-up currents of about 1 mA and less. For safety, 1 voltage regulator to each IC where the IC2 294 regulates the voltage of the MC (A) 120, which is to be used as regulator of the voltage of the 356 IC1 physical that corresponds to the MC (A) 120.

The MC 64-bit MC (A) and MC (B)16 is embedded into the P2PE device 10 that connects to the IoT device via the USB connector 12; wherein is checked within the USB connector 12 through the pin AN1 252a known as analog input is the voltage coming from the USB connector 12, which are 5 volts. The pin AN2 254a known as analog input will check the voltage that is coming out of the regulator IC2 294 which is the voltage that feeds the MC (A) 120; therein the pins AN1 252a, AN2 254a, and AN3 256a are analog inputs, sensing the voltages that are at the output of each regulator. The pin AN3 256a will sense the voltage of the regulator number IC5 322 shown in FIG. 22.

Once the voltage is control and detected from the regulator IC2 294, IC3 320 seen in FIG. 22, and IC5 322 output seen also in FIG. 22, the LED will be illuminated in function of the readings recorded in the pin AN1 252a, pin AN2 254a, and pin AN3 256a and the LEDs that are connected to the pin B3 282, pin B4 284, and pin B5 286 and to the LEDS 258, 260, and 262. In the case of voltages, it will be the LED 258. If all the voltages are within the 3.3 volts, the USB 290, and all the regulators, then the LED 258 will emit a solid light green.

The pins B0 276, B1 278a, and B2 280 of MC (A) 120 will place a combination of bits C0 328, C1 330, and C2 332 seen in FIG. 22; therein in function of this combination if it were 000, it will make a switch and interconnect the USB connector 12 with the MC (A) 120 USB 296 that comprises with D0− 292 and D0+ 318. This is controlled through the pins B0 276, B1 278, and B2 280; therein they are interconnected through the multiplexer IC4 326 connecting the physical connection of the USB port A pin 338 D0-0 and pin 336 D0-1 of the USB multiplexer 326 IC4 with the pins 292 D0− and pin D0+ 318 that is the USB 296 of MC (A) 120.

By having the voltage and the connectivity of USB connector 12, the MC (A) 120 and MC (B) 122 seen in FIG. 23; therein the protocol of communication of the Internet 98 is being access, and if everything is OK, then through the pin B5 286 of the MC (A) 120 and LED 262 illuminates. If these three LEDs 258, 260, and 268 are solid LED indicator, it means that the voltage, the connectivity of the USB connector 12, the USB 296 of MC (A) 120 and USB 360 of MC (B) 122 seen in FIG. 23, and the connectivity of the Internet 98 are OK; therein proceed to connect through the pin SCL 350*a* that represents the clock of MC (A) 120 and pin SDA 348*a* is the data.

The OS1 298 and OS2 300*a* is found in the MC (A) 120 where the crystal quartz terminal has a maximum value that support 20 MHz of the clock for the instant invention, which is the max speed of processing of software that is put to the MC (A) 120.

Figure 25:
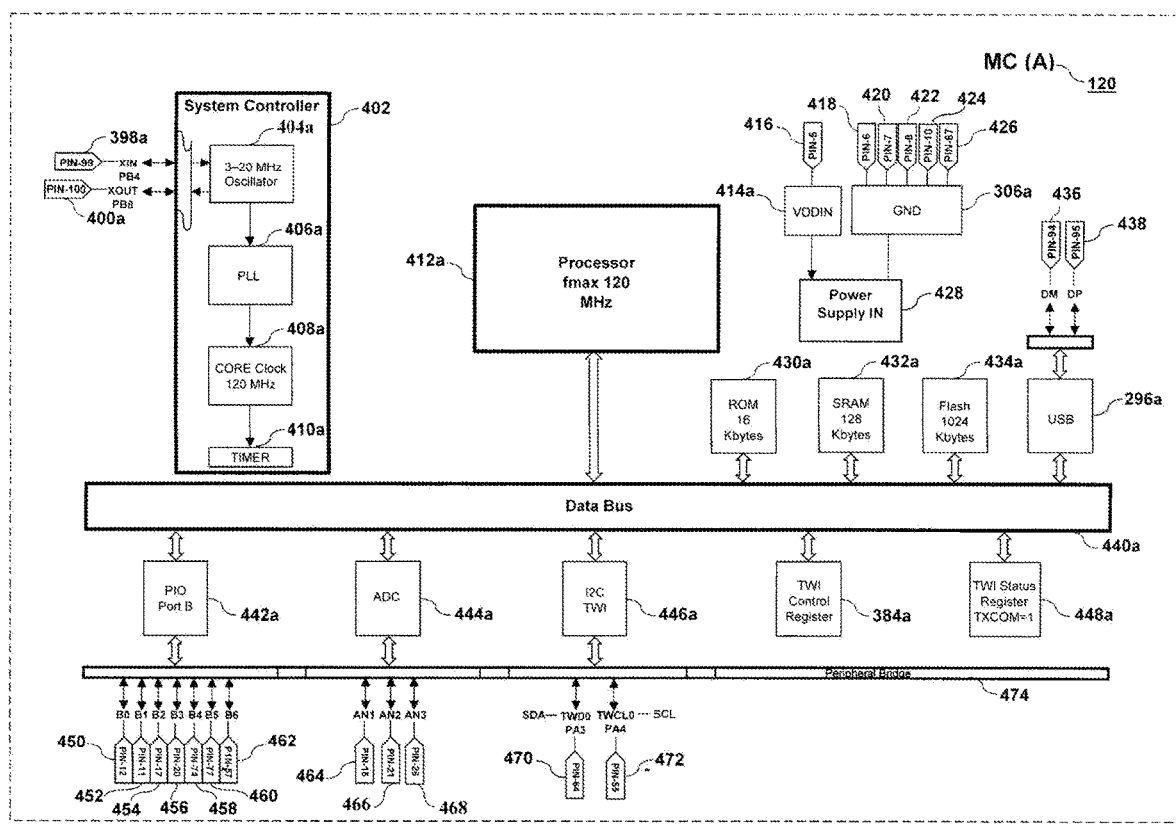
FIG. 25, shows a view of the block diagram of MC (A).

By connecting an oscillator of 20 MHz 302 through the pins OS1 298 and OS2 300*a* found on MC (A) 120, a frequency is generated in the 408*a* core clock of 120 MHz through the PLL 406*a* shown in FIG. 25.

As shown in FIG. 22, shows a view of an electrical schematic layout of the USB multiplexer IC4 326 of MC (A) 120 seen in FIG. 21 and MC (B) 122 seen in FIG. 23; therein the voltage regulator 320 IC3 is the voltage regulator of the 104 USB multiplexer 326, and the voltage regulator 322 IC5 is the voltage regulator of the MC (B) 122 seen in FIG. 23. The VDD 378*a* seen in FIG. 21 is known as voltage input of MC (A) 120 which is connected and received the voltage from the regulator 294 IC2 in FIG. 21; therein the VDD 378*b* of MC (B) 122 seen in FIG. 23 is connected and received the voltage from the regulator IC5 322. The VDD 378 of multiplexer 104 is connected and received the voltage from the 320 IC3 regulator. The out of each regulator goes out to VDD 378 of each circuit.

The pins B0 276, B1 278*a*, and B2 280 of MC (A) 120 will place a combination of bits C0 328, C1 330, and C2 332; therein in function of this combination if it were 000, it will make a switch and interconnect the USB connector 12 with the MC (A) 120 USB 296 that comprises with D0− 292 and D0+ 318. This is controlled through the pins B0 276, B1 278, and B2 280; therein they are interconnected through the multiplexer IC4 326 connecting the physical connection of the USB port A pin 338 D0-0 and PIN 336 D0-1 of the USB multiplexer 326 IC4 with the pins 292 D0− and pin D0+ 318 that is the USB 296 of MC (A) 120 seen in FIG. 21.

When the pins B0 276, B1 278*a*, and B2 280 of MC (A) 120 seen in FIG. 21 that corresponds to the bits C0 328, C1 330, and C2 332 having the combination of 001, then it is interconnected through the USB multiplexer IC4 326 of USB connector 12 with the USB 360 of MC (B) 122; therein a physical connection of the USB port B pins D1-0 342, D1-1 340 of the 326 IC4 USB multiplexer with the pins 380 D0− and 382 D0+ of the MC (B) 122 in FIG. 23. The PB6-EN 334 which means enable, it's in the MC (A) 120 FIG. 21 going to the USB multiplexer 326 IC4. The PB6-EN 334 is a signal having the function to enable and disable the USB multiplexer 326 IC4.

Once connected, the next step is to see if the MC (B) 122 USB 360 has connectivity with the USB connector 12 in FIG. 21, in this case the pins B0 276, B1 278*a*, B2 280 and C0 328, C1 330, and C2 332. The MC (A) 120 in FIG. 21 sends the combination of 001 to C0 328, C1 330, and C2 332 and then, the data of the MC (B) 122 USB 360 in FIG. 23 is switched with the USB connector 12. Once the connection is detected, then through the pin PIN B4 284, the MC (A) 120 will show the LED indicator 260; If it lights up in solid green, it means that the MC (A) 120 USB 296 in FIG. 21 and MC (B) 122 USB 360 in FIG. 23 have connectivity to the USB connector 12 seen in FIG. 21.

Figure 24:
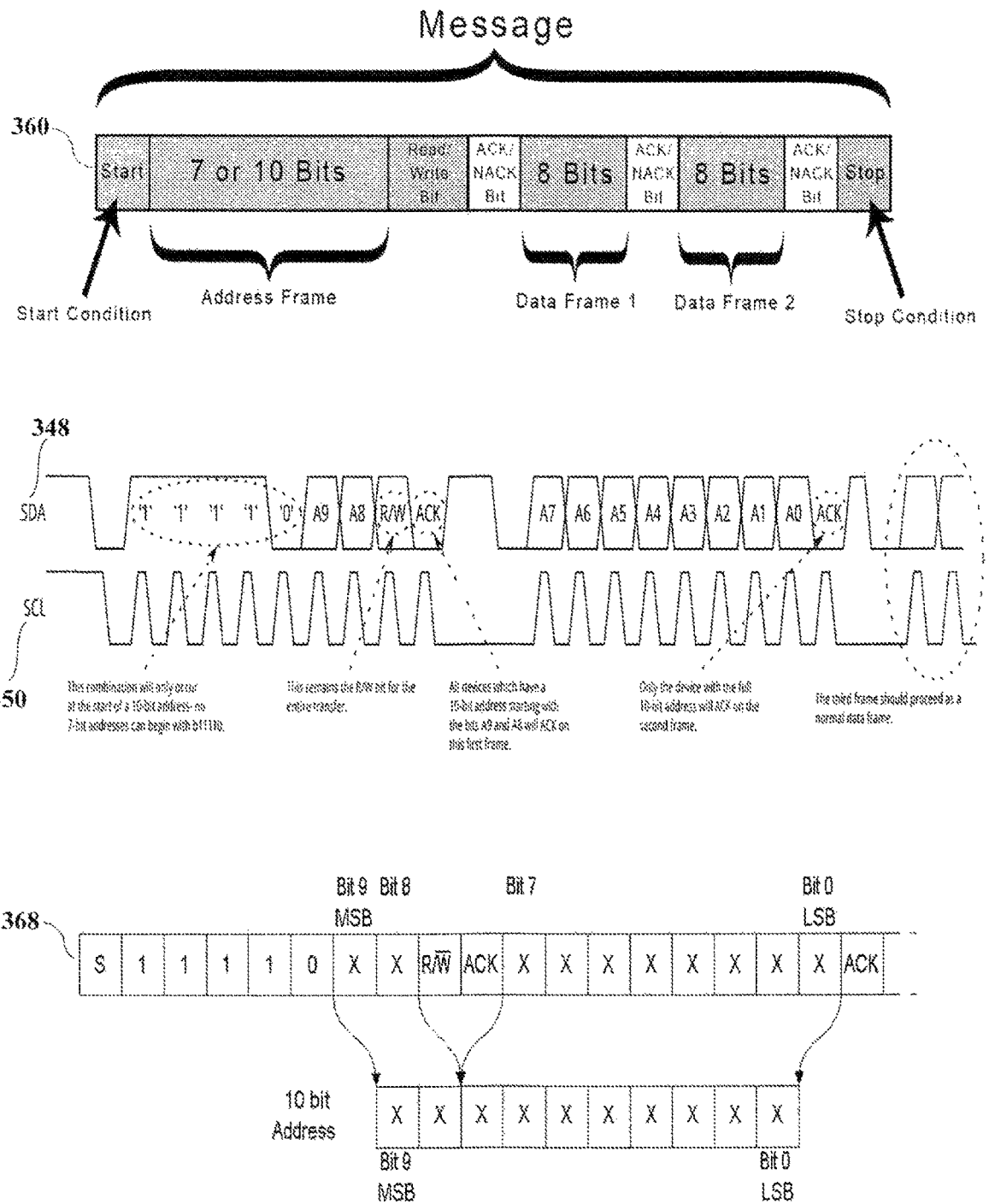
FIG. 24, shows a view of the I2C electrical signals and block diagram of communication between MC (A) and MC (B).
Figure 26:
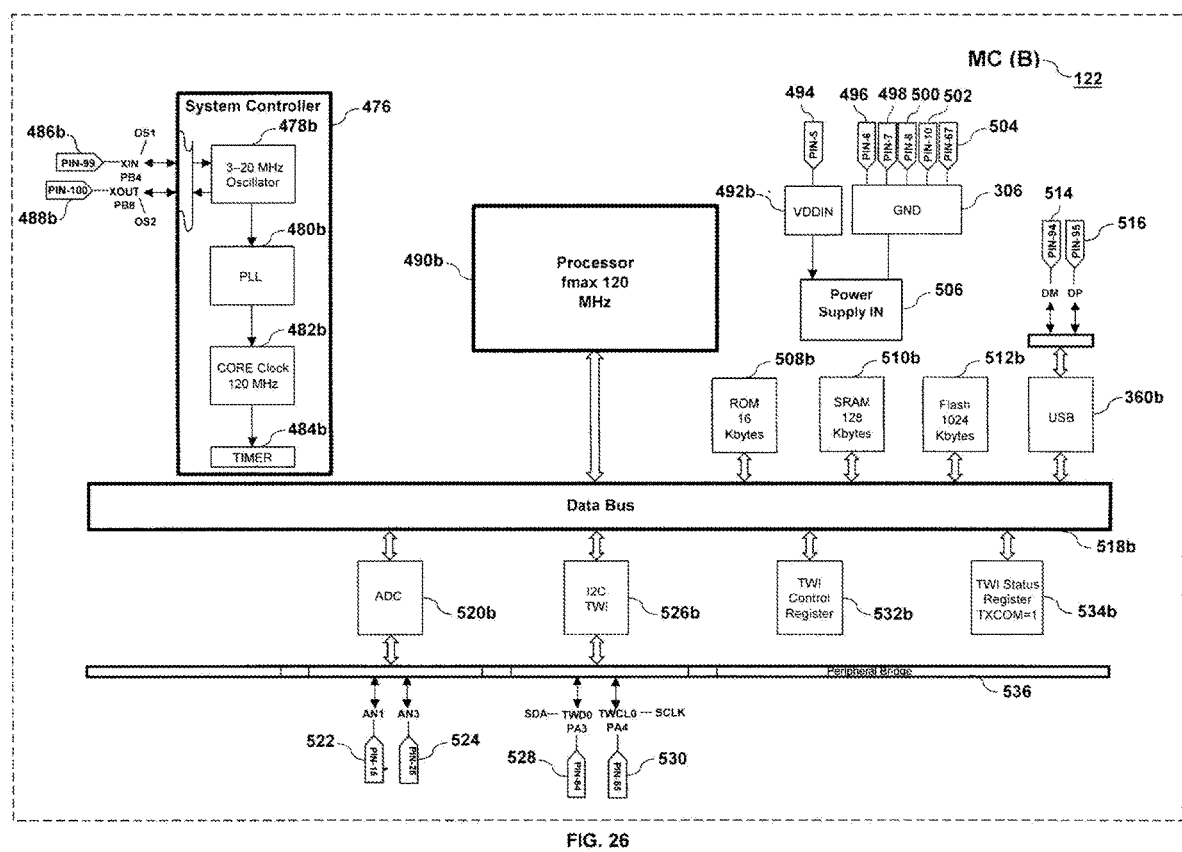
FIG. 26, shows a view of the block diagram of MC (B).

Once the encryption AES-SEA 256-bit key is generated in the MC (A) 120 in FIG. 21 and the encryption AES-SEA 256-bit key is generated in MC (B) 122 in FIG. 23, the communication between the MC (A) 120 and MC (B) 122 will generate the AES-SEA 512-bit key 124 with 10 bits; the pseudo random number process 186 can be modified using a time base to be programmed with a timer 410*a* found on MC (A) 120 in FIG. 25 and a timer 484*b* found on MC (B) 122 in FIG. 26, which have an input of the clock frequency to generate an unpredictable real time randomly symmetrical key 126 encryption seen on FIG. 10 in rounds of 10 bits seen in 368 in FIG. 24.

The capacitors C1 308, C2 264 are found in FIG. 21, the C3 268, C4 270, and C5 272 are found in FIG. 22, therein showing the capacitor C6 344 in FIG. 23 having the function of filtering the signals of the 5 Volts coming from the USB connector 12 in FIG. 21. The capacitors C1 308 and C2 264 seen in FIG. 21, C3 268, C4 270, C5 272, and C6 344 in FIG. 23, have ten micro-farad capacitor and 16 volts written as 10 μF/16v 310 which appears in FIG. 21, FIG. 22, and FIG. 23 wherein the main function is to eliminate the noise and replay in the voltage input.

With respect to the capacitors C2 264 in FIG. 21, C4 270, and C6 344 in FIG. 23 having the values of 10 μF/16v in number 310, their function is to filter the output of 3.3 Volts feeding the physical IC1 356 corresponding to the MC (A) 120 in FIG. 21, IC4 326 USB multiplexer, and physical IC6 358 corresponding to the MC (B) 122 FIG. 23. The nano-farad 100 nF 304*a* capacitor is used to filter out possible noises and ripple input voltage into the MC (A) 120 shown in FIG. 21.

As shown in FIG. 23, shows a view of an electrical schematic layout of the integrated circuit (IC) of MC (B) 122; wherein the resistor 352 R8 and 354 R9 having the main function to limit the entrance of analogic electrical current of the MC (B) 122. The pins SCL 350*b* and pin SDA 348*b* can be found in the MC (B) 122 which are the pins to have all the intercommunication between MC (A) 120 in FIG. 21 and MC (B) 122. The OS1 298*b* and OS2 300*b* are found in MC (B) 122 where the crystal quartz terminal has a maximum value that support 20 MHz of the clock for the instant invention, which is the max speed of processing of software that is put to the MC (B) 122. By connecting an oscillator of 20 MHz 302*b* through the pins OS1 298*b* and OS2 300*b* found on MC (B) 122, a frequency is generated in the 496*b* core clock of 120 MHz through the PLL 494*b* shown in FIG. 26.

The capacitors C6 344 having the value of 10 μF/16v in number 310*b*, the function is to filter the output of 3.3 Volts of regulator 322 IC5 in FIG. 22 feeding the physical IC6 358 corresponding to the MC (B) 122. The nano-farad 100 nF 304*b* capacitor is used to filter out possible noises and ripple input voltage into the MC (B) 122. The capacitor C6 344 employs a function of filtering the signals of the 5 Volts coming from the USB connector 12. The capacitor C6 344 have ten micro-farad capacitor and 16 volts written as 10 μF/16v 310*b* where the main function is to eliminate the noise and replay in the voltage input.

The I2C 180 protocol is a bidirectional communication where the P2PE device 10 and the MC 64-bit MC (A) and MC (B) 16 does the upgrade of the system through the USB connector 12 in FIG. 21 and through the Internet 98 using the ZKP 160 protocol for the 130 BCE.

As shown in FIG. 24, shows a view of the 120 block diagram of communication and electrical signals between MC (A) 120 and MC (B) 122; the 120 communication protocol can be seen on the block diagram corresponding to the number 360; wherein the start signals SDA 348 always referencing the fall of the clock, i.e., whenever the clock goes from 1 to 0 is when the signal data stage changes, then the start command is given.

The instant invention will process 10 bits. With respect to number 368 in the I2C communication protocol 10 bits, the start commands its utilized combining a chain of binary 5 bits "11110," 2 bits bit 9, bit 8, command R/W, Ack and later the bits of bit 7 to bit 0 (10 bits) of address.

In the MC (A) 120 and MC (B) 122, the I2C 180 protocol communication is programmed in master and slave mode in the 384*a* TWI register; therein the instant invention uses a microcontroller to be always programmed in master mode and the other microcontroller in slave mode seen in FIG. 25.

There is a command that is the RW seen in FIG. 24 I2C block diagram corresponding to the number 360 which is the Read and Write; Read means it's the SDA number 348 with 10 bits that Reads; therein the message is received, and Write, the message is sent. The acknowledge signal means that the MC (A) 120 or MC (B) 122 that is accessing had sent the acknowledge signal handshake to the MC that is going to Read or Write. After these 10 bits addresses, 8 data bits are generated.

The instant invention process 8 bits where at that time is sending the 8 bits, therein sending 10 bits sequentially from D0 to D7, and each time 1 byte is completed, then a signal of acknowledgement is generated as it is shown in the I2C electrical signal in the SDA number 348 and number 350 SCL shown in FIG. 24.

As shown in FIG. 25, shows a view of the block diagram of MC (A) 120 where the 412*a* processor fmax 120 MHz means central processing unit (CPU) which is capable of operating at 120 MHz; therein the 120 MHz are achieved through the 402 system controller module which is composed of several modules such as the 3-20 MHz oscillator 404*a* that receives the signal from the 398*a* port B4 pin 99 XIN and the 400*a* port B8 pin 100 XOUT. The 398*a* pin 99 corresponds to the quartz crystal input of the oscillator 3-20 MHz 404*a* and the 400*a* pin 100 corresponds to the quartz crystal output of the oscillator 3-20 MHz 404*a*; the inputs of these pins are XIN and the output is XOUT where the XIN is the PB4 and the XOUT is the PB8. In these pins a physical connection of the 20 MHz will be made where this oscillation is connected to the module 404*a* which is a 3-20 MHz oscillator; therein the frequency is connected to the module 406*a* which is the phase-locked loop (PLL). The 406*a* PLL based on the frequency of 3-20 MHz oscillator 404*a* divides this signal by achieving a 408*a* core clock 120 MHz used in the 412*a* processor fmax 120 MHz.

Figure 31:
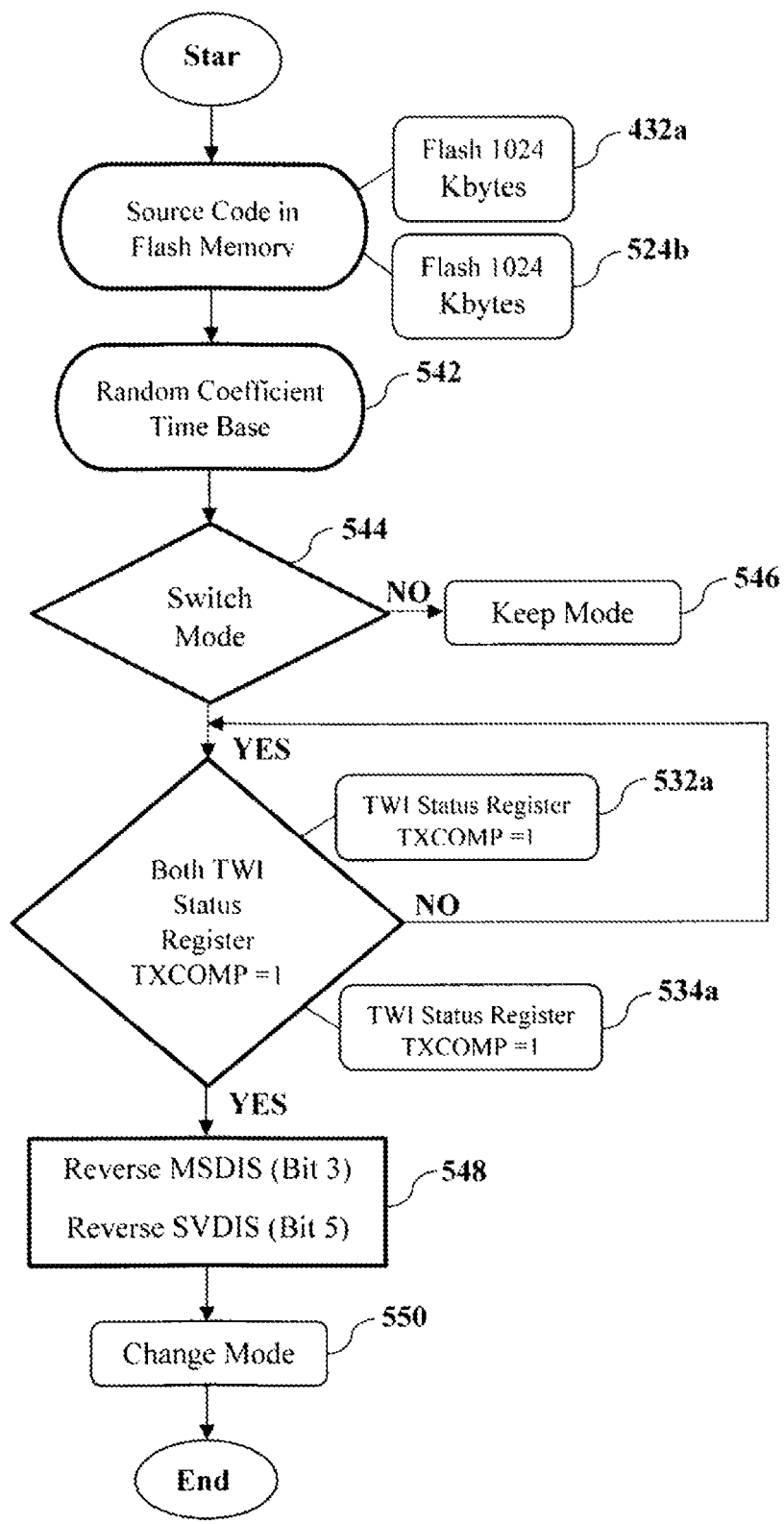
FIG. 31, shows a flowchart of MC (A) and MC (B) methods of switching to master and slave mode.

The pseudo random number process 186 seen in FIG. 15 and the random coefficient time base 542 seen in FIG. 31 are generated from the time base that is programmed in the timer 410*a* of MC (A) 120; therein generating the real time validation randomly symmetrical key 126 seen in FIG. 10. The random coefficient time base 542 seen in FIG. 31 is used to make a decision to switch from the master mode to slave mode, and slave mode to master mode.

Different ports are being utilized like the digital parallel signals where the module 442*a* PIO Port B (Programmed Input/Output) will be used with 7 bits from B0 to B6; therein port B0 corresponding to pin 12 number 450, port B1 pin 11 number 452, and port B2 pin 17 number 454 are used to select the port and channel in the USB multiplexer IC4 326 seen in FIG. 22 where depending on the combination of these bits B0, B1, and B2, port 0 of the USB multiplexer IC4 326 and port 1 of the USB multiplexer IC4 326 will be selected. For example, using a combination 000 corresponding to port 0 of the USB multiplexer IC4 326 and using a combination 001 on port 1 in the USB multiplexer IC4 326 shown in FIG. 22.

The port B3 corresponding to the pin 20 number 456 is used to connect the LED 258 shown in FIG. 21 which has the function of indicating the state of the voltage in the circuit; therein the port B4 pin 74 number 458 connects the LED 260 which indicates the status of the connection of the USB 296, and the port B5 pin 77 number 460 connects the LED 262 that indicates the status of the Internet connectivity between the P2PE device 10 and IoT device. With respect to port B6 pin 57 number 462 corresponding also to number 334 PB6 EN in FIG. 21 has the function of enable and disable the USB multiplexer IC4 326 shown in FIG. 22.

The port AN1 pin 15 number 464 has the function of registering the voltage input of 5 Volts 266 in the USB Connector 12 in FIG. 21 through the exit of 314 jp1; the ports AN1 464, AN2 466, and AN3 468 enter the 444*a* analog-to-digital converter (ADC) module inside the MC (A) 120. The port AN2 pin 21 number 466 has the function of checking the voltage of 3.3 Volts at the output of the voltage regulator IC2 294 in FIG. 21; therein the port AN3 pin 26 number 468 has the function of sensing the voltage at the output of the IC5 322 regulator seen in FIG. 22.

The module of the I2C protocol TWI number 446*a* see FIG. 25 where two signals are connected, the TWD0 port A3 pin 64 number 470 that corresponds to the SDA 348*a* of the MC (A) 120 shown in FIG. 21, and the TWCL0 A4 pin 55 number 472 that corresponds to the SCL 350*a*; therein the TWI control register 384*a* has 8-bits to program the MC (A) 120 and MC (B) 122 of master mode and slave mode being an internal register. The TWI control register 384*a* and the 448*a* TWI status register TXCOM=1 have the function of setup the I2C 180 protocol; therein the TWI control register 384*a* is used to enable and disable the master and slave mode. The 448*a* TWI status register TXCOM=1 is used to check if the communication between the MC (A) 120 and MC (B)122 are complete and switch both microcontrollers to master and slave mode; therein the TWI control register 384*a* and the 448*a* TWI status register TXCOM=1 are connected to the data bus 440*a* to have communication with the 412*a* processor fmax 120 MHz.

The peripheral bridge 474 is used between the pins and the internal blocks of the MC (A) 120; therein the USB 296*a* module enter the port DM pin 94 number 436 and the port DP pin 95 number 438 where the function of these two pins the 288 D− and the D+ 290 correspond to the port of USB connector 12 shown in FIG. 21 which is used to connect with the IoT device.

The module 430*a* read-only memory (ROM) 16 Kbytes has the function of maintaining the data and the programs permanently having energy power and not where the system's information is maintained until it is not erased electrically. The module 432*a* static random-access memory (SRAM) 128 Kbytes has the function of saving the data within the program where if the energy power goes away, the information inside that memory is lost. This is identified as dynamic memory. Consequently, the module 434*a* flash 1024 Kbytes is utilized for the source code program to be recorded and saved.

The module 428 power supply IN which in turn has two submodules, the VDDIN 414*a*, and the ground 306*a*; wherein the VDDIN 414*a* has the pin 5 corresponding to the number 416, which has the function of entering the 3.3 Volts or input voltage of the MC (A) 120. While in the ground 306*a*, there are different pins that are used for this function within the MC (A) 120, which are pin 6 number 418, pin 7 number 420, pin 8 number 422, pin 10 number 424, and pin 67 number 426. The ground 306a module main function is the reference to voltage because for there to be voltage and current pass electrical current, it must be a reference like the ground 306a where the negative of the voltage source and VDDIN 414a is the positive of the voltage source.

Lastly, the data bus 440a inside the MC (A) 120 has the function that by passes all the information from the internal peripherals or the internal blocks such as PIO port B 442a, ADC 444a, 120 TWI 446a, USB 296a, TWI control register 384a, and like all the information that travels to and from the ROM memory 16 Kbytes 430a, SRAM 128 Kbytes 432a, flash 1024 Kbytes 434a, and USB 296a where all the data pass through the data bus 440a to the processor fmax 120 MHz 412a.

As shown in FIG. 26, shows a view of the block diagram of MC (B) 122 where The CPU 490b processor fmax 120 MHz means central processing unit which is capable of operating at 120 MHz; therein the 120 MHz are achieved through the 476 system controller module which is composed of several modules such as the 3-20 MHz oscillator 478b that receives the signal from the 486b port B4 pin 99 XIN corresponding to OS1 298b in FIG. 23 and the 488b port B8 pin 100 XOUT corresponding to OS2 300b also in FIG. 23, which are connected to the quartz crystal 20 MHz 302b shown on FIG. 23 in the MC (B) 122. The 486b pin 99 corresponds to the Quartz Crystal input of the Oscillator 3-20 MHz 478b and the 488b pin 100 corresponds to the quartz crystal output of the oscillator 3-20 MHz 478b; the inputs of these pins are XIN and the output is XOUT where the XIN is the PB4 and the XOUT is the PB8. In these pins a physical connection of the 20 MHz will be made where this oscillation is connected to the module 478b which is a 3-20 MHz oscillator; therein the frequency is connected to the module 480b which is the phase-locked loop (PLL). The 480b PLL based on the frequency of 3-20 MHz oscillator 478b divides this signal by achieving a 482b core clock 120 MHz used in the 490b processor fmax 120 MHz.

The pseudo random number process 186 seen in FIG. 15 and the random coefficient time base 542 seen in FIG. 31 are generated from the time base that is programmed in the timer 484b of MC (B) 122; therein generating the real time validation randomly symmetrical key 126 seen in FIG. 10. The random coefficient time base 542 seen in FIG. 31 is used to make a decision to switch from the master mode to slave mode, and slave mode to master mode.

The module ADC 520b is connected through the peripheral bridge 536 where the port AN1 pin 15 number 522 has the function of sensing the output voltage of the 322 IC5 of the 3.3 Volts shown in FIG. 22. The ADC 520b module also has the port AN3 pin 26 number 524 connected, which has the function of sensing the voltage of the IC2 294 circuitry seen in FIG. 21.

The module of the I2C protocol TWI number 526b where two signals are connected, the TWD0 port A3 PIN 64 number 528 that corresponds to the SDA 348b of the MC (B) 122 shown in FIG. 23, and the TWCL0 A4 pin 55 number 530 that corresponds to the SOL 350b; therein the TWI control register 532b has 8-bits to program the MC (A) 120 and MC (B) 122 of master mode and slave mode being an internal register. The TWI control register 532b and the 534b TWI status register TXCOM=1 have the function of setup the I2C 180 protocol; therein the TWI control register 532b is used to enable and disable the master and slave mode. The 534b TWI status register TXCOM=1 is used to check if the communication between the MC (A) 120 and MC (B)122 are complete and switch both microcontrollers to master and slave mode; therein the TWI control register 532b and the 534b see FIG. 30 TWI status register TXCOM=1 are connected to the data bus 518b to have communication with the 490b processor fmax 120 MHz.

The peripheral bridge 536 is used between the pins and the internal blocks of the MC (B) 122; therein the USB 360b module enter the port DM pin 94 number 514 and the port DP pin 95 number 516 where the function of these two pins the 288 D− and the D+ 290 correspond to the port of USB connector 12 shown in FIG. 21 which is used to connect with the IoT device.

The module 508b read-only memory (ROM) 16 Kbytes has the function of maintaining the data and the programs permanently having energy power and not where the system's information is maintained until it is not erased electrically. The module 510b static random-access memory (SRAM) 128 Kbytes has the function of saving the data within the program where if the energy power goes away, the information inside that memory is lost. This is identified as dynamic memory. Consequently, the module 512b flash 1024 Kbytes is utilized for the source code program to be recorded or saved.

The module 506 power supply IN which in turn has two submodules, the VDDIN 492b, and the ground 306; wherein the VDDIN 492b has the pin 5 corresponding to the number 494, which has the function of entering the 3.3 Volts or input voltage of the MC (B) 122. While in the ground 306, there are different pins that are used for this function within the MC (B) 122, which are pin 6 number 496, pin 7 number 498, pin 8 number 500, pin 10 number 502, and pin 67 number 504. The ground 306 module main function is the reference to voltage because for there to be voltage and current pass electrical current, it must be a reference like the ground 306 where the negative of the voltage source and VDDIN 492b is the positive of the voltage source.

Lastly, the data bus 518b inside the MC (B) 122 has the function that by passes all the information from the internal peripherals and the internal blocks such as I2C TWI 526b, USB 360b, TWI control register 532b, and like all the information that travels to and from the ROM memory 16 Kbytes 508b, SRAM 128 Kbytes 510b, flash 1024 Kbytes 512b, and USB 360 where all the data pass through the data bus 518b to the processor fmax 120 MHz 490b.

One of the functions of MC (B) 122 is software and programming by complementing the encryption of the AES-SEA 512-bit key throughout the MC (A) 120 and MC (B) 122; in the same MC (A) 120 could be the master mode and slave mode, and MC (B) 122 could also be the master mode and slave mode.

Figure 27:
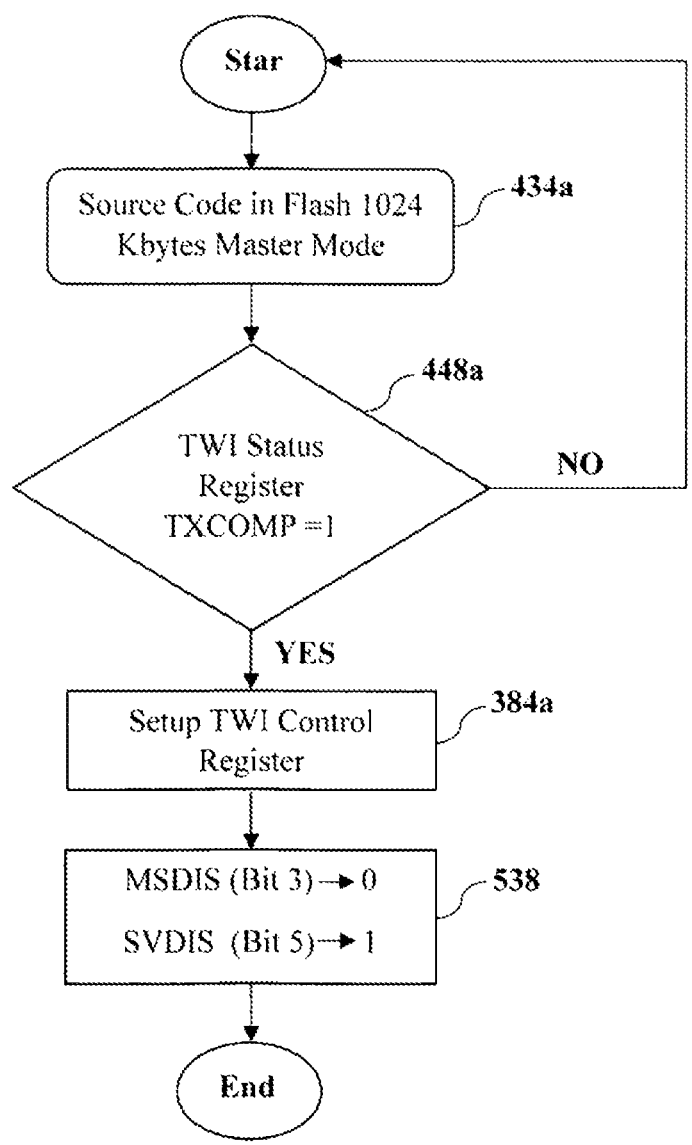
FIG. 27, shows a flowchart of MC (A) programmed in master mode.

As shown in FIG. 27, shows a flowchart of MC (A) 120 programmed in a master mode where the method is in the source code in the 434a flash memory 1024 Kbytes. First, the status of the 448a TWI status register TXCOMP=1 must be check, the TXCOMP means transmission complete where the bit 0 is the transmission complete. The 448a TWI status register TXCOMP=1 have 8 bits where the bit 0 is being check, which is the transmission complete. And, if the transmission complete is 1 and when the transmission between the microcontrollers across the 180 I2C protocol are complete, the bit 1 it's a flag meaning that the software checks the status of 1 bit and byte. In this case, the status of transmission complete is being checked meaning that if it is 1, the transmission is complete=1 whereas if it is 0, the transmission is not complete where the MC (A) 120 and MC (B) 122 automatically sends the status of this bit; therein the method is being asked to start again. Then, if it's a Yes, the setup must be done in the TWI control register 384a where the setup is done through the 538 MSDIS (bit 3)=0 and SLDIS (bit 5)=1, which means that the master disable bit 3 should be in 0 and the slave disable bit 5 should be in 1. The TWI control registers 384a have 8 bits where bit 3 and bit 5 must be checked where to enable the master mode, the master disable must be in 0. This finalizes the method of programming the MC (A) 120 in master mode.

Figure 28:
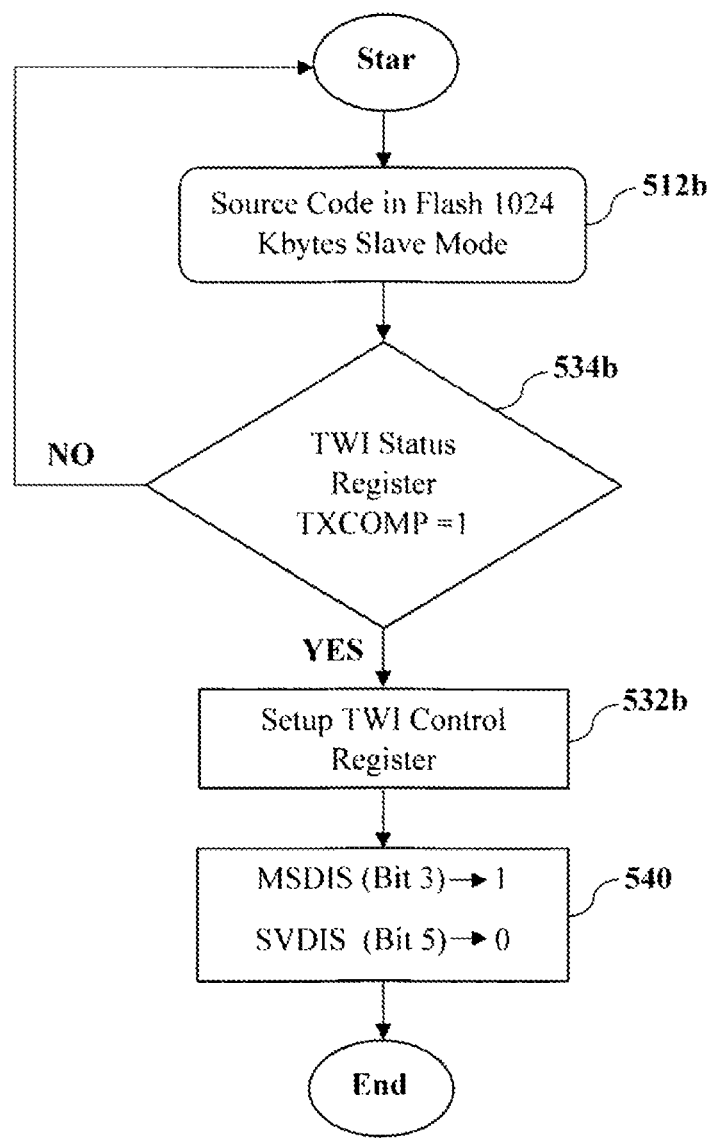
FIG. 28, shows a flowchart of MC (B) programmed in slave mode.

As shown in FIG. 28 shows a flowchart of MC (B) 122 programmed in a slave mode where the method is in the source code in the 512b flash memory 1024 Kbytes. First, the status of the 534b TWI status register TXCOMP=1 must be check; wherein the 534b TWI status register TXCOMP=1 have 8 bits where the bit 0 is being check which corresponds to transmission complete. Then, if the transmission complete between the microcontrollers are not ready means No, the method starts, and if the transmission complete is ready means Yes, the next step is to program the TWI control register 532b. In other words, the TWI control register 490b is programmed to write in the 540 MSDIS (bit 3)=1 and SLDIS (bit 5)=0, which means that the master disable bit 3 should be in 1 and the slave disable bit 5 should be in 0. This finalizes the method of programming the MC (B) 122 in slave mode.

Figure 29:
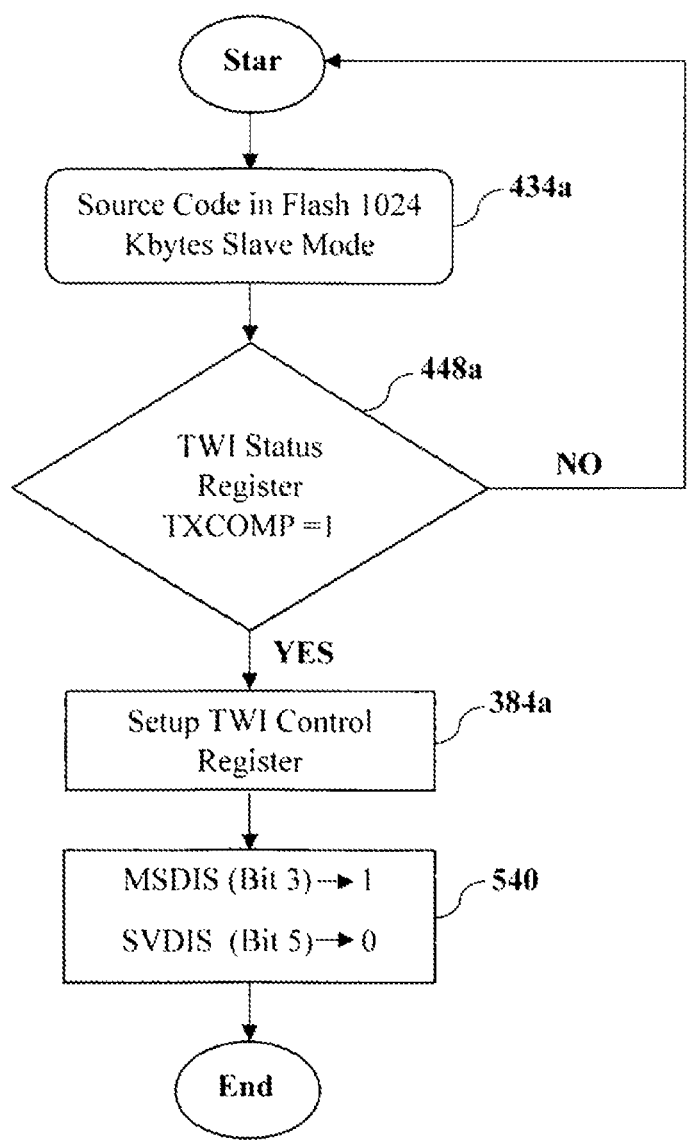
FIG. 29, shows a flowchart of MC (A) programmed in slave mode.

As shown in FIG. 29, shows a flowchart of MC (A) 120 programmed in a slave mode where the method is in the source code in the 434a flash memory 1024 Kbytes. First, the status of the 434a TWI status register TXCOMP=1 must be check, the TXCOMP means transmission complete where the bit 0 is the transmission complete. The 448a TWI status register TXCOMP=1 have 8 bits where the bit 0 is being check, which is the transmission complete. And if the transmission complete is 1, when the transmission between the microcontrollers across the I2C 180 protocol are complete, the bit 1 it's a flag which is the transmission complete=1, and if it's not, the method is being asked to start again. Then, if it's a Yes, the setup must be done in the TWI control register 384a. In other words, the setup must be done through the 540 MSDIS (bit 3)=1 and SLDIS (bit 5)=0, which means that the master disable bit 3 should be in 1 and the slave disable bit 5 should be in 0. The TWI control registers 384a have 8 bits where bit 3 and bit 5 must be checked where to enable the slave mode, the slave disable must be in 0. This finalizes the method of programming the MC (A) 120 in slave mode.

Figure 30:
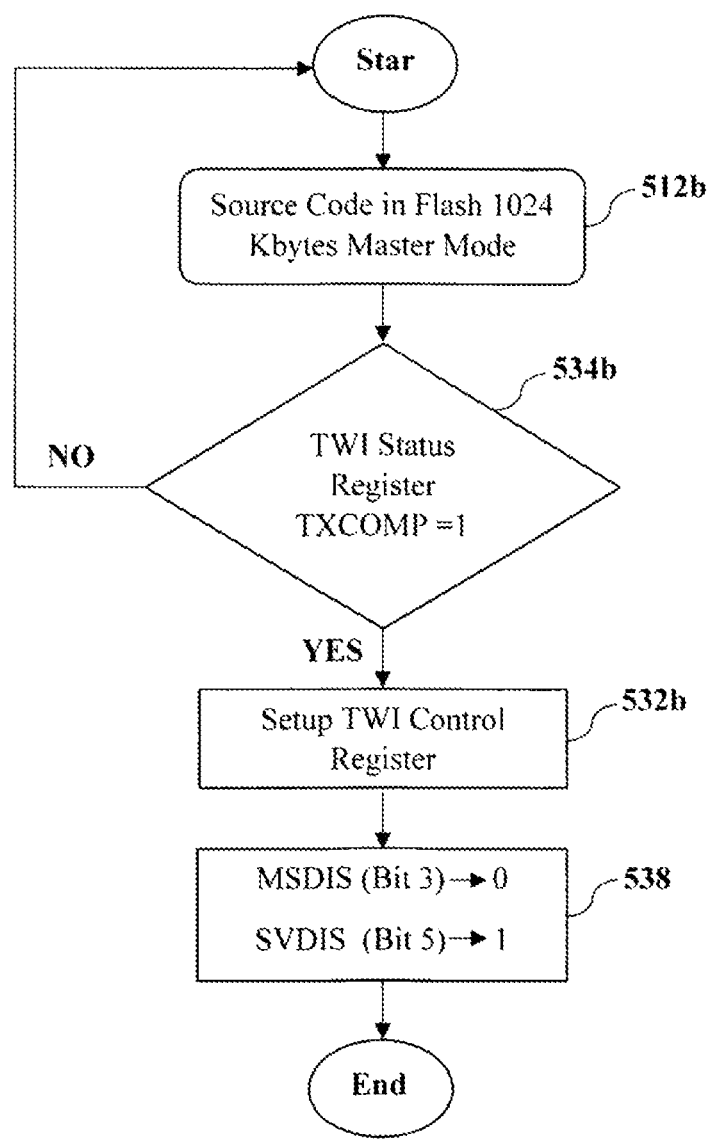
FIG. 30, shows a flowchart of MC (B) programmed in master mode.

As shown in FIG. 30 shows a flowchart of MC (B) 122 programmed in a master mode where the method is in the source code in the 524b flash memory 1024 Kbytes. First, the status of the 534b TWI status register TXCOMP=1 must be check; wherein the 534b TWI status register TXCOMP=1 have 8 bits where the bit 0 is being check which corresponds to transmission complete. Then, if the transmission complete between the microcontrollers are not ready means No, the method starts, and if the transmission complete is ready means Yes, the next step is to program the TWI control register 532b. In other words, the TWI control registers 532b is programmed to write in the 538 MSDIS (bit 3)=0 and SLDIS (bit 5)=1, which means that the master disable bit 3 should be in 0 and the slave disable bit 5 should be in 1. This finalizes the method of programming the MC (B) 122 in master mode.

As shown in FIG. 31, shows a flowchart of MC (A) 120 and MC (B) 122 methods of switching to master and slave mode; therein having the source code in flash memory 1024 Kbytes 434a in MC (A) 120 seen in FIG. 25 and flash memory 1024 Kbytes 512b for MC (B) 122 seen in FIG. 26. The mode of master and slave can be switched using the random coefficient time base 542 which is the result to the programmed timer 410a of MC (A) 120 in FIG. 25 and the timer 484b of MC (B) 122 in FIG. 26. In this case, the timers 410a and 484b are programmed by a programmer to create a time base by multiplying for the random coefficient time base 542; therein the programmer makes the decision to 544 switch modes for master to slave using the encoded algorithm in the source code of the flash memory, and if there is No switch mode 544, then, the keep mode 546 is applied. If the programmer makes the decision to switch mode 544, first, the status of the flag is checked with the bit 0 meaning transmission complete of the 448a TWI status register TXCOM=1 and the 534b TWI status register TXCOM=1, and if the bit is not 0, the transmission is not complete. Then, the method asked again if this bit is in 1, if it is in bit1 of transmission complete, the switch mode 544 is used to 548 reverse MSDIS bit 3 and reverse the SVDIS bit 5. This means that if MC (A) 120 is in master mode, then the 548 reverse MSDIS bit 3 and reverse the SVDIS bit 5 will change mode 550 to slave mode. As an example, by reversing both bits on the 548 reverse MSDIS bit 3 and reverse the SVDIS bit 5, if the bit 3 is in 0, it is switch to 1, and if the bit 5 is in 1, then the switch is made to 0. By reversing the bits, the mode can be change, and the method is completed in both microcontrollers.

Figure 32:
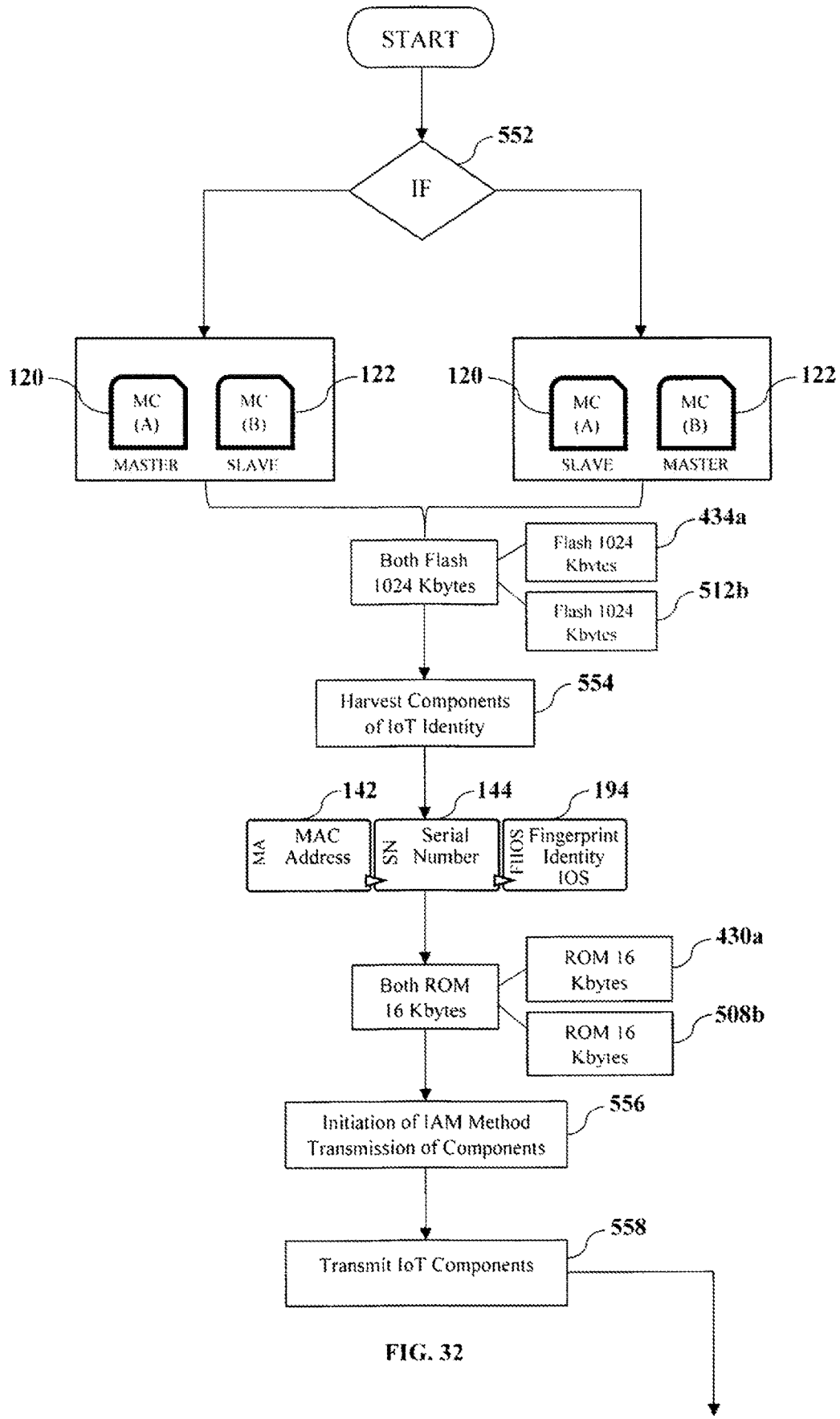
FIG. 32, shows a flowchart of the IAM method of IoT identity.

As shown in FIG. 32, shows a flowchart of the IAM method of IoT identity. Once the P2PE device 10 is validated which is inserted into an IoT, the if 552 takes place with two scenarios, such as if 552 the MC (A) 120 is in master mode and MC (B) 122 is in slave mode whereas if 552 the MC (A) 120 is in slave mode and MC (B) 122 is in master mode; therein the 434a flash 1024 Kbytes and 512b flash 1024 Kbytes are accessed to write the source code into both flash memories for the IAM method of IoT identity. The 434a flash 1024 Kbytes and 512b flash 1024 Kbytes are going to harvest components of IoT identity 554 such as the MAC address 142, serial number 144, and fingerprint identity IOS 194; therein the MC (A) 120 in master mode and MC (B) 122 in slave mode will write to the 430a ROM 16 Kbytes and 508b ROM 16 Kbytes. Then, the initiation of IAM method transmission of components 556 is introduced to transmit the IoT components 558 such as MAC address 142, serial number 144, and fingerprint identity IOS 194 to the central server database 104 seen in FIG. 33.

Figure 33:
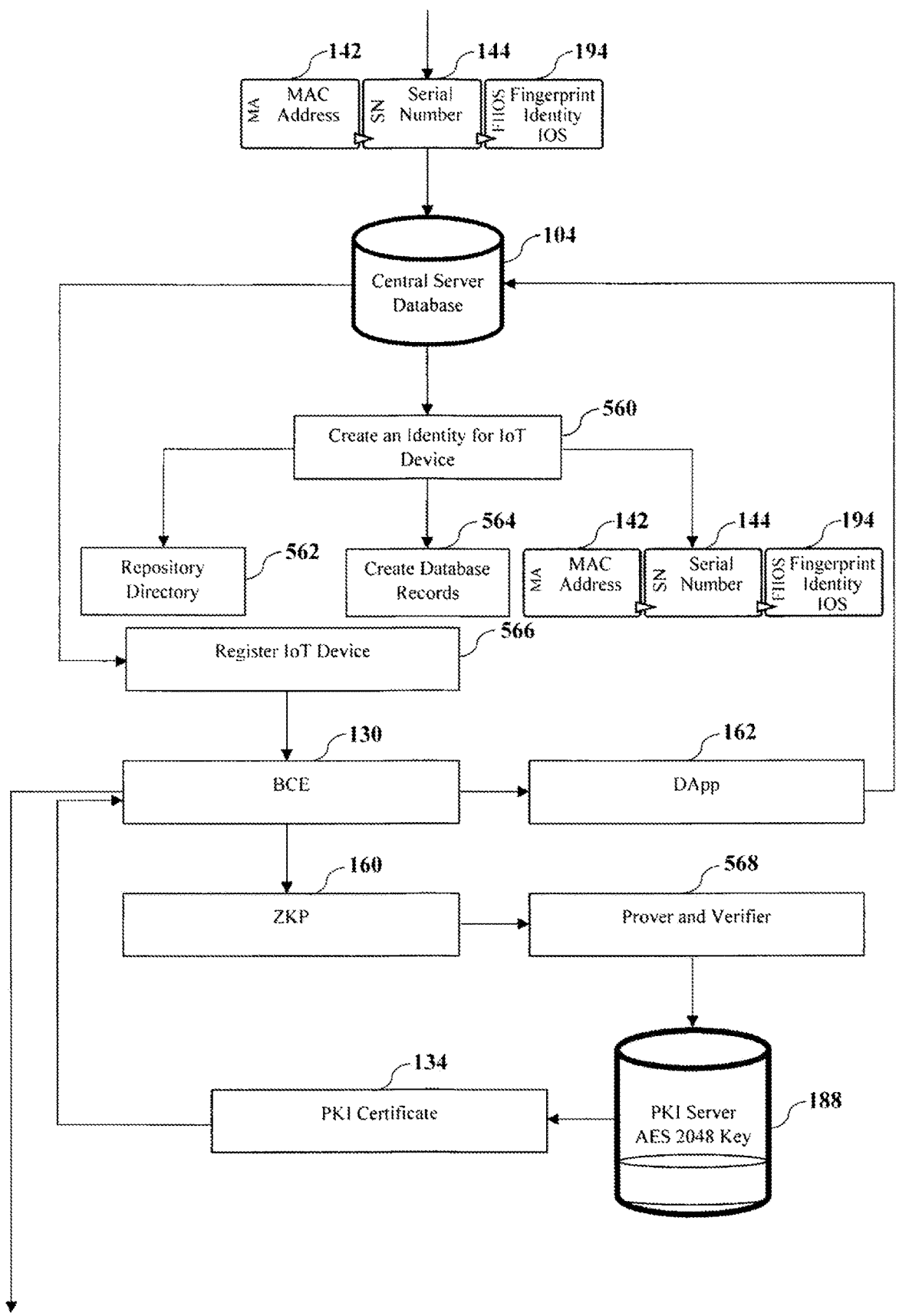
FIG. 33, shows a flowchart of the IAM method of IoT identity.

As shown in FIG. 33, shows a flowchart of the IAM method of IoT identity where the central server database 104 receives the transmission of IoT components 558 with the MAC address 142, serial number 144, and fingerprint identity IOS 194; therein the central server database 104 creates an identity for IoT devices 560 creating a repository directory 562. The repository directory 562 is prepopulated inside the central server database 104 with components that are predefined based on the gathering of information of IoT devices such as Email 146, QER 148, and RFID 150 seen in FIG. 36 where the central server database 104 has stored creating the database records 564, including the MAC address 142, serial number 144, and fingerprint identity IOS 194.

The next step registers the IoT device 566 once the previous steps are completed; therein communicating to BCE 130 via DAPP 162 protocols to central server database 104. The BCE 130 is using the ZKP 160 protocol to do a prover and verifier 568 which verifies the correct information about IoT devices in the prover and verifier 568; therein utilizing the PKI server AES 2048 key 188 to set a PKI certificate 134 into the BCE 130 ledger which creates the smart contract claims 570 seen in FIG. 34.

Figure 34:
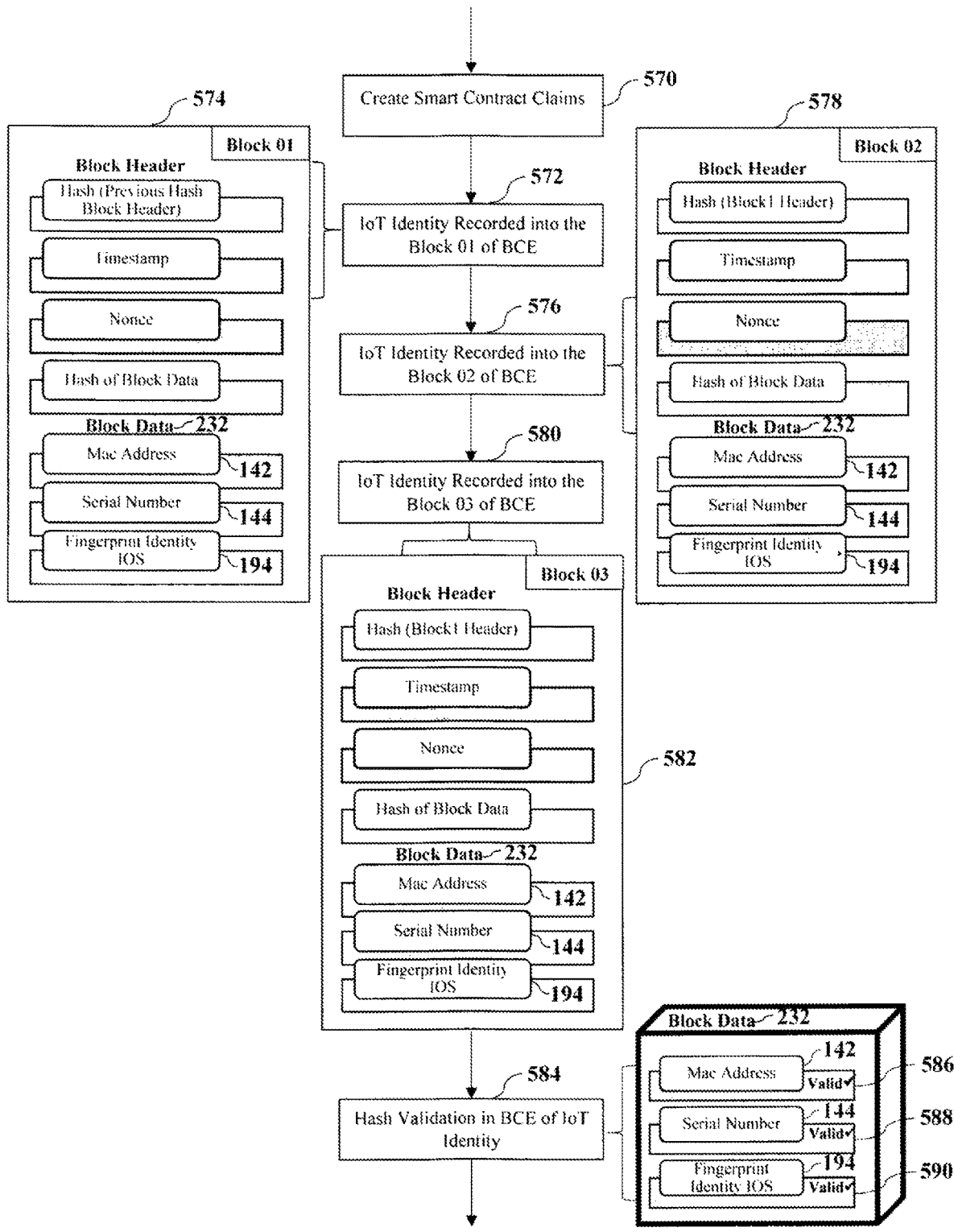
FIG. 34, shows a flowchart of the IAM method of IoT identity.

As shown in FIG. 34, shows a flowchart of the IAM method of IoT identity; therein to create the smart contract claims 570 into the BCE 130 seen in FIG. 33. Then, the 572 IoT identity is created and recorded into the block 01 of BCE 130 which contains the hash of the block data, MAC address 142, serial number 144, and fingerprint identity IOS 194; therein recorded in the block data 232 within the blockchain transactional ledger in 574 block 01 containing a list of validated, authentic transactions, and ledger events.

The hash chain applies to 574 block 01, 578 block 02, and 582 block 03 where data is bundle into blocks as an append-only data structure that includes a hash of the previous block data 232 within the newest block; therein providing for data structure with evidence of tampering because any modification to a block's data 232 will change the hash digest recorded by the following block.

Next, the 576 IoT identity is created and recorded into the block 02 of BCE 130 which contains the hash of the block data, MAC address 142, serial number 144, and fingerprint identity IOS 194; therein recorded in the block data 232 within the blockchain transactional ledger in 578 block 02 containing a list of validated, authentic transactions, and ledger events.

Following, the 580 IoT identity is created and recorded into the block 03 of BCE 130 which contains the hash of the block data, MAC address 142, serial number 144, and fingerprint identity IOS 194; therein recorded in the block data 232 within the blockchain transactional ledger in 582 block 03 containing a list of validated, authentic transactions and ledger events.

Figure 35:
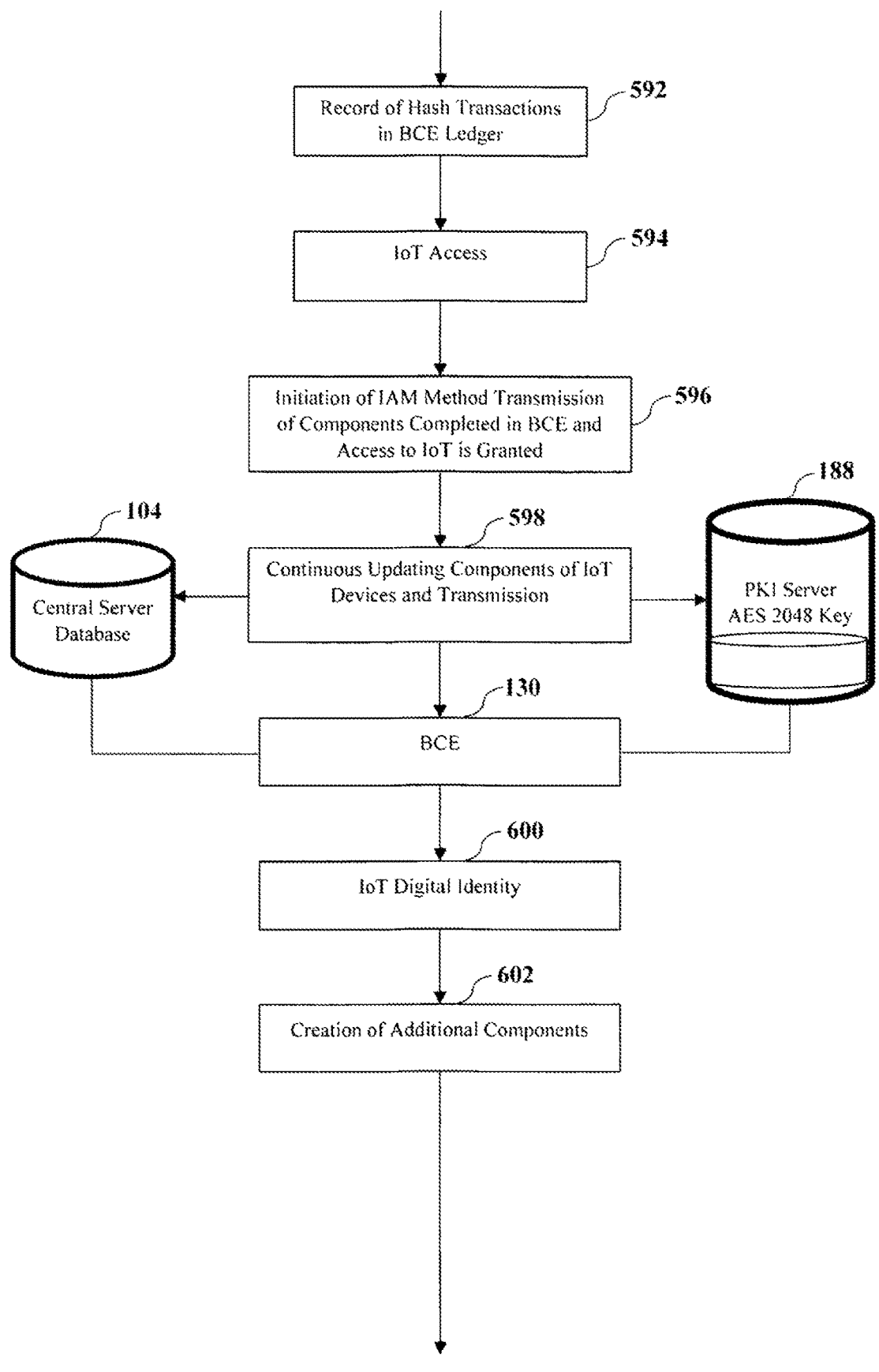
FIG. 35, shows a flowchart of the IAM method of IoT identity.

Once all the IoT identity of the three blocks are completed and recorded into the BCE 130, then, the hash validation in BCE of IoT identity 584 takes place in the block data 232 of the MAC address 142, serial number 144, and fingerprint identity IOS 194 to be validated showing the mark valid 586, mark valid 588, and mark valid 590; therein the record of hash transactions in BCE ledger 592 are recorded seen in FIG. 35.

As shown in FIG. 35, shows a flowchart of the IAM method of IoT identity; therein the record of hash transactions in BCE ledger 592 collection of transactions are recorded chronologically to provide an IoT access 594 into the IAM where the 596 initiation of IAM method transmission of components are completed in BCE and access to IoT will be granted.

Next, the continuous updating components of IoT devices and transmission 598 provides communication via the PKI server AES 2048 key 188 to the BCE 130; therein going back to the central server database 104 to update the IAM of the IoT which provides IoT digital identity 600.

Figure 36:
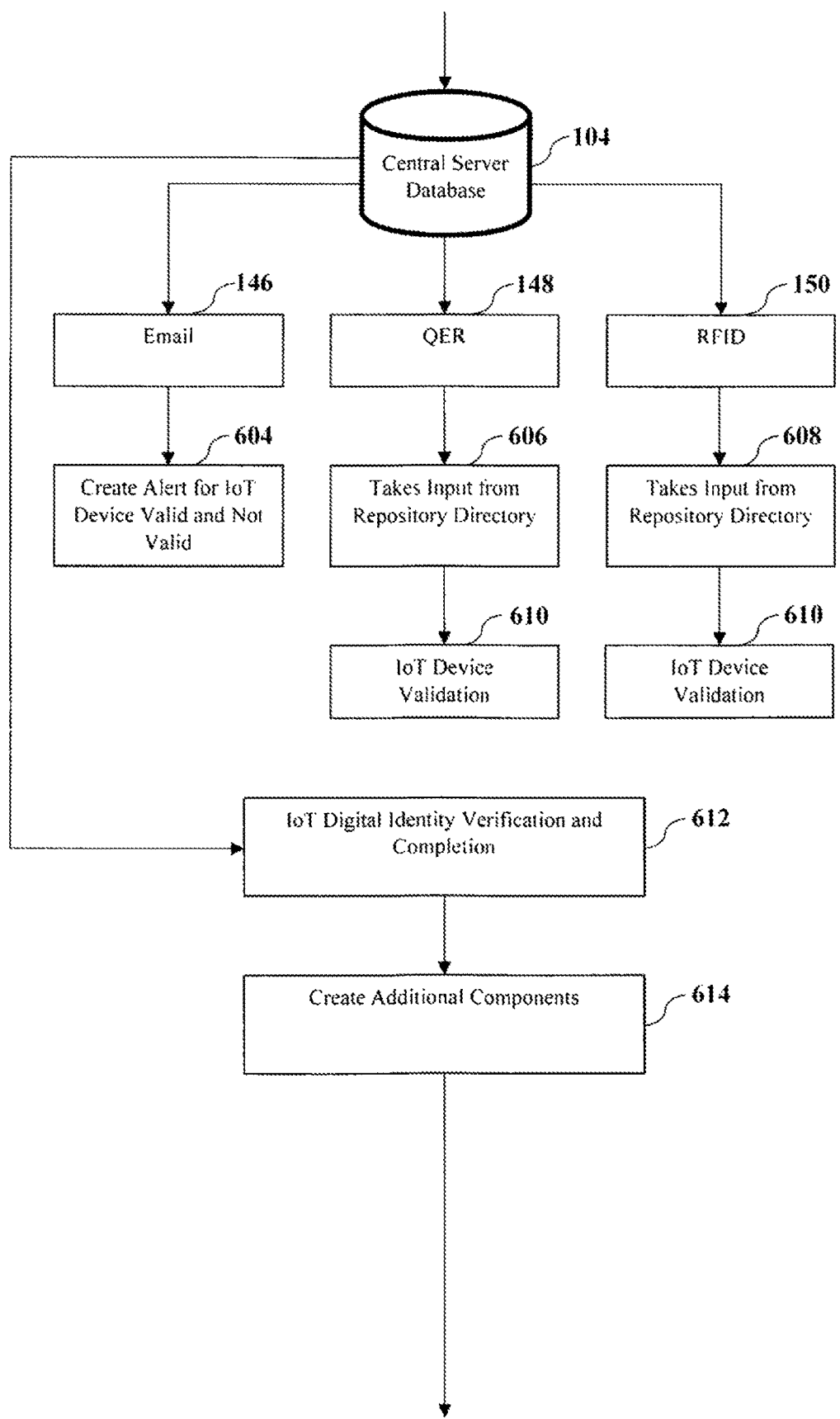
FIG. 36, shows a flowchart of the IAM method of IoT identity.

Following, the creation of additional components 602 will take place in the central server database 104 seen in FIG. 36.

As shown in FIG. 36, shows a flowchart of the IAM method of IoT identity. The creation of additional components 602 from FIG. 35 are created in the central server database 104 such as email 146 to create an alert for IoT devices valid and not valid 604, QER 148 that 606 takes input from repository directory 562 in FIG. 33 for IoT device validation 610, and RFID 150, which 608 takes input also from repository directory 562 for IoT device validation 610.

Figure 37:
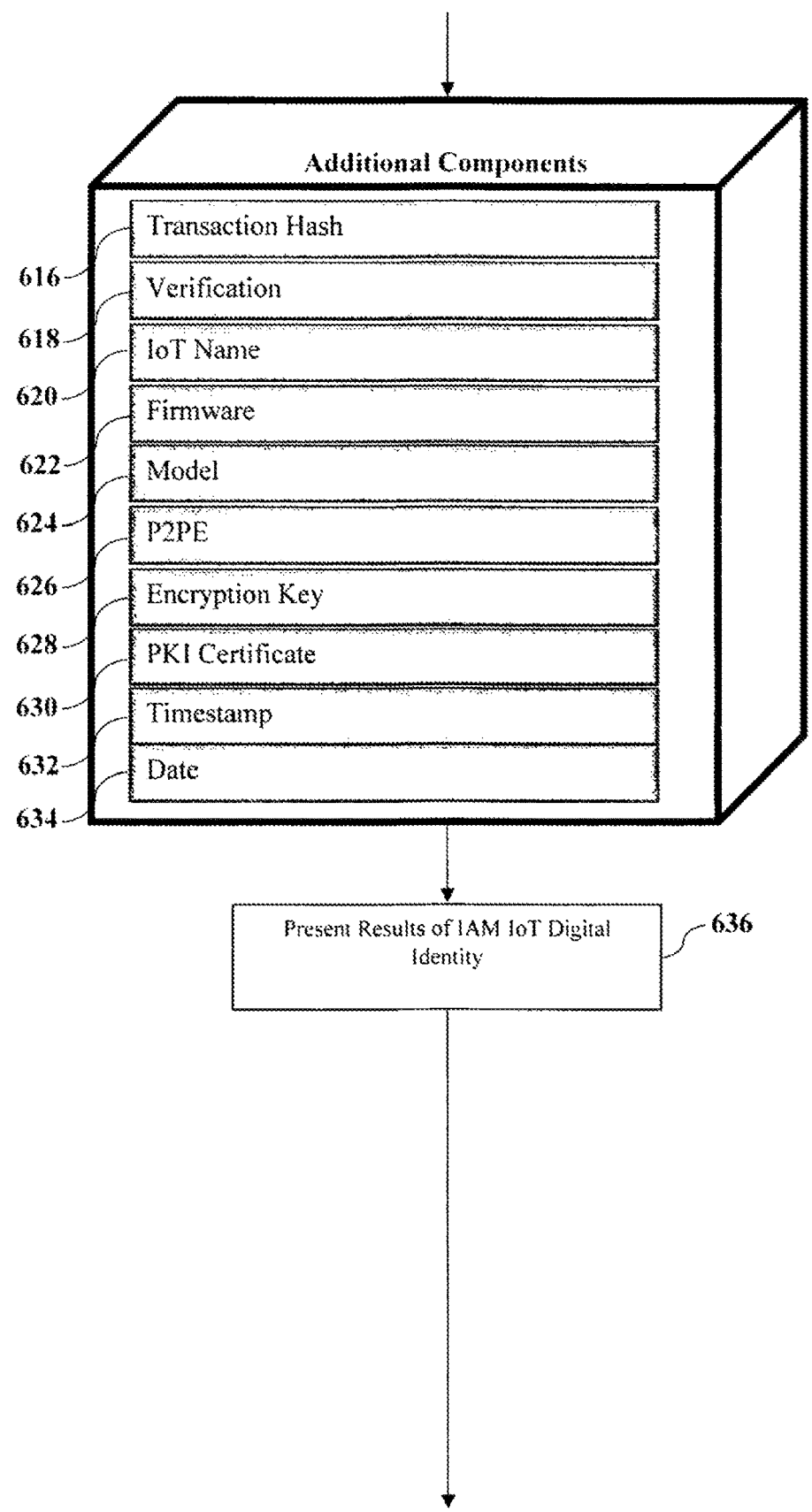
FIG. 37, shows a flowchart of the IAM method of IoT identity.

Next, the central server database 104 generates an IoT digital identity verification and completion 612; therein creating additional components 614 seen in FIG. 37.

Figure 38:
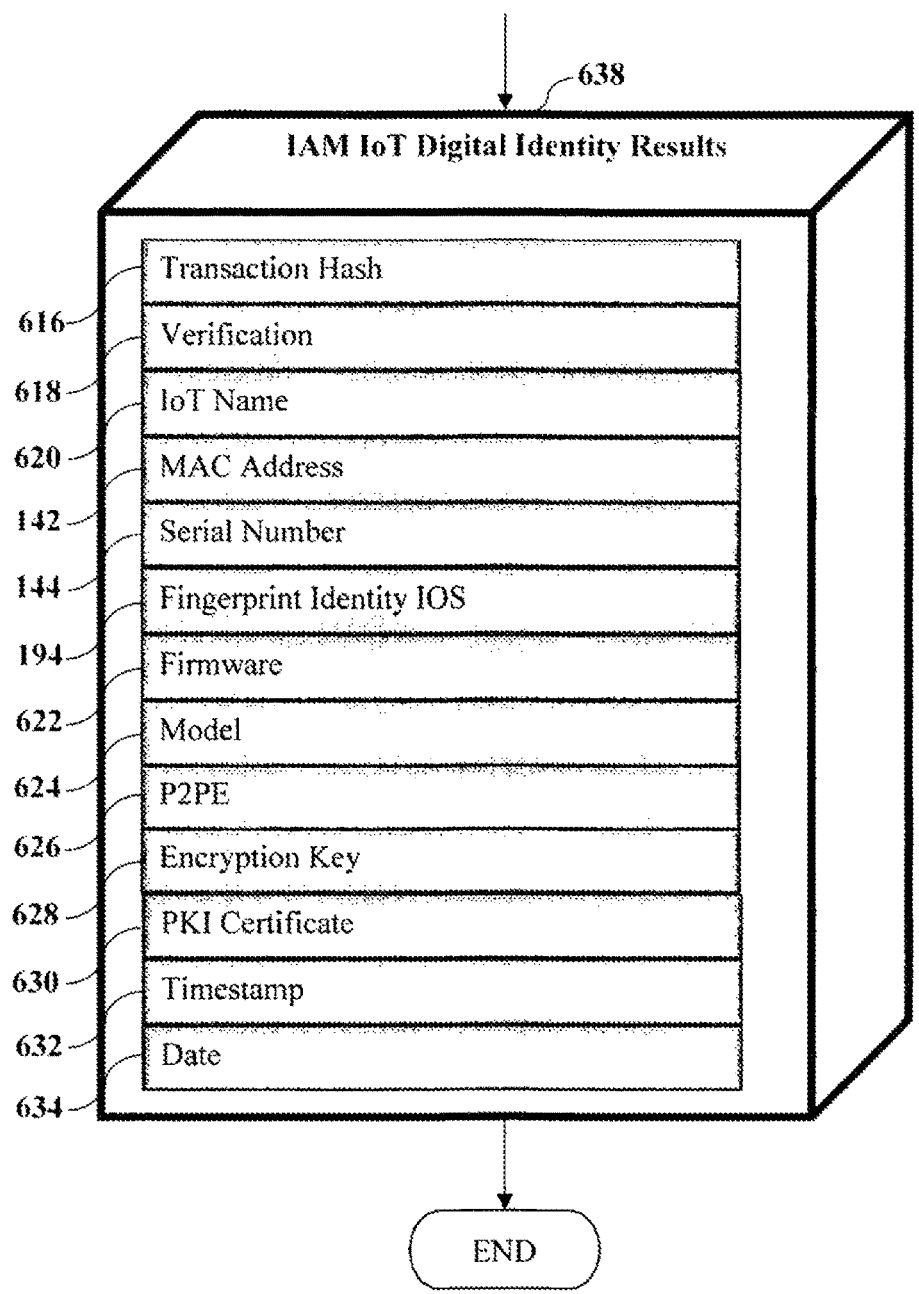
FIG. 38, shows a flowchart of the IAM method of IoT identity.

As shown in FIG. 37, shows a flowchart of the IAM method of IoT identity where the additional components are created such as transaction hash 616, verification 618, IoT name 620, firmware 622, Model 624, P2PE 626, encryption key 628, PKI certificate 630, timestamp 632, and date 634; therein presenting results of IAM IoT digital identity 636 to the combination of IAM IoT digital identity results 638 seen in FIG. 38 that becomes the IoT identity.

As shown in FIG. 38, shows a flowchart of the IAM method of IoT identity displaying the combination of IAM IoT digital identity results 638 such as transaction hash 616 providing validation, verification 618 providing confirmation of the IoT device if its valid and not valid, IoT name 620 providing the name of the IoT, MAC address 142 providing a unique IoT identification of the IoT device, serial number 144 providing a unique IoT identification of the IoT device, fingerprint identity IOS 194 providing also a unique identification of the IoT device, firmware 622 providing the firmware version of the IoT, Model 624 providing the IoT brand, P2PE 626 providing a component verification of P2PE with established communication if it's a YES and NO, encryption key 628 providing the AES-SEA 512 bit key generation, PKI certificate 630 providing a 1024 PKI certificate showing valid and not valid certificate, timestamp 632 providing the process of securely keeping track of the creation and modification time of the component of the IoT being generated, and date 634; therein providing the date where the IoT is being registered in the central server database 104. These concludes that the IoT has a digital identity into the BCE 130 and IAM platform with the P2PE including the AES-SEA 512-bit key algorithm.

Figure 39:
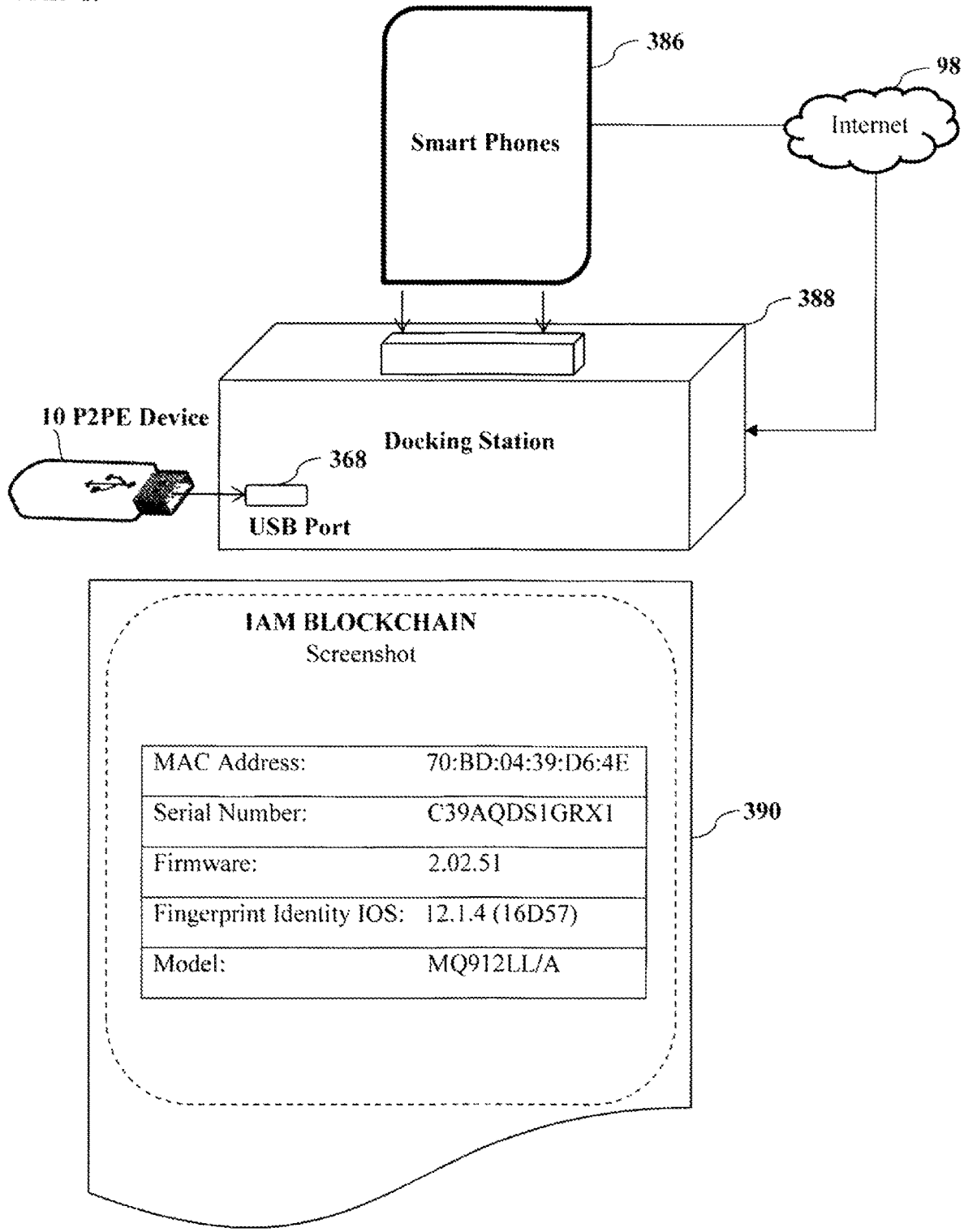
FIG. 39, shows a view of an example for registration and validation for the IAM of the IoT device.

As shown in FIG. 39, shows an example of the registration and validation for the IAM of the IoT device where the P2PE device 10 is inserted into the USB port of the docking station 388. Once the USB port of the docking station 388 senses that the P2PE device 10 is connected, the smart phone 386 is being inserted into the docking station 388 and the communication starts to provide the registration and validation for the IAM of the IoT; therein a signal is being sent through the smart phone 386 that is connected to the docking station 388 through the Internet 98 which the BCE 130, IAM method 136, central server 68, and central server database 104 are residing in.

The validation and communication as described by the instant invention takes place in the background where the P2PE device 10 expectation in the example of registration and validation step 1 shown in FIG. 39, shows that validation is already being transparent, and the smart phone 386 is registered. The following number 390 is the IAM blockchain screenshot from the smart phone 386 with the MAC address, serial number, firmware, fingerprint identity IOS, and model to validate that these four components are being validated and registered through the process.

Figure 40:
FIG. 40, shows a view of an example for registration and validation for the IAM of the IoT device.

As shown in FIG. 40, shows an example of the registration and validation for the IAM of the IoT device in step 2; therein the owner of the smart phone 386 enters the URL in the web browser 392 on the workstation; therein at that point, its connected to the IAM account log In registration 394 to be registered by the owner of the smart phone 386 which appears on the web browser 392 where the serial number is already being display. The step 3 inspects the central server database 104; therein the table is open in the central server database 104 showing the same previous serial number seen on step 2 of the IAM account log In registration 394 and step 1 of the IAM blockchain screenshot 390 of the smart phone 386 device; therein displaying the MAC address, firmware, fingerprint identity IOS, and model from FIG. 39 meaning that the registration has been validated. At this point, it is important to confirm and verify that the central server database 104 has captured these components mentioned above so that the smart phone 386 is displayed.

As shown in FIG. 41, shows an example of the registration and validation for the IAM of the IoT device in step 4; therein shows the central server database 104 which is table of the central server 68 validating the table and matching the first name with the last name of the IAM account log In registration 394 that corresponds to the serial number indicated within the three prior steps, such as step 3, step 2, and step 1 seen on FIG. 40, and FIG. 39. Here, the serial number matches with the owner of the smart phone 386. Afterwards, the validation is performed validating the other components such as the MAC address, firmware, fingerprint identity IOS, and model. At this time, the verification is being done behind the scenes of the central server database 104 in the application of these components mentioned above which verify and confirm that the encryption was made with P2PE using an AES-SEA 512-bit key encryption algorithm. Following, it can be seen that the PKI certificate is valid including the hash which indicates that the transaction was real and took place where the communications between the smart phone 386, the central server 68, and the central server database 104 along with the timestamp and date, shows that the central server database 104 has a valid transaction of the smart phone 386.

Step 5 shows the transaction details 396 where the web browser 392 goes, indicating in the same web browser 392 the URL to display these components. The hash algorithms are designed to be one-way known as being preimage resistant, it is computationally infeasible to find any input that maps to any pre-specified output. If an output is desired, many inputs must be tried by passing them through the hash function until an input is found that produces the desired result. Hash algorithms are also designed to be collision resistant known as second preimage resistant, it is computationally infeasible to find two and more inputs that produce the same output.

A hashing algorithm used in many blockchain technologies is the secure hash algorithm (SHA) with an output size of 256 bits (SHA-256). Many computers support this algorithm in hardware, making it fast to compute. The SHA-512 is a cryptographic hash function designed by the National Security Agency (NSA). The transaction hash SHA-512 is seen in the step 5 producing a 512-bit (64-byte) hash value shown as a hexadecimal number with 128 digits long; therein matching the transaction hash of the central server database 104 where the verification is confirmed meaning that the smart phone 386 has been registered. Blockchain technologies take a list of transactions and create a hash fingerprint where the digest is the fingerprint for the list. There is also an IoT 1 which is the record that the central server database 104 gave the smart phone 386 with a serial number that corresponds to the serial number that was explained in relation to step 3, step 2, and step 1 including the MAC address, firmware, fingerprint identity IOS, and model. Now the validation of the blockchain ecosystem 130 takes effect with the IAM method 136 and the central server database 104 by the 188 PKI server AES 2048 key including the P2PE device 10.

The effectiveness is being noted of the P2PE demonstrating that it works with success marked with the word Yes where the level of AES-SEA 512-bit key encryption algorithm next to the PKI certificate that will also validate that the PKI certificate will be validated through the PKI server AES 2048 key 188; therein demonstrating that it is valid, and that no errors were found indicating the timestamp transactions next to the date where they were performed. This concludes the validation and registration of the successful example of the P2PE device.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

The invention claimed is:

1. A method for establishing a multi socket encryption, validation, authentication, and authorization communication protocol, comprising:
    (a) combining a MC (microcontroller) (A) having an I2C socket interface with a MC (microcontroller) (B);
    (b) generating on each of a first MC (A) and a second MC (B) advanced encryption standard (AES) strong encryption algorithm (SEA), and:
        (i) the first MC (A) AES-SEA including a cypher 1 to both the MC (A) and MC (B); and
        (ii) the AES-SEA including a cypher 2 to both MC (B) and the MC (A);
    (c) providing an AES-SEA cypher 1 having:
        (i) a first MC (A) circular socket communication channel (1A) defining a 256-bit key encryption hash encryption function (HEF) from the MC (A) to said socket channel (1A) to cypher 1 and then back to socket channel (1A) communication socket channel and then said MC (A); and
        (ii) a second circular socket communication channel (1B) defining a different 256-bit key encryption hash encryption function (HEF) from the MC (B) to socket channel (1B) to AES-SEA cypher 1 and then socket channel (1B) communication socket channel and then to said MC (B);
    (d) providing an AES-SEA cypher 2 512-bit encryption key having:
        (i) a third communication socket channel having the AES-SEA cypher 2 MC (A) to the (1A) HEF of the AES-SEA cypher 2 and then having the (1 B) HEF of MC (B);
        (ii) providing a fourth communication socket channel having the MC (B) to the (18) HEF to AES-SEA cypher 2 and thereof to (1A) HEF and then to MC(A);
    (e) generating a real time validated pseudo-randomly AES/SEA 512-bit symmetric key wherein having a random coefficient time base used for decisions to switch from said master mode to said slave mode and vice versa, using an encoded algorithm in the code of a first flash memory in the MC (A) and a second flash memory in the MC (B);
    (f) using of said I2C socket interfaces to provide synchronous serial socket ports having at each end thereof; and
    (g) using Internet, having an IAM registration request corresponding to a particular IoT device and validation thereof having particular said pseudo-random numbers in which each of said numbers relate to an IoT device within a continual updated of a distributed blockchain ecosystem (BCE).

2. The method as recited in claim 1, comprising:
providing transport layer security (TLS) socket to said MC (A) and to point-to-point encryption (P2PE) IoT device at said TLS socket.

3. The method as recited in claim 2:
using a second socket TLS layer connected to the MC (B) and said second socket TLS layer connected SEA/AES (Advanced Encryption Standard).

4. The method as recited in claim 1,
wherein hardware of said MC (A) and MC (B) do not exhibit substantially similar to each other.

5. The method as recited in claim 1, comprising:
said cipher 2 defining a 512-bit key and HEFs of areas (c) and (d) of said claim 1.

6. The method as recited in claim 1, in which each socket port comprises:
an UART (universal synchronous receiver/transmitter) therebetween.

7. The method as recited in claim 1, having:
an Internet connection between said AES-SEA cypher 1 and said socket communication channel with socket channel AES-SEA to MC (A), and said AES-SEA cypher 1 and said socket communication channel with said (1B) to MC (B);
an Internet connection between said AES-SEA cypher 2 and said socket communication channel (1A) from MC (A) to cypher 2 to (1A) and to MC (A); and
an Internet connection to an identity access management (IAM)/P2PE relation to said BCE.

8. The method as recited in claim 1, having:
a third TLS socket connection to said P2PE IoT device; and
a fourth TLS socket layers connected to the Internet and thereof an HTTPS socket layer and thereof to the BCE.

9. The method as recited in claim 1, comprising:
providing a second bus from the dApp to and from said identity-access-management (IAM) and having a bus from said dApp to said BCE.

10. The method as recited in claim 1, comprising:
(a) providing to said AES-SEA including a first secure socket (SSL) layer related to a public key infrastructure (PKI) to which said second SSL and to an authentication and authorization entity (AAE); and
(b) providing a first bus to the AAE from a decentralization application (dApp), and from said AAE to from a third SSL and then from a central server (CS) to which said first bus also the said CS.

11. The method as recited in claim 10, providing:
a second bus from the dApp to and from said identity-access-management (IAM) and having a bus to said BCE.

12. The method as recited in claim 1, in which said socket interface having said I2C interface providing:
a TWI control register, each having a master and slave mode.

13. The method as recited in claim 1, in which said IAM provides:
a switch mode and a selectable "keep" mode of the method.

14. The method as recited in claim 1, using a transaction hash to verify the IoT digital identity device utilizing the central server database (CSD) using the BCE, comprising:
(a) using a repository directory;
(b) recording IAM components of IoT; and
(c) continual validation of IoT digital identity using transaction hash.

15. The method as recited in claim 7, comprising:
providing a first bus to the AAE to from a third SSL and then from a central server (CS) to which said first bus also the said CS; and
providing a second bus from the dApp to and from said identity-access-management (IAM) and having a bus to said dApp to said BCE.

16. The method as recited in claim 1, comprising:
providing to the BCE including a zero-knowledge-proof (ZKP), and then provided from said ZKP to said CS.

17. The method as recited in claim 15, comprising:
(a) providing said combination of said element of said claim 15 having a socket to a transport layer security (TLS) from a P2PE IoT device;
(b) providing a further TLS socket between said P2PE IoT device and the Internet; and
(c) providing a HTTPS socket from said Internet and said BCE.

18. The method as recited in claim 1 in which said pseudo-random numbers comprise use each of said cypher 1 and cypher 2.

* * * * *

UNITED STATES PATENT AND TRADEMARK OFFICE
CERTIFICATE OF CORRECTION

PATENT NO. : 10,673,617 B1
APPLICATION NO. : 16/391446
DATED : June 2, 2020
INVENTOR(S) : Antoniou et al.

It is certified that error appears in the above-identified patent and that said Letters Patent is hereby corrected as shown below:

In the Specification

In Column 24, Line 64: Change "Mobil" to -- Mobile --.
In Column 31, Line 63: Change "INA" to -- IAM --.
In Column 34, Line 20: Change "P2P2E" to -- P2PE --.

In the Claims

Column 64, Line 42: Change "18" to -- 1B --.

Signed and Sealed this
Third Day of September, 2024

Katherine Kelly Vidal
*Director of the United States Patent and Trademark Office*